AUTOMATIC TELEPHONE SYSTEM EMPLOYING FINDER SWITCHES FOR CONNECTING CALLING LINES TO NUMERICAL SWITCHES
Filed May 28, 1947 10 Sheets-Sheet 1
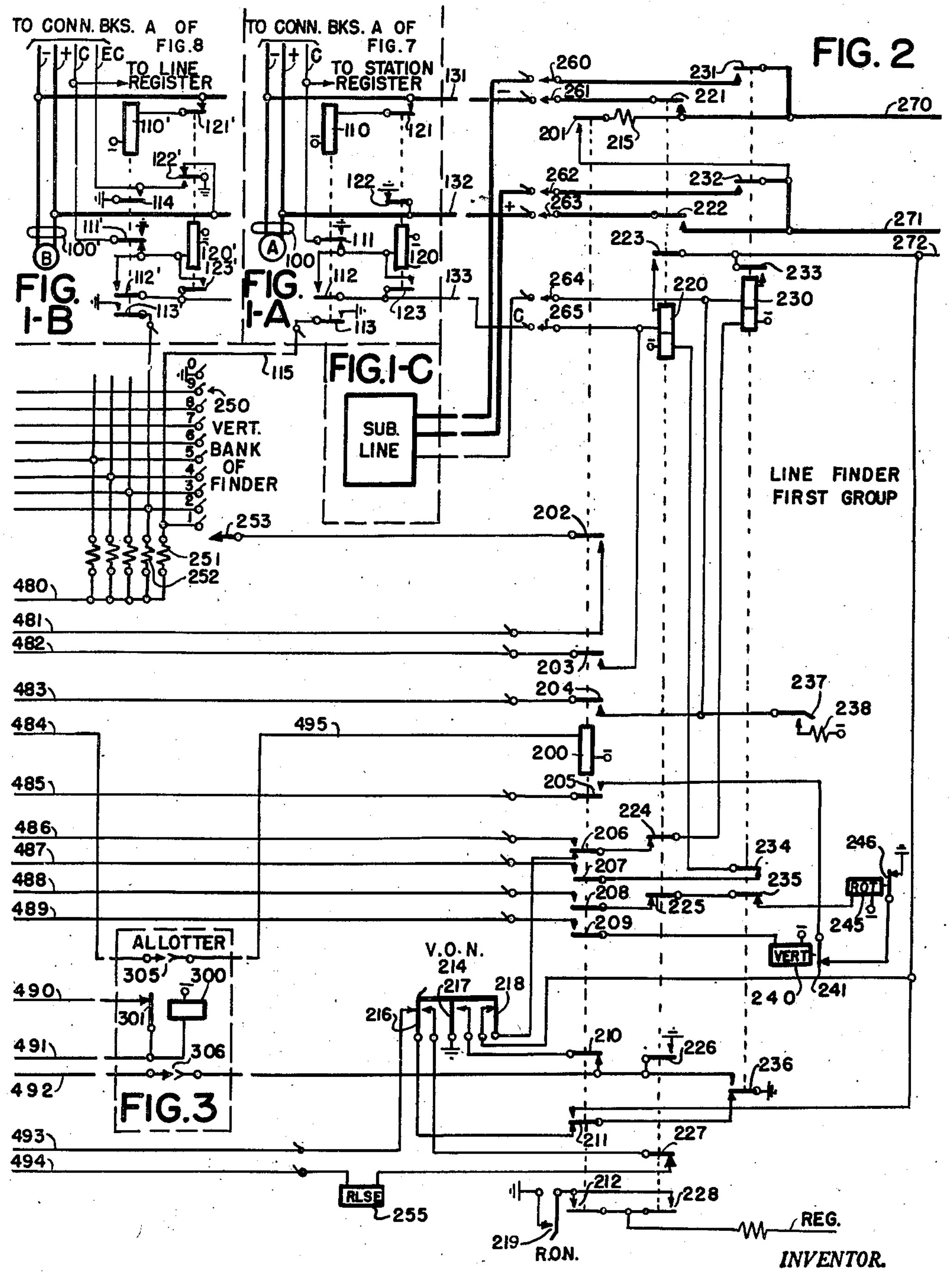
FIG. 1-A, FIG. 1-B, FIG. 1-C, FIG. 2, FIG. 3
INVENTOR.
IMRE MOLNAR
BY
Chas. W. Candy
ATTORNEY

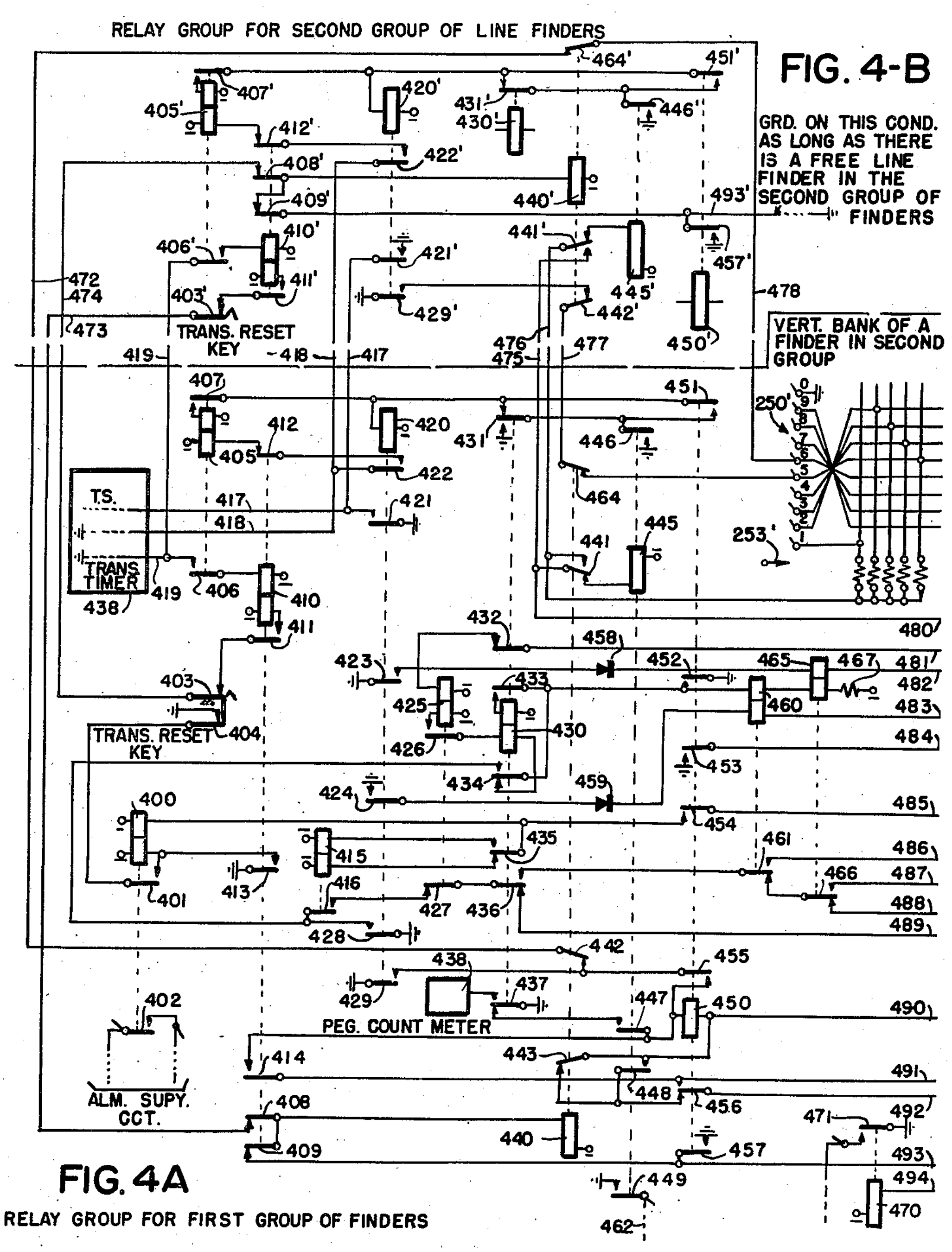
FIG. 4-B, FIG. 4A
INVENTOR.
IMRE MOLNAR
BY
ATTORNEY

INVENTOR.
IMRE MOLNAR
BY *Chas. Lee. Candy*
ATTORNEY

June 19, 1951 I. MOLNAR 2,557,388

AUTOMATIC TELEPHONE SYSTEM EMPLOYING FINDER SWITCHES FOR CONNECTING CALLING LINES TO NUMERICAL SWITCHES

Filed May 28, 1947 10 Sheets-Sheet 4

*INVENTOR.*
IMRE MOLNAR

*BY* Chas. W. Cassidy

ATTORNEY

INVENTOR.
IMRE. MOLNAR
BY
Chas. W. Candy
ATTORNEY

INVENTOR.
IMRE MOLNAR
BY [signature]
ATTORNEY

INVENTOR.
IMRE MOLNAR

BY *Chas. W. Candy*

ATTORNEY

INVENTOR.
IMRE MOLNAR

BY
Chas. [signature]

ATTORNEY

June 19, 1951 I. MOLNAR 2,557,388

AUTOMATIC TELEPHONE SYSTEM EMPLOYING FINDER SWITCHES FOR CONNECTING CALLING LINES TO NUMERICAL SWITCHES

Filed May 28, 1947 10 Sheets-Sheet 9

INVENTOR.
IMRE MOLNAR

BY *Chas. W. Candy*

ATTORNEY

| | FIG. 11 OR FIG. 15 | FIG. 12 | FIG. 13 FIG. 14 | |
|---|---|---|---|---|
| FIG. 4B FIG. 4A | FIG. 1A, B, C FIG. 2 FIG. 3 | FIG. 5 FIG. 9 | FIG. 6 FIG. 10 | FIG. 7 OR FIG. 8 |

INVENTOR.
IMRE MOLNAR
BY
Chas. W. Candy
ATTORNEY

Patented June 19, 1951

2,557,388

UNITED STATES PATENT OFFICE 2,557,388

AUTOMATIC TELEPHONE SYSTEM EMPLOYING FINDER SWITCHES FOR CONNECTING CALLING LINES TO NUMERICAL SWITCHES

Imre Molnar, Chicago, Ill., assignor to Automatic Electric Laboratories, Inc., Chicago, Ill., a corporation of Delaware Application May 28, 1947, Serial No. 750,930

15 Claims. (Cl. 179—18)

This invention relates in general to telephone systems, and more particularly to automatic telephone systems employing finder switches for connecting calling lines to numerical switches.

It is an object of the invention to provide in a telephone system of the character described, new and novel circuit means for accomplishing the various telephone connections.

Another object of the invention is to provide in a telephone system of the character described, an improved switch train having new and novel means for enabling a called subscriber to prevent the calling subscriber from releasing the switch train, and also for enabling the called subscriber to signal the office attendant for the purpose of having the attendant trace the call back to the calling line.

A further object of the invention is to provide an improved finder switch for use on a connection between two subscribers' lines which finder switch, when so used, is releasable by a toll operator in a new and novel manner, preparatory to the toll operator extending a toll call to the calling subscriber's line of the previously established subscribers' connection without requiring the calling subscriber to first disconnect.

A still further object of the invention is to provide a novel and efficient switching selector for use in an office whereby the switching selector becomes an intermediate selector in the switch train after a call initiated in the office has been identified as being destined for another subscriber's line in the same office, and whereby the switching selector repeats pulses to intermediate and final switches in a distant office after a call initiated in the first mentioned office has been identified as being destined for a subscriber's line in the distant office.

Another object of the invention is to provide an improved switching selector which can automatically "cut-in" directly after the first digit of a number has been dialed, and which can "absorb" the first two or three digits of a dialed number and then cut-in automatically after the third or fourth digit, according to circumstance.

A further object of the invention is to provide a switching selector which incorporates a trunk finder in a new and novel manner for connecting the switching selector with a free out trunk circuit as soon as the switching selector is seized.

A still further object of the invention is to provide new and improved means for "timing out" a call initiated in an office having switching selectors in the instances where the calling station fails to dial within a predetermined time interval, thereby causing the automatic releasing of the out trunk circuit which was occupied by the switching selector responsive to the initiation of the call.

Another object of the invention is to provide an out trunk circuit having improved and novel means for effecting the release of the associated incoming selector in the distant office.

A feature of the invention resides in the arrangement whereby busy guarding potential is applied to the extra control (EC) bank contacts of connector switches directly from the line circuits of the P. B. X. lines served by the connector switches, with the exception of the last line in each group of P. B. X. lines, for the purpose of causing the connector switches to automatically rotate over the busy lines of a group of P. B. X. lines until a free line of the group is selected or the last line of the group is reached.

Another feature of the invention relates to the use of the combination of a vertical bank and wiper, a right normal post spring set and a left normal post spring set in the switching selector for causing the switching selector to drop back and "absorb" certain digits of a dialed number before extending the connection to succeeding switches.

A further feature of the invention concerning the switching selector is that on an initiated call through the switching selector when the calling station fails to start dialing within a prescribed interval, the switching selector is not released as a result of the "timing out" and the consequential disconnecting of the occupied out trunk circuit but remains available to the calling station should the calling station subsequently dial a number local to the office in which the switching selector is located.

An additional feature of the invention concerns the improved supervisory arrangement of the out trunk circuit wherein a lamp glows at full voltage to indicate that a switching selector has seized the out trunk circuit, remains at full glow during the period that the out trunk circuit is occupied, reduces to a dim glow when the switching selector releases as an indication that the switching selector has released and that the associated incoming selector at the distant office has not yet been restored to normal, and becomes dark when the incoming selector releases thereby indicating that the out trunk circuit is in readiness for use on another call.

There are other objects and features of the invention having to do for the most part with the circuit details necessary to carry out the objects and features above enumerated.

The various objects and features of the invention will be understood best from a perusal of the following detail description of the drawings comprising Figures 1–A to 16 inclusive, which show by means of the usual circuit diagrams a sufficient amount of apparatus to enable the invention to be described and understood.

Figure 1–A shows a subscriber line of the individual line type connected in multiple to respective lower bank contact sets of a group of line finder switches, one of the finder switches in the group being illustrated in Figure 2.

Figure 1–B shows a subscriber line of the P. B. X type which may be connected in multiple to respective lower bank contact sets of the group of line finder switches in a manner similar to that shown for the individual subscriber line.

Figure 1–C shows a subscriber line (not detailed), which may be either of the individual line type per Figure 1–A or of the P. B. X type per Figure 1–B, connected in multiple to respective upper bank contact sets of the group of line finder switches.

Figure 2 shows the circuit arrangement of a line finder switch with lower and upper bank contact sets of wipers and a vertical wiper.

Figure 3 shows an allotter switch which preassigns idle line finder switches of a group to find calling ones of the subscriber lines connected to the bank contact sets of the group of line finder switches.

Figure 4–A shows a group of control relays which are common to one group of line finder switches and the associated allotter switch.

Figure 4–B shows a group of control relays which are common to another group of line finder switches and the associated allotter switch.

Figures 5, 9:
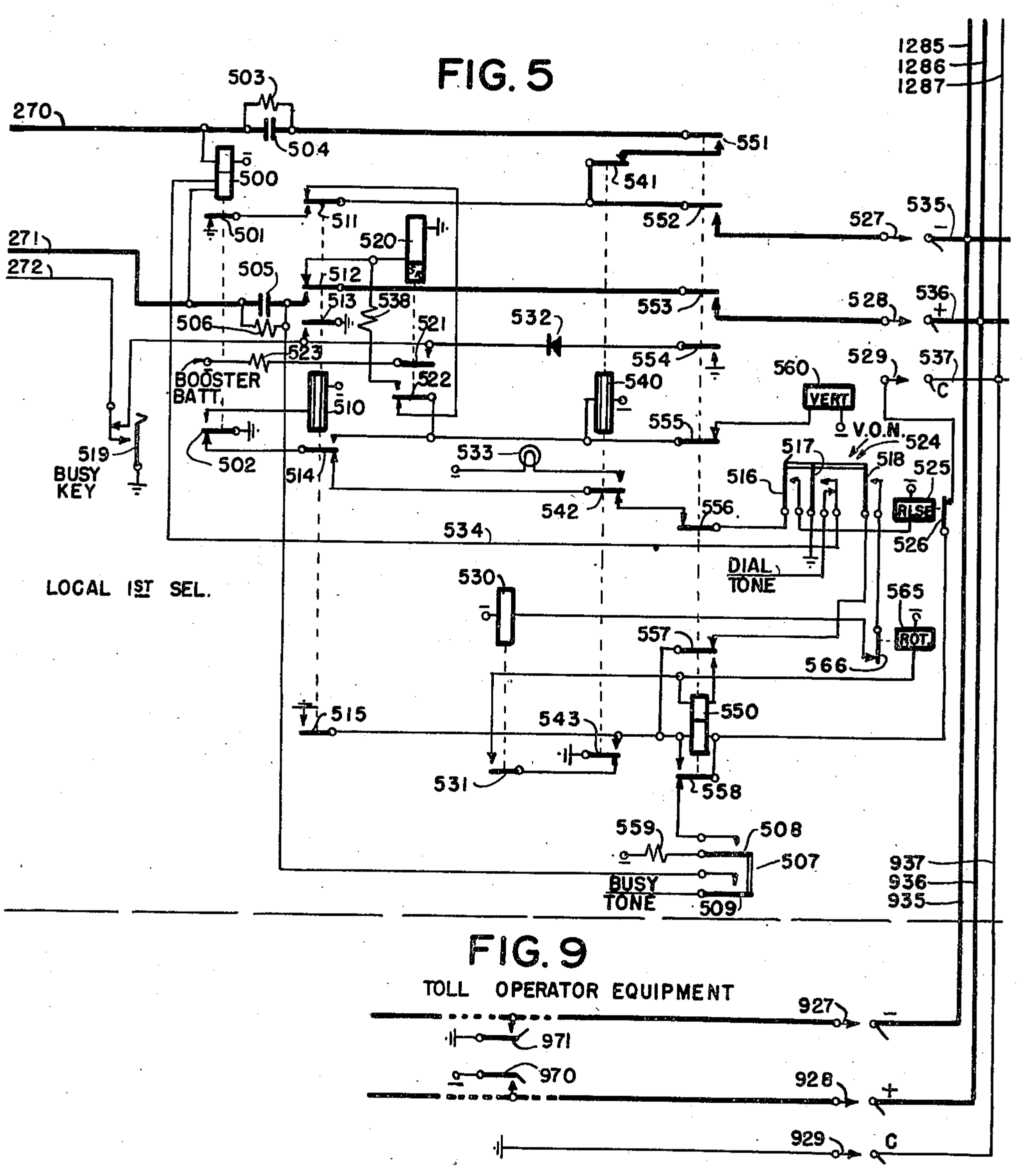

Figure 5 shows a local first selector switch which combines with a line finder switch (Figure 2) to form a line finder-selector link.

Figure 6:
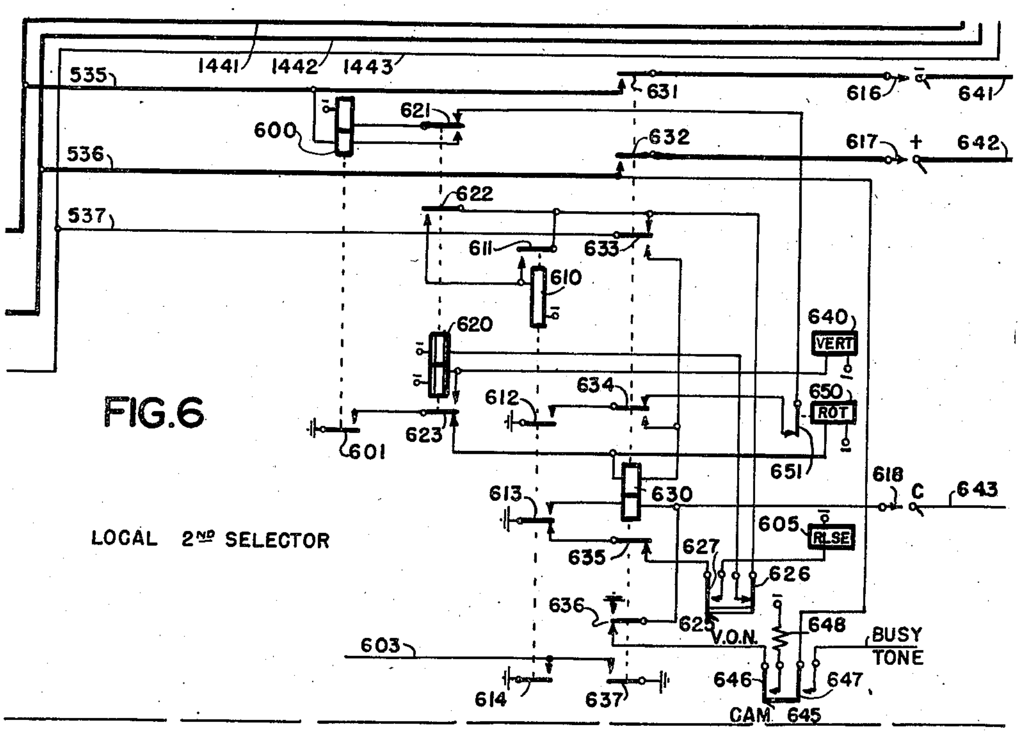

Figure 6 shows the circuit arrangement of an intermediate selector switch, the banks of which may be connected to connector switches or to intermediate selector switches.

Figure 7:
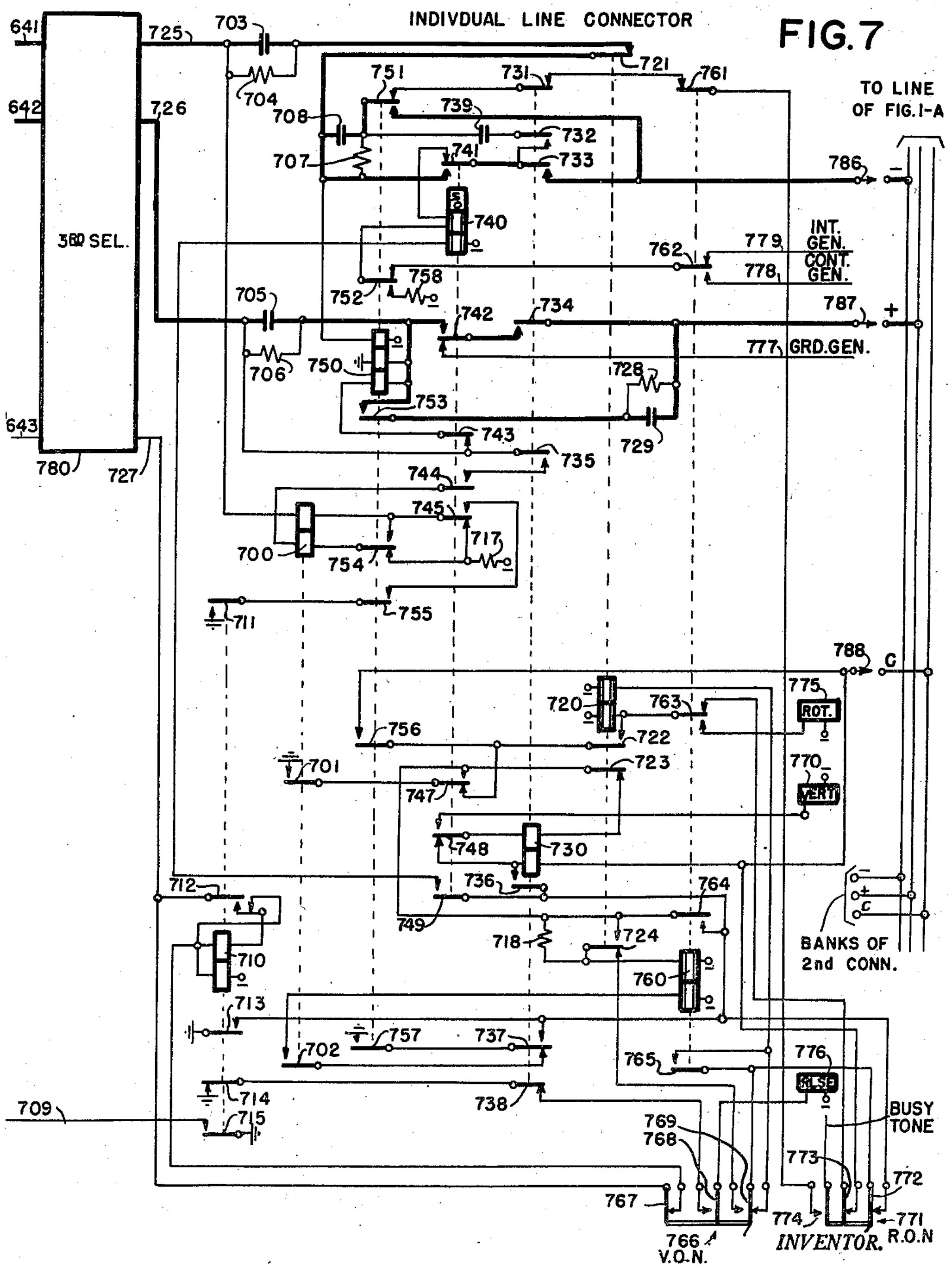

Figure 7 shows an individual line connector used for extending connections to subscribers' lines of the individual line type (Figure 1–A).

Figure 8:
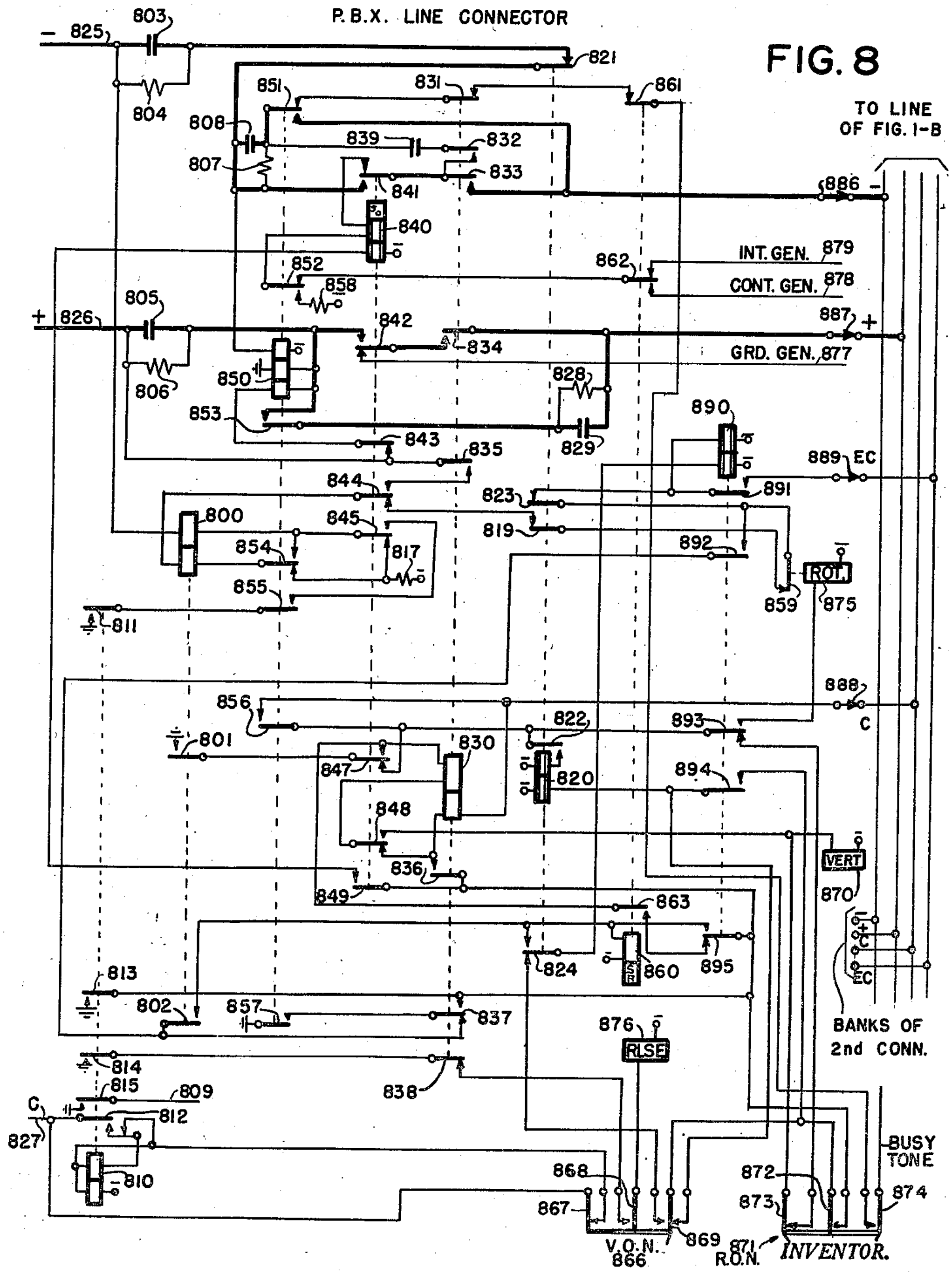

Figure 8 shows a P. B. X connector used for extending connections to P. B. X lines (Figure 1–B).

Figure 9 shows the elements and circuit details of the toll operator equipment which relate directly to the present invention, all other elements and circuit details of conventional toll operator equipment being omitted in order to simplify the drawing.

Figure 10:
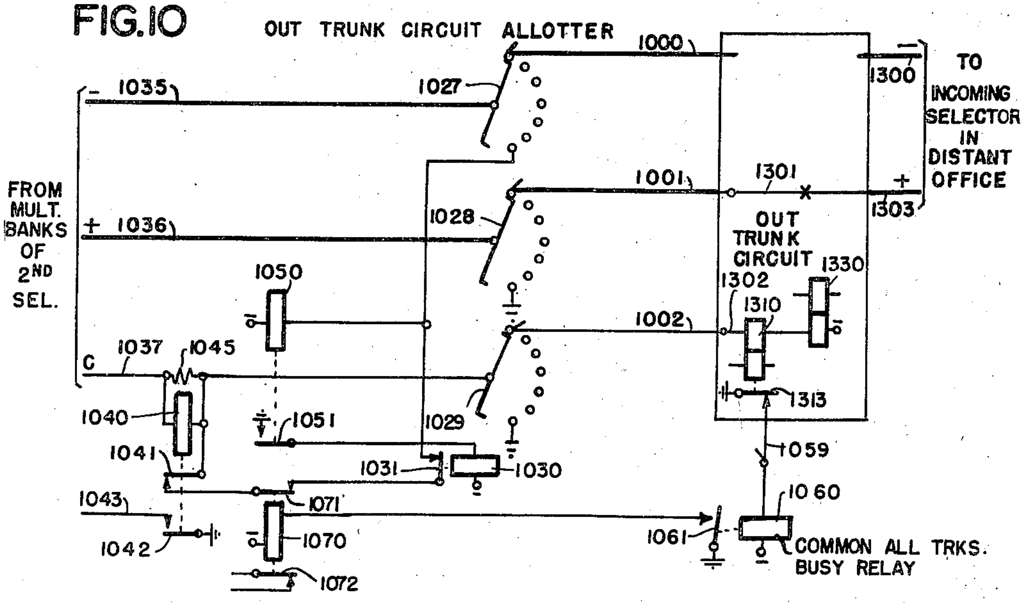

Figure 10 shows an outgoing selector switch which is used to select an out trunk circuit associated with an incoming selector switch in a distant office. The out trunk circuit is represented by the rectangular block in Figure 10, the circuit details of this circuit being the same as that shown in Figure 13.

Figure 11:
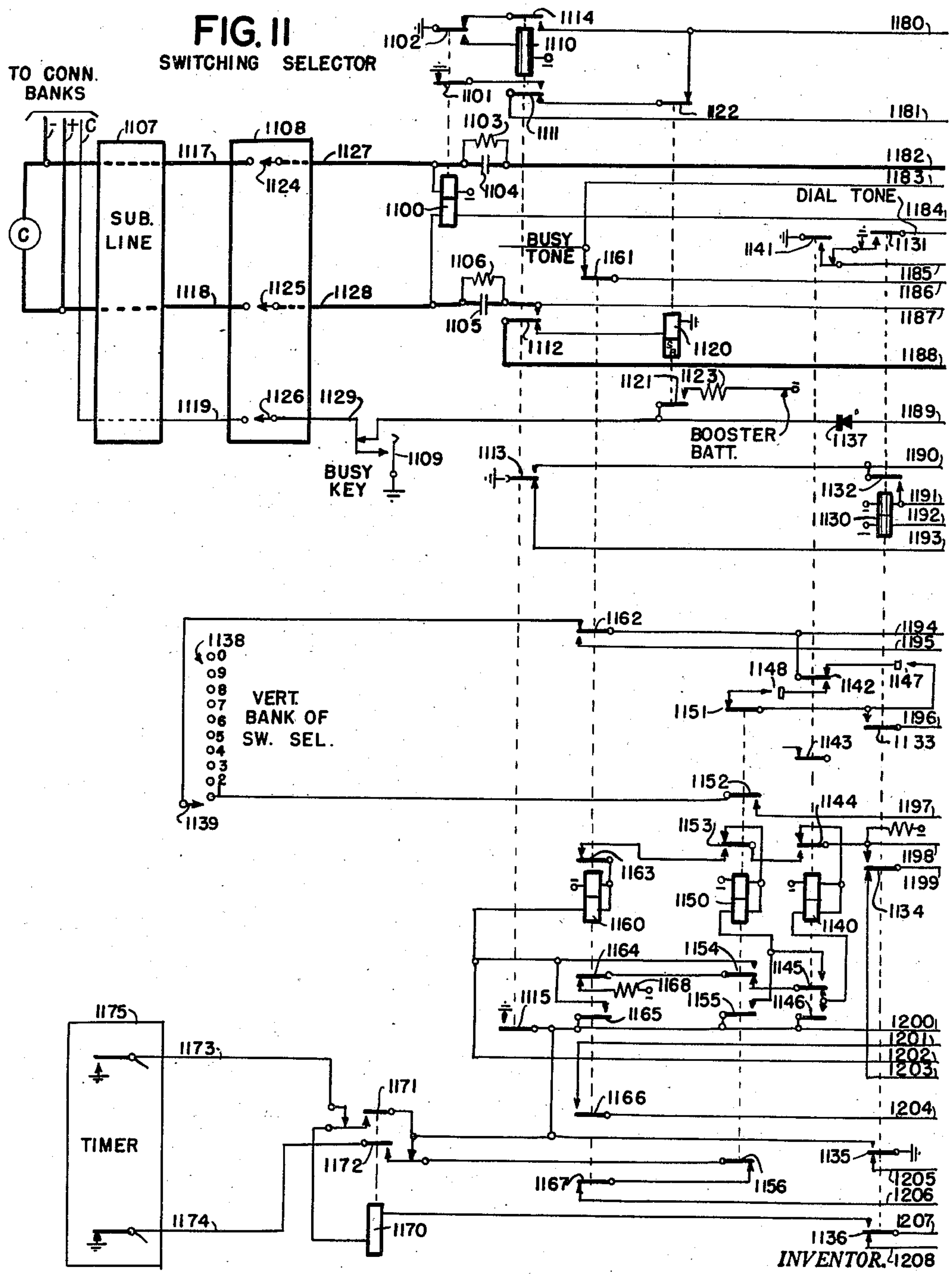
Figure 12:
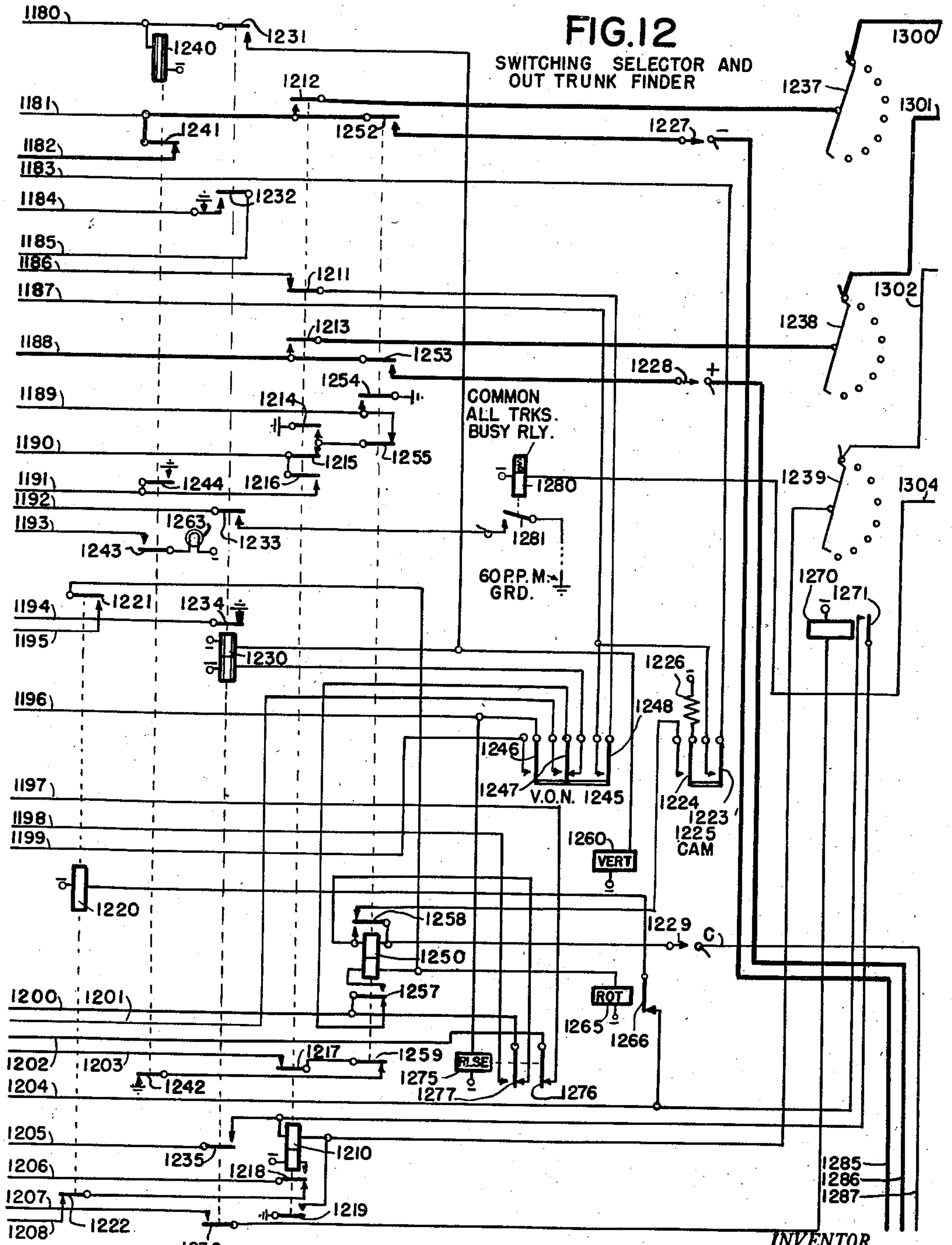

Figures 11 and 12 show the elements and wiring of the switching selector, and Figure 12 also includes the out trunk finder directly associated with the switching selector. The switching selector of Figures 11 and 12 combines with a line finder (Figure 2) to form a line finder-switching selector link. The wiring arrangement of the vertical bank in Figure 11 of the switching selector enables the switching selector to "cut-in" immediately after the dialing of a third digit when the third digit of the number is 1.

Figures 13, 14:
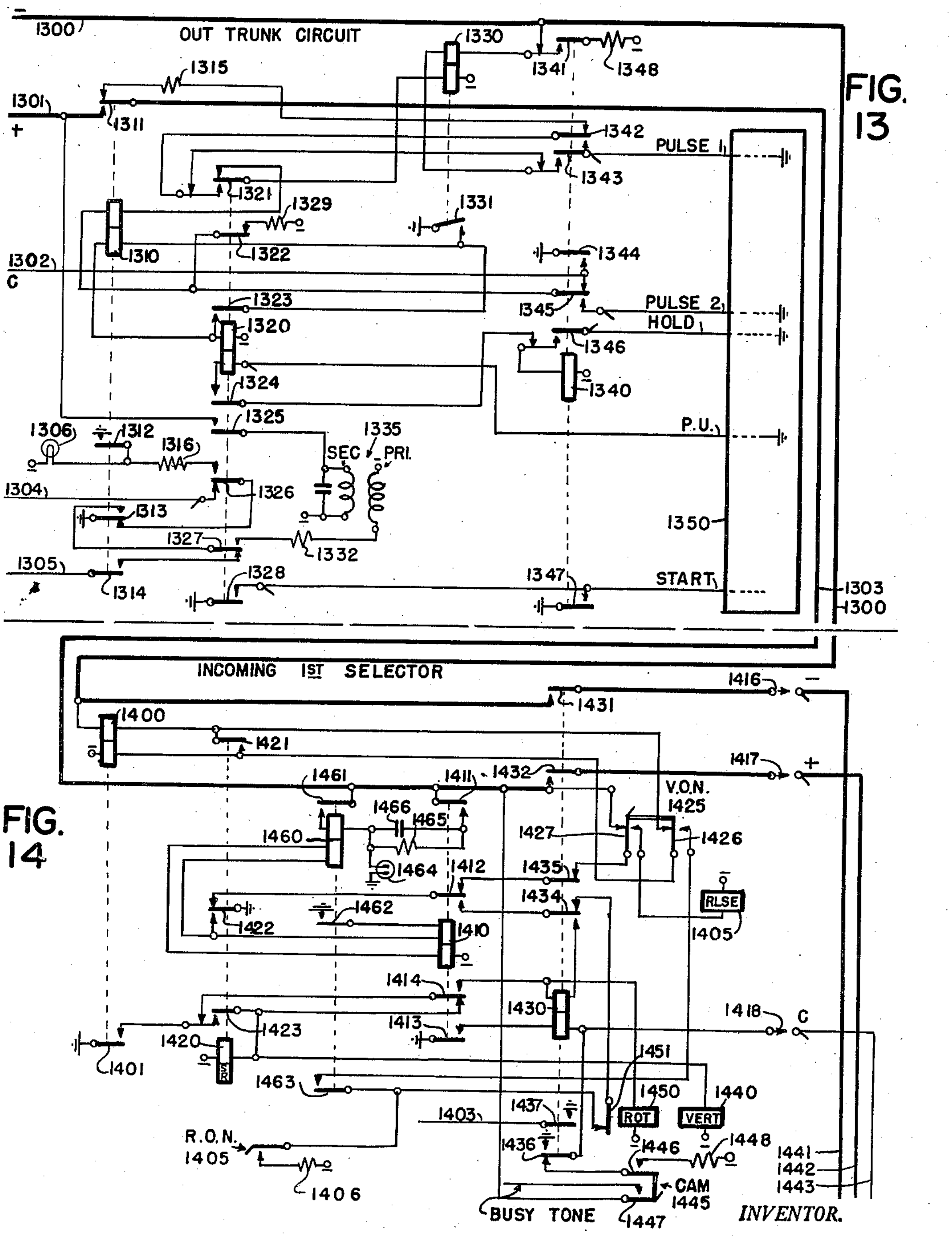

Figure 13 shows the circuit details of the out trunk circuit which is accessible to the out trunk finder (Figure 12) of the switching selector or to the outgoing secondary line switch (Figure 10).

Figure 14 shows an incoming selector switch located in a terminating office which is directly associated with an out trunk circuit (Figure 13) located in the originating office.

Figures 15, 16, 17:
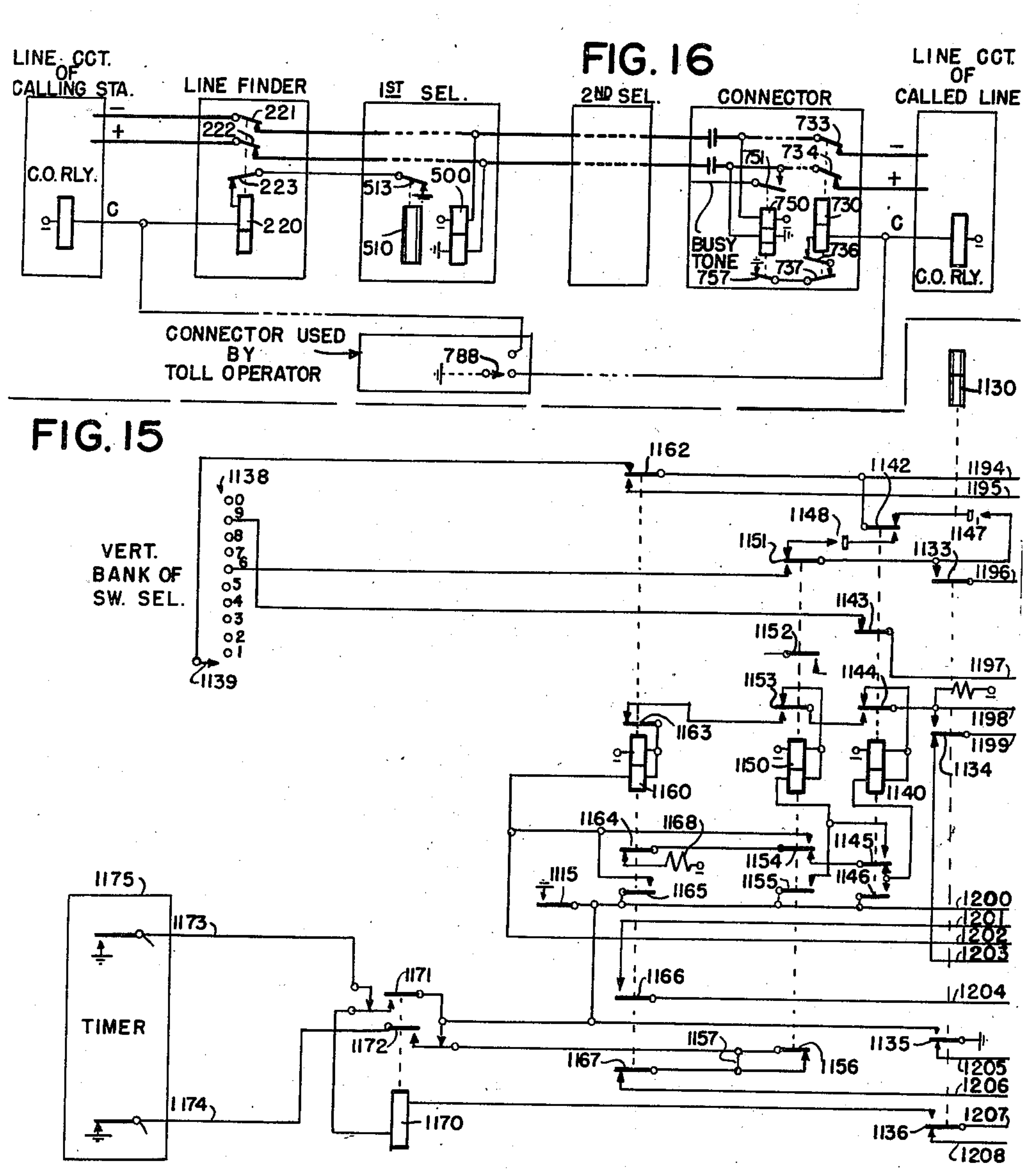

Figure 15 shows the wiring arrangement of the vertical bank of the switching selector required in order to cause the switching selector to either "cut-in" directly after the dialing of the fourth digit of a subscriber's number when the third digit is 6, or to "cut-in" immediately after the dialing of the first digit when the first digit is 9.

Figure 16 is a skeletonized diagram showing the method of toll operator "cut-in" and "breakdown" of a connection between two local subscribers.

Figure 17 includes a numbering plan for assembling the drawing sheets together so that a continuous circuit drawing of the invention may be established.

Referring now to Figures 1–A, 1–B and 11, a subscriber substation is associated with each of the subscriber lines in the telephone system, the subscriber substations A (Figure 1–A), B (Figure 1–B) and C (Figure 11) being respectively associated with the subscriber lines 100, 100' and 1107. Each of the subscriber substations is provided with a telephone instrument, a dial mechanism and a ringer. Each subscriber line includes a line relay and a cut-off relay, these relays in the line 100 being respectively indicated at 110 and 120, and in the line 100' at 110' and 120'. Furthermore, a booster battery meter (not shown) is associated with each subscriber line, the meter associated with the line 100 being connected to armature 111 of line relay 110, and the meter associated with the line 100' to armature 111' of line relay 110'. The line 100 is typical of individual, or one-party, subscriber lines, and the line 100' of P. B. X lines, the general differences between the two types of lines being that line relay 110' is equipped with an additional armature 114 and associated working contact, and armature 122' of cut-off relay 120' is fitted with a working contact as well as a resting contact. The subscriber line 1107 is not detailed but can obviously be of either the 100 type or the 100' type.

The subscriber lines in an office are arranged in first and second groups of 100 lines each, a first group and a second group forming a 200-line group. Each 200-line group is accessible to either a first and second group of finder-local first selector links or a first and a second group of finder-switching selector links, according to the type of office. For example, a main office is provided with finder-local first selector links (Figures 2 and 5), and a certain branch office with finder-switching selector links (Figures 2, 11 and 12), each group of links being equipped with a common allotter switch (Figure 3) for assigning idle ones of the links to the use of calling ones of the subscriber lines. Each first group of lines is related to a first allotter switch, and the corresponding second group of lines to the corresponding second allotter switch, whereby calling lines in the first group are normally assigned idle ones of the corresponding first group of links, and calling lines in the second group idle ones of the corresponding second group of links. Furthermore, the first and second allotter switches are so arranged and connected that a call initiated on a line in the first group is assigned an idle link in the corresponding second group in the event that all of the links in the first group are busy; and a call initiated on a line in the second group is assigned an idle link in the first group in the event that all of the links in the second group are busy. The lines in the first group of lines are terminated in the first five levels of the first group of line finders, and the lines in the second group of lines in the second five levels of the first group of line finders; and, conversely, the lines in the first group of lines are terminated in the second five levels of the second group of line finders, and the lines in the second group of lines in the first five levels of the second group of line finders. Further, contacts #2 to #9 inclusive of the vertical banks 250 of the first group of finders are multipled in reverse order to contacts #2 to #9 inclusive of the vertical banks of the second group of finders, as shown in Figures 2 and 4-A. This arrangement of multipling the vertical banks of the two finder groups causes contacts #5 of the banks 250 to correspond to contacts #6 of the banks 250', and contacts #6 of the banks 250 to correspond to contacts #5 of the banks 250', etc.

Associated with each group of finder-selector links and the related allotter switch is a group of control relays, such as the relay group shown in Figure 4-A, for controlling the operation of the links and the allotter switch. The relay group comprises a start relay 445, a busy transfer relay 440, a step relay 415, a transfer relay 430, a first group test relay 465, a second group test relay 460, timer relays 420, 405 and 410, a supervisory alarm relay 400, control relays 425, 450 and 470, and a transfer reset key comprising contacts 403 and 404.

Each allotter switch is arranged and connected in a manner similar to that shown in Figure 3 wherein the switch includes two banks of fixed contacts and two wipers individually associated therewith, the corresponding contacts in each bank terminating the control conductors extending to the respective links in the group, and the wipers terminating the control conductors extending to the control relay group. Also, the allotter switch includes a magnet 300 for driving the wipers associated with the contact banks in a rotary direction. Mechanically, the allotter switches are similar to the well-known step-by-step rotary line switch having no normal, or home, position, while the circuits thereof have been altered in accordance with the present invention. Each allotter switch is of the pre-assigning type in that an idle link in the respective group of links is assigned to the use of a calling line in that group prior to the initiation of a call on the line therein, and another idle link in the group is automatically assigned to the use of the next calling line in the group as soon as the first assigned link operates to find the calling line.

Each finder switch (Figure 2) comprises the well-known Strowger switch mechanism of the 600-point type having vertical and rotary movement and, in addition to the usual switch wipers, is provided with a shaft wiper 253 engaging a vertical contact bank 250 individual to the switch. Associated with this Strowger mechanism is a set of switching springs 214 which are actuated by the movement of the switch shaft in the vertical direction away from its normal position, a set of switching springs 219 which are actuated by the movement of the switch shaft in the rotary direction after the shaft has been lifted by the vertical operation, and a set of switching springs 237 which are actuated by the movement of the switch shaft into its eleventh rotary position. Each finder switch also includes a start relay 200, two switching relays 220 and 230, and has access to a first group of 100 subscriber lines and a second group of 100 subscriber lines.

Each local first selector (Figure 5) comprises the well-known Strowger switch mechanism of the 300-point type having vertical and rotary movement. Associated with this Strowger mechanism is a set of switching springs 524 which are actuated by the movement of the switch shaft in the vertical direction away from its normal position, and a set of switching springs 507 which are actuated by the movement of the switch shaft into its eleventh rotary position. Each local first selector switch also includes a combined line and transmission battery feed relay 500, condensers 504 and 505 in the voice transmission circuit, a hold relay 510, a register relay 520, a step relay 530, a transfer relay 540, a switching relay 550, a supervisory lamp 533 and a busy key 519, and has access to ten groups of ten trunks each.

The switching selector shown in Figures 11 and 12 comprises the well-known Strowger switch mechanism of the 300-point type having vertical and rotary movement and, in addition to the usual wipers, is provided with a shaft wiper 1139 engaging a vertical contact bank 1138 individual to the switch. Associated with this Strowger mechanism are two switching spring sets 1147 and 1148, known as the right and left normal post spring sets respectively. Spring set 1147 operates when the switch shaft is raised to a predetermined bank level responsive to the dialing of the first digit, for the purpose of causing the automatic restoration of the switch shaft and wipers to their normal positions. Spring set 1148 operates when the switch shaft is raised to a predetermined bank level responsive to the dialing of the second digit, also for the purpose of causing the automatic restoration of the switch shaft and wipers to their normal postiions. The Strowger mechanism further includes a set of switching springs 1245 which are actuated by the movement of the switch shaft in the vertical direction away from its normal position, a set of switching springs 1225 which are actuated by the movement of the switch shaft into its eleventh rotary position. Like the local first selector, the switching selector also includes a combined line and transmission battery feed relay, condensers in the voice transmission circuit, control relays, a supervisory lamp and a busy key. The switching selector has access, by way of its wipers, to ten groups of ten trunks each.

Directly associated with each switching selector and permanently connected thereto is an out trunk finder (Figure 12) of the well-known step-by-step rotary line switch type.. The out trunk finder includes three banks of fixed contacts and three wipers individually associated therewith, the corresponding contacts in each bank terminating the conductors of an out trunk circuit (Figure 13), and the wipers terminating conductors of the switching selector. Also, the out trunk finder includes a magnet 1270 for driving the wipers associated with the contact banks in a rotary direction.

The intermediate selector switches, best shown in Figure 6, each comprise a switching mechanism of the well-known Strowger type, and are arranged in a manner similar to that of the local first selector switches described in a previous paragraph. Each intermediate selector switch, however, comprises a line relay 600, a transfer relay 620, a combined switching and holding relay 630 and a relay 610 in place of the relay elements listed for the local first selector switch, and there are no condensers in the voice transmission circuit.

The individual-line connector switch shown in Figure 7 comprises the well-known Strowger switch mechanism of the 300-point type having vertical and rotary movement. Associated with this Strowger mechanism is a set of switching springs 766 which are actuated by the movement of the switch shaft in the vertical direction away from its normal position, a set of switching springs 771 which are actuated by the movement of the switch shaft in the rotary direction after the shaft has been lifted by the vertical operation, and a number of control relays. The individual-line connector switches of one group have access to one group of 100 individual subscriber lines.

The P. B. X connector switch shown in Figure 8 comprises the well-known Strowger switch mechanism of the 400-point, extra control bank type having vertical and rotary movement. Associated with this Strowger mechanism is a set of switching springs 866 which are actuated by the movement of the switch shaft in the vertical direction away from its normal position, a set of switching springs 871 which are actuated by the movement of the switch shaft in the rotary direction after the shaft has been lifted by the vertical operation, and a number of control relays. The P. B. X connectors of one group have access to 100 P. B. X lines or a combination of P. B. X and individual subscriber lines not exceeding a total of 100 lines.

The out trunk circuit (Figure 13) consists essentially of a group of control relays and a transformer. The transformer is used for producing a high voltage potential which is momentarily connected to one conductor of the transmission circuit for effecting a release condition in the manner described in the section titled "Calls from branch office to main office."

Each incoming first selector (Figure 14) is permanently connected to an out trunk circuit (Figure 13) and comprises the well-known Strowger mechanism of the 300-point type having vertical and rotary movement. Associated with this Strowger mechanism is a set of switching springs 1425 which are actuated by the movement of the switch shaft in the vertical direction away from its normal position, a set of switching springs 1405 which are actuated by the movement of the switch shaft in the rotary direction after the shaft has been lifted by the vertical operation, a set of switching springs 1445 which are actuated by the movement of the switch shaft into its eleventh position, and a number of control relays. The incoming first selector has access to ten groups of ten trunks each.

The out trunk circuit allotter shown in Figure 10 is of the well-known step-by-step rotary line switch type and includes three banks of fixed contacts and three wipers individually associated therewith, the corresponding contacts in each bank terminating the conductors of an out trunk circuit similar to that shown in Figure 13, and the wipers terminating conductors from the multiple banks of local selector switches or switching selectors. Also, the out trunk circuit allotter includes control relays and a magnet 1030 for driving the wipers associated with the contact banks in a rotary direction.

It should be understood at this time that while the embodiment of the present invention disclosed and described in this specification includes well-known switches of certain bank capacities, the invention is not limited to the particular form shown but may utilize other bank-capacity switches or other arrangement combinations of the switches. It should also be understood that condensers in the voice current transmission circuits are bridged with resistors of high values in order that battery potentials are impressed upon "dry" contacts in the voice current transmission circuits for the purpose of effecting "quiet" voice current transmission circuits.

It should be further understood that while a plurality of battery connections are shown in the drawings for the switches located in any one office, they are preferably the same battery for that office. Also, in order to simplify the drawings further, such well-known facilities as busy keys, jacks for enabling an attendant to plug into the various switches, spark quenching apparatus, supervisory and release signal arrangements, timers, ringing and tone generating equipment, and the like have been omitted. The ringing and tone generating equipment furnishes such well-known facilities as continuous ringing current, interrupted ringing current, grounded generator, dial tone and busy tone.

Having described the equipment and apparatus, a detailed description of the operation will now be given.

*Calls from main office stations to main office individual station lines*

Briefly, calls from main office stations to main office individual station lines are completed in the following manner:

The person at the calling station lifts the handset from the telephone cradle and, after hearing conventional dial tone, dials the number of the desired station. If the called station is in use, the calling person receives busy tone. If the called station is not busy, the called station is rung automatically and intermittently. The release of the connection is normally under the control of the calling person.

In order to describe such a local call in detail, it is assumed that station A (Figure 1–A) originates a call for another station in the same office. It is also assumed that the finder shown in Figure 2 has been pre-assigned by the related allotter (Figure 3). Busy transfer relay 440 in Figure 4–A relay group is normally maintained in the operated position by the idle finders of the first group as, for example, from ground, armature 236 and resting contact (Figure 2), armature 211 and resting contact, armature spring 216 and resting contact, conductor 493, armatures 409 and 498 (Figure 4–A), winding of relay 440 to battery. Responsive to the lifting of the handset from the telephone cradle at station A, a circuit is closed for energizing line relay 110 from ground, armature 122, direct current loop through the telephone at station A, armature 121, winding of line relay 110 to battery. At armature 112, relay 110 marks station A as calling in the banks of the group of finders having access to the line group in which the line circuit of station A is located by connecting battery through the winding of cut-off relay 120 and conductor 133 to the C bank contacts of station A line circuit. At armature 111 and working contact, relay 110 connects ground to the control conductor leading to the connector bank terminals of station A to mark station A as busy to the connector switches having access thereto. At armature 113, relay 110 applies ground potential to start conductor 115 connected to contact #1 of vertical bank 250 of the pre-assigned finder shown in Figure 2 and also to contacts #1 of the multipled vertical banks of all finders in the same group.

The ground potential connected to contact #1 of vertical bank 250 extends through resistor 251, conductor 480, armature 441 and operated working contact, winding of start relay 445 of the relay group to battery, causing relay 445 to operate. At armature 446, relay 445 completes an obvious circuit to timer relay 420; and, at armature 447, completes a circuit to relay 450 from ground, armature 437 and resting contact, armature 447, winding of relay 450, conductor 490, interrupter armature 301 (Figure 3), winding of magnet 300 to battery, only relay 450 operating over this circuit, the high resistance value of relay 450 preventing the operation of magnet 300. At armature 447, relay 445 also extends ground potential from armature 437 and resting contact to contact #5 of vertical bank 250 by way of armature 442, conductor 472, armature 464′ (Figure 4–B), conductor 478, contact #6 of vertical bank 250′, and the multiple between contact #6 of bank 250′ and bank 250 for the purpose of preventing the finder (Figure 2) from searching above the fifth level of its banks.

At armature 453, relay 450 completes a circuit to start relay 200 of the pre-assigned finder-selector link from ground, armature 453, conductor 484, wiper 305 of the finder allotter, bank contact of the allotter, conductor 495, winding of relay 200 in the finder to battery, causing relay 200 to operate. At armature 457, relay 450 completes a multiple circuit to busy transfer relay 440: at armature 454, completes a circuit for operating step relay 415 from ground, interrupter armature 246 (Figure 2), interrupter armature 241, armature 205, conductor 485, armature 454 (Figure 4–A), armature 435 and resting contact, lower winding of step relay 415 to battery: at armature 452, completes a circuit for pre-energizing test relays 460 and 465 from ground, armature 452, upper winding of relay 460, lower winding of relay 465, resistor 467 to battery; and, at armature 451, completes a multiple circuit to timer relay 420 from ground, armatures 446, 451, winding of relay 420 to battery.

Line finder start relay 200, at armature 201, completes a loop circuit including resistor 215 to line relay 500 (Figure 5) of the companion local first selector, causing relay 500 to operate and complete an obvious circuit to hold relay 510. At armature 513, hold relay 510 connects ground potential to conductor 272 through busy key 519 for the purpose to be described later.

At armature 429, timer relay 420 connects a multiple ground to relay 450 and contact #5 of vertical bank 250; and, at armature 421, extends ground potential to conductor 417 of the transfer timer 438 the operation of which will be explained in a later paragraph of this section.

Returning now to the operation of step relay 415, a circuit is completed to vertical magnet 240 of the finder from ground, armatures 428, 416, 427, armature 436 and resting contact, conductor 489, armature 209 (Figure 2), winding of magnet 240 to battery. The operation of magnet 240 elevates the shaft and wiper sets of the finder one step and opens the circuit to relay 415 at interrupter armature 241 thereby causing relay 415 to restore. With the elevation of the finder shaft one step, the vertical-off-normal (V. O. N.) contact spring set 214 is operated and the vertical wiper 253 makes contact with contact #1 of vertical bank 250 thereby completing a circuit for operating relay 425 from ground, contact 113 (Figure 1–A), conductor 115, contact #1 of bank 250, wiper 253, armature 202, conductor 481, armature 432 (Figure 4–A), upper winding of relay 425 to battery. Relay 425, in operating, locks to a circuit from ground, armature 452, armature 434 and resting contact, lower winding of transfer relay 430, armature 426, lower winding of relay 425 to battery; and, at armature 427, opens the circuit of vertical magnet 240, causing magnet 240 to restore and complete the circuit to relay 415 at interrupter armature 241. Step relay 415 re-operates.

The completion of the locking circuit to relay 425, as recited in the preceding paragraph, also causes transfer relay 430 to operate and lock to an obvious circuit to its upper winding through armature 433. At armatures 432 and 434, relay 430 opens the circuits to both windings of relay 425, causing relay 425 to restore: at armature 434, completes a holding circuit for its upper winding independent of armature 452 from ground, armature 428, armature 434 and working contact, armature 433, upper winding of relay 430 to battery: at armature 436, transfers the pulsing circuit from vertical magnet 240 of the finder to rotary magnet 245: at armature 435, transfers the circuit from interrupter armature 246 of magnet 245 from the lower winding of relay 415 to the upper winding of relay 415: at armature 437, connects ground potential to peg count meter 438: and, at armature 431, connects a multiple ground through armature 451 to the winding of timer relay 420. Step relay 415 is fitted with two windings, and a transfer between these two windings is effected depending upon whether vertical magnet 240 or rotary magnet 245 is to be pulsed, because when operating through its lower winding relay 415 provides a most efficient pulsing circuit for vertical magnet 240, and when operating through its upper winding relay 415 provides a correspondingly efficient pulsing circuit for rotary magnet 245. The restoration of relay 425 completes the pulsing circuit to magnet 245 from ground, armatures 428, 416, 427, armature 436 and working contact, armature 461 and resting contact, armature 466 and resting contact, conductor 488, armature 208 (Figure 2), armatures 225, 235, winding of rotary magnet 245 to battery. The finder is now in a position to rotate its wipers 260, 261, 262, 263, 264 and 265 across the first level of the bank contact sets of the subscriber lines.

Magnet 245 operates and rotates the finder shaft and wiper sets one step in the first level of the bank contact sets, the rotary-off-normal (R. O. N.) contact spring set 219 operating with this step. At interrupter armature 246, magnet 245 opens the circuit to relay 415, causing relay 415 to restore and open the pulsing circuit to magnet 245 at armature 416. Magnet 245 restores and completes the circuit to relay 415 at interrupter armature 246. Relay 415 re-operates and again completes the pulsing circuit to magnet 245. Magnet 245 re-operates, advances the finder shaft and wipers a second rotary step, and again opens the circuit to relay 415. This interaction between magnet 245 and relay 415 continues until one of the subscriber-line wipers connects with a bank contact marked by a calling line. Assuming now that the calling line has marked a bank contact which is reached by control wiper 265, then the winding of cut-off relay 120 (Figure 1-A) is connected to control wiper 265 through armature 112 of the line relay 110 and the mentioned bank contact, and wiper 265, therefore, completes a circuit to test relay 465 (Figures 4-A) from ground, armature 423, rectifier 458, upper winding of relay 465, conductor 482, armature 203 (Figure 2), wiper 265, bank contact connected to wiper 265, conductor 133, armature 112 (Figure 1-A), winding of relay 120 of the calling station to battery, causing both relays 120 and 465 to operate. Relay 120 connects its winding to wiper 265 through armature 123 and, at armatures 121 and 122, frees the line of attachments. Line relay 110 accordingly restores. At armature 111 and resting contact, relay 110 extends the ground potential on wiper 265 to the C conductor of the connector bank multiple and to the register lead of the subscriber line; and, at armature 113, disconnects ground from conductor 115 and contact #1 of bank 250.

Test relay 465, at armature 466, opens the pulsing circuit of magnet 245 to prevent further rotary stepping. Relay 465 is extremely fast in operating with respect to stopping wiper 265 on a marked subscriber-line bank contact, due to the fact that relay 265 was pre-energized in its lower winding by the operation of relay 450 as recited in a previous paragraph. At armature 466, relay 465 completes a circuit to switching relay 220 from ground, armatures 423, 416, 427, armature 436 and working contact, armature 461 and resting contact, armature 466 and working contact, conductor 487, armature 207 (Figure 2), armature 234, lower winding of relay 220 to battery, causing relay 220 to operate and lock to a circuit from ground, armature 513 (Figure 5), busy key 519, conductor 272, armature 223 (Figure 2), upper winding of relay 220, wiper 265, bank contact connected to wiper 265, conductor 133, armature 123 (Figure 1-A), winding of relay 120 to battery. Relay 120 is also retained in the operated position over the locking circuit just traced. At armatures 221 and 222, relay 220 extends the calling loop of station A through to line relay 500 of the local first selector, in multiple with the loop through resistor 215 and armature 201; and, at armature 226, connects ground potential to wiper 306 of the finder allotter for the purpose to be described later.

The operating circuit to the lower winding of switching relay 220 is controlled through armature 416 of step relay 415, and the operation of relay 415 is controlled by the closing of interrupter armature contact 246 of rotary magnet 245 to ensure that a "switch through" operation of relay 220 can occur only after the rotary magnet 245 has been fully restored. Should wiper 265 of the finder pass over a subscriber-line bank contact at the moment booster battery is present on that bank contact for the purpose of operating the register associated with the subscriber line, the high resistance of rectifier 458 to current of such direction prevents the improper operation of test relay 465.

Digressing for the moment from the description of the local call, an explanation will now be given of the method of automatically assigning the finder-selector links to successive calls originated at local stations. In the foregoing description it was stated that the release of line relay 110 caused the removal of ground potential from conductor 115 and contact #1 of the finder vertical bank 250. This removal of ground potential opens the circuit to start relay 445, providing no other call has been originated in the subscriber line group, causing relay 445 to restore. The restoration of relay 445 removes a multiple ground from the winding of timer relay 420 and, at armature 449, removes ground potential from conductor 462 leading to a delayed alarm circuit (not shown).

The ground potential connected to wiper 306 of the allotter by armature 226 short-circuits the winding of relay 450 at armature 456 and working contact, causing relay 450 to restore. At armature 451, relay 450 opens the circuit to relay 420: at armature 452 opens the circuit to the upper winding of relay 460 and the lower winding of relay 465: at armature 453, opens the circuit to relay 200 of the finder; and, at armature 454, opens the circuit to relay 415. The short-circuiting of relay 450 permits magnet 300 of the allotter to operate and position its pawl preparatory to advancing wipers 305 and 306 one step. The restoration of relay 420 opens the circuit to the upper winding of relay 465 at armature 423, causing relay 465 to restore: at armature 421, removes ground from conductor 417 of timer 438; and, at armature 428, opens the locking circuit of relay 430. The restoration of relay 200 of the finder connects a multiple ground to wiper 306 of the allotter at armature 210; and, at armature 201, removes the resistor 215 loop from across conductors 270 and 271 thereby placing line relay 500 of the local first selector under the control of calling station A. The restoration of relay 430 removes ground potential from peg count meter 433 at armature 437.

The operation of magnet 300 of the allotter opens the interrupter springs 301, causing magnet 300 to restore and thereby advance wipers 305 and 306 one step. Should the next finder-selector link be in prior use, wiper 306 will find ground potential on the bank contact of that finder-selector link, and this ground connection will cause magnet 300 of the allotter to again operate, preparatory to advancing wipers 305 and 306 another step, and will against short-circuit relay 450 to prevent the operation of relay 450 should start relay 445 operate due to another subscriber line calling before the allotter has found an idle finder-selector link. Should the second tested finder-selector link also be busy, there will be ground potential on the bank contact of the second tested finder-selector link, and magnet 300 will be caused to advance wipers 305 and 306 still another step. This stepping and testing continues until wiper 306 connects with a bank contact of an idle finder-selector link. When an idle finder-selector link is found by the allotter, ground potential will not be returned to operate magnet 300, and relay 450 will be permited to operate should another call be waiting.

Returning now to the description of the local call, line relay 500 of the first selector is now held through the calling loop of station A, and dial tone is returned to the calling person through the resting contact of armature spring 517 of V. O. N. spring set 524, conductor 534, lower winding of relay 500, conductor 271, armature 222 (Figure 2), wiper 263, and through "+" bank contact associated with calling station A to the listening circuit of station A. Upon hearing the well-known dial tone, the calling person dials the number of the desired local station. Responsive to the dialing of the first digit, the circuit to relay 500 of the first selector is interrupted a number of times equal to the number of pulses in the first digit. Relay 500 restores momentarily for each pulse and, at armature 502, opens the circuit to hold relay 510. Relay 510, however, is of the slow-to-release type and, therefore, does not restore during the pulsing period. Consequently, the circuits controlled by relay 510 are not disturbed. At armature 502 and resting contact, relay 500 transmits a pulse to vertical magnet 560 and relay 540 for each de-energization. This multiple circuit may be traced from ground, armature 502 and resting contact, armature 514 and working contact, armature 555, winding of magnet 560 to battery, and also through armature 514 and working contact, winding of relay 540 to battery. Relay 540 operates and, since it is also of the slow-to-release type, it does not restore during the pulsing period. Magnet 560 operates and restores for each de-energization and re-operation of relay 500, raising the shaft and wipers of the first selector a corresponding number of vertical steps. The V. O. N. spring set 524 operates with the first vertical step, disconnecting the dial tone at the resting contact of armature spring 517 and connecting the lower winding of relay 500 to direct ground through armature spring 517 and working contact. The operation of V. O. N. spring set 524 also completes a circuit to step relay 530 from ground, armature 515, armature 557 and resting contact, armature spring 518, interrupter armature 566, winding of relay 530 to battery, causing relay 530 to operate.

Shortly after the last pulse of the first digit has been received, relay 540 restores and completes the circuit to rotary magnet 565 from ground, armature 543 and resting contact, armature 531, winding of magnet 565 to battery. Magnet 565 operates and rotates the shaft and wipers of the first selector one step in the bank level selected by the vertical pulsing. The operation of magnet 565 also opens the circuit to relay 530 at interrupter armature 566, causing relay 530 to restore and open the circuit to magnet 565 at armature 531. Magnet 565 restores in turn and again completes the circuit to relay 530. The operation of the first selector at this moment is dependent upon whether the second selector connected to the first bank contact set of the bank level selected by the vertical pulsing is in prior use or is idle.

Should the second selector be idle, then wiper 529 of the first selector encounters battery supplied from the second selector on the C contact of the first bank contact set, and a circuit for relay 550 of the first selector is completed from ground, armature 515, lower winding of relay 550, interrupter armature 526, wiper 529, C bank contact connected to wiper 529, conductor 537 to battery supplied over conductor 537 from the second selector, causing relay 550 to operate and prevent further rotary pulsing of the first selector. Should the second selector be in prior use, then wiper 529 of the first selector encounters ground potential on the C contact of the first bank contact set and, consequently, relay 550 of the first selector cannot operate at this time. The circuit to relay 530 is, therefore, maintained at armature 557 and resting contact, causing relay 530 to re-operate and again complete the circuit to magnet 565. Magnet 565 re-operates, advances the first selector shaft and wipers a second rotary step, and again opens the circuit to relay 530. The interaction between magnet 565 and relay 530 continues until wiper 529 encounters battery potential on the C contact of a bank contact set connected to an idle second selector or until wipers 527, 528 and 529 are advanced to the eleventh position of the banks. In the latter event, cam spring set 507 is operated, and busy tone is returned to the calling person at station A by way of armature spring 509 and condenser 505 to the "+" side of the transmission circuit. The operation of cam spring set 507 also completes a circuit to relay 550 from ground, armature 515, lower winding of relay 550, armature 558 and resting contact, armature spring 508, resistor 559 to battery, causing relay 550 to operate and lock over the circuit from ground, armature 515, armature 557 and working contact, upper winding of relay 550, winding of rotary magnet 565 to battery. The high resistance value of the upper winding of relay 550 prevents magnet 565 from operating over the circuit through the upper winding of relay 550. At armature 557, relay 550 opens the circuit to relay 530 and, therefore, the operating circuit to rotary magnet 565 remains open at armature 531 thereby preventing further rotation of the first selector shaft and wipers.

Assuming now that the second selector shown in Figure 6 is idle and has been selected by the first selector of Figure 5, then relay 550 of the first selector is caused to operate from ground, armature 515, lower winding of relay 550, interrupter armature 526, wiper 529, C bank contact connected to wiper 529, conductor 537, armature 633 and resting contact, armature spring 626, upper winding of relay 620 to battery. Relay 620 of the second selector also operates over the circuit just traced and, at armature 621 and working contact, connects the lower and upper windings of relay 600 together. At armature 557, relay 550 completes a locking circuit to its upper winding from ground, armature 515, armature 557 and working contact, upper winding of relay 550, winding of rotary magnet 565 to battery, the high resistance value of the upper winding of relay 550 preventing magnet 565 from operating: at armature 555, opens the circuit to vertical magnet 560: at armature 557, opens the circuit to relay 530: at armature 558 and working contact, short-circuits its lower winding thereby connecting direct ground through interrupter armature 526 to wiper 529 as a busy guard and also to retain the circuit through the upper winding of relay 620 of the second selector: at armature 554 connects a multiple ground to conductor 272 of the finder; and, at armatures 551, 552 and 553, extends the transmission circuit from station A to the selected second selector.

Responsive to the dialing of the second digit by the calling person, the circuit to line relay 500 of the first selector is now interrupted a number of times equal to the number of pulses in the second digit. Relay 500 restores momentarily for each pulse and, at armature 502, opens the circuit to hold relay 510. Relay 510, however, is of the slow-to-release type and, therefore, does not restore during the pulsing period. Consequently, the circuits controlled by relay 510 are not disturbed. At armature 502, relay 500 transmits a pulse to relay 540 for each de-energization from ground, armature 502 and resting contact, armature 514 and working contact, winding of relay 540 to battery. Relay 540 operates and opens the transmission circuit at armature 541, and since relay 540 is of the slow-to-release type, it does not restore during the pulsing period. At armature 501, relay 500 transmits a pulse to line relay 600 (Figure 6) of the second selector for each de-energization from ground, armature 501, armature 511 and working contact, armature 552, wiper 527, bank contact connected to wiper 527, conductor 535, lower winding of line relay 600 (Figure 6) of the second selector, armature 621 and working contact, upper winding of relay 600 to battery. Line relay 600 of the second selector, therefore, operates and restores for each de-energization and re-operation of line relay 500 of the first selector. At armature 601, relay 600 of the second selector transmits a pulse to vertical magnet 640 and to the lower winding of relay 620 for each de-energization of line relay 500 of the first selector. This multiple circuit may be traced from ground, armature 601, armature 623 and working contact, winding of magnet 640 to battery, and also through armature 601, armature 623 and working contact, lower winding of relay 620 to battery. Since line relay 620 was previously operated through its upper winding and is of the slow-to-release type, relay 620 does not restore during the pulsing period. At armature 622, relay 620 completes the circuit to relay 610 from ground on control conductor 537, armature 633 and resting contact, armature 622, winding of relay 610 to battery, causing relay 610 to operate and lock to ground on conductor 537, armature 633 and resting contact, armature 611, winding of relay 610 and battery. Magnet 640 operates and restores for each energization and de-energization of line relay 600, raising the shaft and wipers of the second selector a corresponding number of vertical steps. The V. O. N. spring set 625 operates with the first vertical step, disconnecting the upper winding of relay 620 from the conductor 537 at armature spring 626 but relay 620 remains locked through its lower winding. At armature 614, relay 610 connects ground potential to traffic register conductor 603 (traffic register not shown).

Shortly after the last pulse of the second digit has been received, relay 540 of the first selector restores and closes the transmission circuit from station A to the second selector at armature 541. Relay 620 of the second selector also restores at this time because its holding circuit through its lower winding is now open at armature 601, causing relay 600 to operate from ground, armature 612, armature 634 and resting contact, interrupter armature 651 of magnet 650, armature 621 and resting contact, upper winding of relay 600 to battery; and, at armature 623, completes the circuit to magnet 650 from ground, armature 601, armature 623 and resting contact, winding of magnet 650 to battery. Magnet 650 operates and rotates the shaft and wipers of the second selector one step in the bank level selected by the vertical pulsing. The operation of magnet 650 also opens the circuit to line relay (now step relay) 600 at interrupter armature 651, causing relay 600 to restore and open the circuit to magnet 650 at armature 601. Magnet 650 restores in turn and again completes the circuit to relay 600. The operation of the second selector at this moment is dependent upon whether the succeeding switch connected to the first bank contact set of the bank level selected by the vertical pulsing is in prior use or is idle.

Should the succeeding switch be idle, then wiper 618 of the second selector encounters battery supplied from the succeeding switch on the C contact of the first bank contact set, and a circuit for combined switching and holding relay 630 of the second selector is completed from ground, armature 613 and working contact, lower winding of relay 630, wiper 618, C bank contact connected to wiper 618, conductor 643 to battery supplied over conductor 643 from the succeeding switch, causing relay 630 to operate and prevent further rotary pulsing of the second selector. Should the succeeding switch be in prior use, then wiper 618 of the second selector encounters ground potential on the C contact of the first bank contact set and, consequently, relay 630 of the second selector cannot operate at this time. The circuit to the upper winding of relay 600 is, therefore, maintained at armature 634 and resting contact, causing relay 600 to re-operate and again complete the circuit to magnet 650. Magnet 650 re-operates, advances the second selector shaft and wipers a second rotary step, and again opens the circuit to relay 600. This interaction between magnet 650 and relay 600 continues until wiper 618 encounters battery potential on the C contact of a bank contact set connected to an idle succeeding switch or until wipers 616, 617 and 618 are advanced to the eleventh position of the banks. In the latter event, cam spring set 645 is operated, and busy tone is returned to the calling person at station A by way of armature spring 647 to the "+" side of the transmission circuit. The operation of cam spring set 645 also completes a circuit to relay 630 from ground, armature 613 and working contact, lower winding of relay 630, armature 636 and resting contact, armature spring 646, resistor 648 to battery, causing relay 630 to operate and lock over the circuit from ground on conductor 537, armature 633 and working contact, upper winding of relay 630, winding of rotary magnet 650 to battery. The high resistance value of the upper winding of relay 630 prevents magnet 650 from operating over the circuit through the upper winding of relay 630. At armature 634, relay 630 opens the circuit to the upper winding of relay 600 and, therefore, the operating circuit to rotary magnet 650 remains open at armature 601 thereby preventing further rotation of the second selector shaft and wipers.

The succeeding switch to the second selector may be another selector (known as a third selector) of the same type as the second selector, or it may be a connector switch of either the type shown in Figure 7 or the type shown in Figure 8. Should the succeeding switch be a third selector in the train, then the circuit arrangement of this third selector will be as shown in Figure 6, and the method of operation will be the same as just described for this second selector. It is, therefore, considered satisfactory for the purposes of this specification to indicate such a third selector by means of rectangle 780 in Figure 7 and omit a detail description for this third selector.

Assuming now that the connector shown in Figure 7 is the succeeding switch in the train and that this connector is idle, then combined switching and holding relay 630 of the second selector is caused to operate from ground, armature 613 and working contact, lower winding of relay 630, wiper 618, C bank contact connected to wiper 618, conductor 643 conductor 727 (Figure 7), armature spring 767, lower winding of relay 710 to battery. Relay 710 also operates over the circuit just traced. At armature 633, relay 630 completes a locking circuit to its upper winding from ground on conductor 537, the high resistance value of the upper winding of relay 630 preventing magnet 650 from operating: at armature 634, opens the circuit to the upper winding of relay 600, thereby preventing relay 600 from operating: at armature 633, opens the circuit to relay 610, thereby causing relay 610 to restore: at armature 636 and working contact, connects direct ground to wiper 618 as a busy guard and also to retain relay 710 of the connector in the operated position: at armature 637, connects a multiple ground to traffic register conductor 603; and, at armatures 631 and 632, extends the transmission circuit from station A to the selected connector switch.

At armature 712, relay 710 completes a locking circuit for itself from ground on conductor 727, armature 712 and working contact, upper and lower windings of relay 710 in series to battery: at armature 713, completes a circuit to transfer relay 720 from ground, armature 713, armature spring 772, armature spring 769 and resting contact, upper winding of relay 720 to battery, causing relay 720 to operate; and, at armature 715, connects ground potential to traffic register conductor 709 (traffic register not shown).

Responsive to the dialing of the third digit by the calling person, the circuit to line relay 500 of the first selector is now interrupted a number of times equal to the number of pulses in the third digit. Relay 500, restores momentarily for each pulse and, at armature 502, opens the circuit to relay 510 but relay 510 does not restore during the pulsing period. At armature 502, line relay 500 transmits a pulse to relay 540 for each de-energization causing relay 540 to operate and open the transmission circuit at armature 541. As previously explained, relay 540 does not restore during pulsing periods. At armature 501, line relay 500 transmits a pulse to line relay 700 (Figure 7) of the connector for each de-energization from ground, armature 501, armature 511 and working contact, armature 552, wiper 527, bank contact connected to wiper 527, conductor 535, armature 631, wiper 616, bank contact connected to wiper 616, conductor 641, conductor 725, upper winding of line relay 700 of the connector, armature 745 and resting contact, resistor 717 to battery. Relay 700 of the connector, therefore, operates and restores for each de-energization and re-operation of line relay 500 of the first selector. At armature 701, relay 700 transmits a pulse to vertical magnet 770 and to the lower winding of relay 720 for each de-energization of line relay 500 of the first selector. This multiple circuit may be traced from ground, armature 701, armature 747 and resting contact, armature 722, armature 763 and resting contact, armature spring 773, winding of magnet 770 to battery, and also through armature 701, armature 747 and resting contact, armature 722, lower winding of relay 720 to battery. Since relay 720 was previously energized through its upper winding, and is of the slow-to-release type, it does not restore during the pulsing period. Magnet 770 operates and restores for each energization and de-energization of relay 700, raising the shaft and wipers of the connector a corresponding number of vertical steps. The V. O. N. spring set 766 operates with the first vertical step, opening the circuit to the upper winding of relay 720 at armature spring 769, but relay 720 remains locked through its lower winding.

Shortly after the last pulse of the third digit has been received, relay 540 of this first selector restores and closes the transmission circuit from station A to the connector at armature 541. Relay 720 of the connector also restores at this time because its holding circuit through its lower winding is now open at armature 701, causing relay 760 to operate from ground, armature 713, armature spring 772, armature spring 769 and working contact, armature 724 and resting contact, upper winding of relay 760 to battery; and, at armature 722, opens the circuit to vertical magnet 770. At armature 765, relay 760 completes a circuit to relay 720 from ground, armature 713, armature spring 772, armature 765, upper winding of relay 720 to battery; and, at armature 763, transfers the pulsing circuit from vertical magnet 770 to rotary magnet 775. The re-operation of relay 720 completes a holding circuit to relay 760 independent of R. O. N. spring set 771 from ground, armatures 713, 764, armature 724 and working contact, upper winding of relay 760 to battery.

Responsive to the dialing of the fourth digit by the calling person, the circuit to line relay 500 of the first selector is now interrupted a number of times equal to the number of pulses in the fourth digit. Relay 500, restores momentarily for each pulse and, at armature 502, opens the circuit to relay 510 but relay 510 does not restore during the pulsing period. At armature 502, relay 500 transmits a pulse to relay 540 for each de-energization, causing relay 540 to operate and open the transmission circuit at armature 541. Relay 540 does not restore during pulsing periods. At armature 501, relay 500 transmits a pulse to line relay 700 of the connector for each de-energization over the circuit traced in a previous paragraph for the transmitting of the third digit. Line relay 700, therefore, operates and restores for each de-energization and re-operation of line relay 500 of the first selector. At armature 701, relay 700 transmits a pulse to rotary magnet 775 and to the lower winding of relay 720 for each de-energization of line relay 500 of the first selector. This multiple circuit may be traced from ground, armature 701, armature 747 and resting contact, armature 722, armature 763 and working contact, winding of magnet 775 to battery, and also through armature 701, armature 747 and resting contact, armature 722, lower winding of relay 720 to battery. Relay 720 does not restore during this pulsing period. Magnet 775 operates and restores for each energization and de-energization of line relay 700, rotating the shaft and wipers of the connector a corresponding number of rotary steps. The wipers 786, 787 and 788 are now resting on the connector bank multiple contacts of the dialed local station. The R. O. N. spring set 771 operates with the first rotary step, opening the circuit to the upper winding of relay 720 at armature spring 772, but relay 720 is maintained through its lower winding.

Shortly after the last pulse of the fourth digit has been received, relay 540 of the first selector restores and closes the transmission circuit from station A to the connector at armature 541. Relay 720 of the connector also restores at this time because its holding circuit through its lower winding is now open at armature 701, opening the locking circuit to the upper winding of relay 760 at armature 724; and, at armature 722, opening the pulsing circuit to rotary magnet 775. Relay 760 is of the slow-to-release type and, therefore, remains operated for a short interval during which the dialed station line is tested.

Should the dialed station line be in use, then wiper 788 will encounter ground potential on the connector bank multiple contact of the dialed station. Switching relay 730, therefore, cannot operate, and busy tone is supplied to calling station A (when relay 760 of the connector restores) through armature spring 774, armatures 761, 731, 751 and resting contact, condenser 708 and armature 721 to the negative side of the transmission circuit. Should the dialed station be idle, then wiper 788 of the connector will encounter battery from the cut-off relay of the dialed station on the connector bank multiple contact of the dialed station. A circuit is completed through relay 730 from ground, armatures 713, 764, 723, upper winding of relay 730, armature 748 and resting contact, lower winding of relay 730, wiper 788, C bank contact connected to wiper 788, connector bank multiple, winding of the cut-off relay of the dialed station to battery, causing relay 730 to operate and lock to ground, armatures 713, 736, lower winding of relay 730, wiper 788, C bank contact connected to wiper 788, connector bank multiple, winding of the cut-off relay of the dialed station and battery. The cut-off relay of the dialed station also operates over the circuits just traced, clearing the line of attachments.

The operation of relay 730 completes the ringing circuit to the dialed station from grounded generator conductor 777, armature 742 and resting contact, armature 734, wiper 787, "+" bank contact connected to wiper 787, ringer loop of the dialed station, "−" bank contact connected to wiper 786, wiper 786, armature 733, armature 741 and resting contact, upper winding of ringing cut-off relay 740, armature 752 and resting contact, armature 762 and working contact to conductor 778 connected to continuous generator. Relay 740 does not operate on A. C. ringing current through the ringer and condenser of the dialed station, but the ringer of the dialed station is operated immediately. Relay 760 restores after a short interval and transfers the ringing circuit from continuous generator conductor 778 to conductor 779 connected to interrupted generator and superimposed battery. The ringer of the dialed line is thereafter operated intermittently and automatically until the call is answered or abandoned . The calling person at station A receives ringback tone during the ringing periods through armature 732 and condenser 739.

Should the call remain unanswered and the calling person at station A decide to abandon the call, then (responsive to the returning of the handset to the cradle) the circuit to line relay 500 of the first selector is opened and relay 500 restores. At armature 502, relay 500 opens the circuit to relay 510 but before relay 510 restores, a momentary circuit is completed to relay 540 through armature 514 and working contact, causing relay 540 to operate. After a short interval relay 510 restores and then relay 540. At armature 515, relay 510 removes direct ground from wiper 529 to effect the release of the second selector: at armature 515, also removes ground from the upper winding of relay 550, thereby causing relay 550 to restore; and, at armature 513, removes ground from conductor 272 to effect the release of the finder and the cut-off relay 120 of calling station A. The circuit to release magnet 525 of the first selector is completed from ground, armature 502 and resting contact, armature 514 and resting contact, armature 542 and resting contact, armature 556, armature spring 516, winding of magnet 525 to battery. The operation of magnet 525 causes the restoration of the first selector in the well-known Strowger manner, and armature 526 of magnet 525 maintains the circuit to wiper 529 open during the release of the first selector. The circuit of magnet 525 is opened by armature spring 516 of V. O. N. spring set 524 as the switch shaft reaches its normal position.

The removal of ground from conductor 272 leading back to the finder opens the locking circuit through the upper winding of relay 220 of the finder, and also opens the circuit to cut-off relay 120 of the calling station. Relay 220 restores and completes the circuit to release magnet 255 of the finder from ground, armatures 236, 211 and associated resting contacts, armature spring 216 and working contact, armature 227 and resting contact, winding of magnet 255, conductor 494, winding of relay 470 (Figure 4–A) to battery. The operation of magnet 255 causes the finder to be restored to normal in the well-known Strowger manner, and the circuit to magnet 255 and relay 470 is opened by armature spring 216 of V. O. N. spring set 214 as the finder shaft reaches its normal position. The operation of relay 470 completes a circuit to a common delayed release alarm (not shown). The restoration of cut-off relay 120 of station A restores the line circuit to normal.

The release of the second selector is accomplished in the following manner:

The removal of ground from wiper 529 of the first selector (as recited in the release of the first selector) opens the locking circuit to the upper winding of relay 630 (Figure 6), causing relay 630 to restore. At armature 635, relay 630 completes the circuit to release magnet 605 from ground, armature 613 and resting contact, armature 635, armature spring 627, winding of magnet 605 to battery; and, at the working contact of armature 636, removes ground from wiper 618 and conductors 643 and 727 leading to the connector. The operation of release magnet 605 causes the second selector to be restored in the well-known Strowger manner, and the circuit of magnet 605 is opened by armature spring 627 of V. O. N. spring set 625 as the switch shaft reaches its normal position.

The release of the connector is accomplished in the following manner:

The removal of ground from conductor 727 (as recited in the release of the second selector) opens the locking circuit to relay 710 (Figure 7), causing relay 710 to restore. At armature 713, relay 710 opens the locking circuit to the lower winding of relay 730, causing relay 730 to restore: at armature 713, also removes ground from wiper 788, causing the cut-off relay of the dialed station to restore; and, at armature 715, removes ground from the traffic register conductor 709. At armature 738, relay 730 completes the circuit to release magnet 776 from ground, armatures 714, 738, armature spring 768, winding of magnet 776 to battery. The operation of release magnet 776 causes the connector to be restored to normal in the well-known Strowger manner, and the circuit of magnet 776 is opened by armature spring 768 of V. O. N. spring set 766 as the switch shaft reaches its normal position. The restoration of the cut-off relay of the dialed station returns the line circuit of the dialed station to normal.

Assuming now that instead of the calling person abandoning the call, the dialed station answers the call by lifting the handset from the cradle, then ringing cut-off relay 740 of the connector is operated over the D. C. loop of the dialed station. At armature 749, relay 740 locks through its lower winding from ground by way of armatures 713, 749, lower winding of relay 740 to battery: at armatures 741 and 742, opens the ringing circuit: at armatures 741 and 742 and associated working contacts, extends the dialed station's loop to battery and ground supplied through the upper and center windings of relay 750: at armatures 741 and 742 and associated working contacts, also extends the transmission circuit from station A to the dialed station; and, at armature 744, connects battery to the preceding switch (second selector) over the "+" conductor 726 from battery, resistor 717, armature 754 and resting contact, lower winding of relay 700, armatures 744 and 735 to conductor 726. Relay 750 operates over the listening circuit of the dialed station and, at armature 755, connects ground to the preceding switch (second selector) over the "−" conductor 725 via armatures 711, 755, armature 745 and working contact, upper winding of relay A and conductor 725. At armature 754, relay 750 removes battery from the lower winding of relay 700; and, at armature 754 and working contact, connects ground potential to the lower winding of relay 700 by way of armatures 711, 755, armature 745 and working contact and 754 and working contact. At armature 757, relay 750 connects a multiple ground to the lower winding of relay 740 by way of armature 737 and working contact, armature 749 to lower winding of relay 740. At armature 757, relay 750 also connects a multiple ground to wiper 788 by way of armature 737 and working contact, armature 736, and lower winding of relay 730. Transmission current is supplied to calling station A through the windings of line relay 500 of the first selector, and to the dialed station through the upper and center windings of relay 750 of the connector.

After the conversation has been terminated and both persons have returned their handsets to the respective cradles, registration of the call takes place (before the switches are released) in the following manner:

The loop circuit to line relay 500 of the first selector is opened when the calling person disconnects and relay 500 restores. At armature 502, relay 500 opens the circuit to relay 510 but before relay 510 restores, a circuit is completed to relay 540 through armature 514 and working contact. Relay 540, therefore, operates and, being slow to release, remains operated for a short period after relay 510 restores. As soon as relay 510 restores, a circuit to relay 520 is completed from ground, winding of relay 520, armature 512 and resting contact, armature 553, wiper 528, "+" bank contact connected to wiper 528, conductor 536, armature 632, wiper 617, "+" bank contact connected to wiper 617, conductor 642, conductor 726 (Figure 7), armatures 735, 744, lower winding of relay 700, armature 754 and resting contact, resistor 717 to battery, causing relay 520 to operate. At armature 521, relay 520 extends booster battery through resistor 523 and busy key 519 to conductor 272, armature 223 (Figure 2), upper winding of relay 220, wiper 265, bank contact connected to wiper 265, conductor 133 (Figure 1–A), armature 123, armature 111 and resting contact to the winding of the station register (not shown), causing the station register to operate. Rectifier 532 prevents the flow of current from the booster battery towards ground at armature 554. At armature 522 and working contact, relay 520 completes a circuit to relay 540 from ground, winding of relay 520, high resistance resistor 538, armature 522 and working contact, winding of relay 540 to battery in order to prolong the holding effect of relay 540 since the original circuit to relay 540 is now open at the working contact of armature 514. Relay 540, however, does not hold indefinitely on the circuit just traced through resistor 538 but restores after a short interval. At the working contact of armature 543, relay 540 opens the locking circuit to the upper winding of relay 550, and also removes ground from wiper 529 to the second selector. Relay 550 restores and opens the circuit to relay 520 at armature 553, causing relay 520 to restore after a short interval. At armature 522, relay 520 disconnects relay 540 from resistor 538, and, at armature 521, removes booster battery from the circuit of the calling station register, permitting the register to restore. Relays 540, 550 and 520 are sufficiently slow in restoring to provide adequate time to accomplish the registration of the call.

Should the called person at the dialed station fail to disconnect at the time the calling person at station A disconnects, then the registration of the call is delayed until the called person disconnects. The failure of the called person to disconnect prevents battery through resistor 717 being connected to the lower winding of relay 700 because armature 754 is connected to its working contact and, consequently, the ground through relay 520 (Figure 5) over the "+" conductor to the connector meets ground through armatures 711, 755, armatures 745, 754 and associated working contacts. Under this condition relay 520 cannot operate, and registration does not take place. Relay 540, however, is held operated from ground, armatures 711, 755, armature 745 and working contact, upper winding of relay 700, conductor 725, conductor 641 (Figure 6), "−" bank contact connected to wiper 616, wiper 616, armature 631, conductor 535, "−" bank contact connected to wiper 527 (Figure 5), wiper 527, armature 552, armature 511 and resting contact, armature 522 and resting contact, winding of relay 540 to battery. At armature 542, relay 540 retains the release circuit of the first selector open; and, at armature 543 and working contact, retains ground on wiper 529 to hold the second selector in the operated position. As soon as the called person at the dialed station disconnects, relay 750 in the connector restores, and battery is connected to the lower winding of relay 700 through resistor 717 and armature 754 and associated resting contact. Relay 520, therefore, operates, and the registration is effected in the manner described in the preceding paragraph.

After the call has been registered, the switches are restored to normal in the general manner previously described in this section for the instance where the calling person at station A abandoned the call because the dialed station did not answer.

Should the calling person be located at a P. B. X station such as station B (Figure 1–B) instead of at the individual station A (Figure 1–A), then the circuit arrangement of the associated line circuit is as shown in Figure 1–B instead of as in Figure 1–A. The line circuit of Figure 1–B differs from the line circuit of Figure 1–A in an additional armature 114 to the line relay 110', a working contact associated with armature 122' of the cut-off relay 120', and an extra control conductor (EC) to the connector bank multiple of the line circuit. The extra control conductor EC is grounded by armature 114 when line relay 110′ is operated, and also by the working contact of armature 122′ when cut-off relay 120′ is operated, for the purpose to be described in the section titled "Calls from main office stations to main office P. B. X lines." In all other respects, line circuits Figure 1–A and Figure 1–B are identical, and the foregoing description of a local call with the calling person at station A also applies when the calling person is located at station B with the minor exception that the working contact of armature 113′ is connected to contact #2 of vertical bank 250 instead of to contact #1.

Considering now the case where all finders in the first group are busy and another call is initiated on a line terminating in one of the levels of the first five levels in the first group of finders, then ground was removed from conductor 493 at the time the last finder was engaged, but relay 440 remained operated from the ground through armature 457. Relay 450 restored shortly thereafter and removed ground from relay 440, thereby causing relay 440 to restore. At armature 441, relay 440 switches conductor 480 from start relay 445 to start relay 445′ of the second group by way of conductor 476, armature 461′ and associated operated working contact (assuming that there is at least one free finder in the second group and relay 440′ accordingly operated). At armature 464, relay 440 disconnects contact #5 of the vertical banks 250′ in the second group of finders from conductor 477, thereby permitting finders of the second group to hunt through the second five levels of the second group. The mentioned initiated call in the first group of lines will now be picked up by a finder of the second group in a manner similar to that described earlier in this section for an initiated call, and the second group of finders will continue to serve calling lines in the first group of lines as long as there are no finders available in the first group of finders. The restoration of relay 440 also opens the circuit to magnet 300 of the associated allotter to prevent the allotter from searching for a free finder as long as no finder is available. As soon as a finder of the first group becomes free, relay 440 immediately re-operates from ground on conductor 493, and the first group of finders is thus automatically restored to service. Calling lines in the second group of lines are transferred to the first group of finders when all of the finders of the second group are busy, in a manner similar to that just described for the transferring of a calling line in the first group of lines to the second group of finders. When all of the finders in both the first and second groups are busy, relays 440 and 440′ both are restored, and the circuits to start relays 445 and 445′ are accordingly opened. Any call initiated in the period when relays 440 and 440′ are both in the restored position is, therefore, delayed until a finder in one of the groups becomes available.

Considering now the case where a finder in the first group is rotating across one of the first five levels in search of a calling line and neither C wipers 264 nor 265 encounter battery potential from the cut-off relay of the calling line, then the finder shaft and wipers are rotated to the eleventh position of the banks, thereby causing cam spring set 237 to operate. A circuit to the lower winding of relay 460 is completed from ground, armature 424, rectifier 459, lower winding of relay 460, conductor 483, armature 204, cam spring set 237, resistor 238 to battery, causing relay 460 to operate. At armature 461, relay 460 opens the circuit to magnet 245 to prevent further rotary action; and, at armature 461 and working contact, completes the circuit to the lower winding of relay 230, causing relay 230 to operate. At armature 236, relay 230 completes a circuit to magnet 300 of the allotter from ground, armature 236 and working contact, wiper 306, conductor 492, armature 456 and working contact, conductor 491, winding of magnet 300 to battery. Magnet 300 operates and opens the circuit of relay 450 at interrupter armature 301, causing relay 450 to restore and open the circuits to relays 420, 415, 430, 200 and magnet 300. The restoration of magnet 300 steps wipers 305 and 306 of the allotter to the next free finder. The restoration of relay 200 completes the circuit of the release magnet 255, and the finder is restored to normal position.

Considering now the case where the shaft and wipers of a finder in the first group are being lifted by the action of vertical magnet 240 and vertical wiper 253 fails to find ground on the first four levels of vertical bank 250, then ground on the fifth contact of bank 250, by way of armatures 429, 442, conductor 472, armature 464′, conductor 478, contact #6 of vertical bank 250′, and multiple conductor to contact 5 of vertical bank 250, causes the finder shaft and wipers to be rotated to the eleventh position of the banks. From this point on, the operations are the same as those described in the preceding paragraph.

The operation of the group relay transfer circuit will now be explained. In a previous paragraph of this section it was stated that the operation of timer relay 420 (as a result of the initiation of a call in the first group of lines) caused the connecting of ground potential to conductor 417 of transfer timer 438 by way of armature 421. This grounding of conductor 417 causes transfer timer 438 to operate and alternately connect ground potential pulses to conductors 418 and 419 extending from the timer. The ground pulses on conductors 418 and 419 are used for timing the correct operation of the finders and are so spaced as to not interfere with normal operation of the finders. Relay 420 is operated for very short periods of not more than half a second, as the operation of a finder is very rapid. If, however, abnormal conditions occur in the operation of a finder and the associated common relay group, this would indicate an unreasonable delay in a finder picking up a calling line, and relay 420 will remain operated beyond the usual normal period thereby causing the following operations. A ground pulse on conductor 418 completes a ciruit to the lower winding of relay 405 by way of armatures 422 and 412, causing relay 405 to operate and lock to ground by way of its upper winding and armature 407. At armature 460, relay 405 connects the upper winding of relay 410 to conductor 419 of the timer. After an additional time interval, timer 438 applies a ground pulse to conductor 419, thereby completing the circuit through the upper winding of relay 410 and causing relay 410 to operate and lock to the circuit from ground on conductor 493′ (assuming that a finder is available in the second group), armatures 409′, 408′, conductor 474, transfer reset key 403, armature 411, lower winding of relay 410 to battery. At armature 413, relay 410 completes an obvious circuit to relay 400, causing relay 400 to operate and lock to ground from transfer reset key 404: at armature 409, opens the circuit to relay 440, causing relay 440 to restore: completes a circuit to magnet 300 of the allotter by way of armature 414: and, at armature 414 also shunts down relay 450 thereby opening the locking circuit to relays 420 and 405. At armature 402, relay 400 completes an alarm supervisory circuit (not shown) for calling the attention of the office attendant to the transfer. The restoration of relay 440 transfers conductor 480 from start relay 445 to start relay 445' at armature 441; and, at armature 464, removes ground from contact #5 of vertical bank 250' of the finder in the second group to permit this finder to search in the upper five levels for the calling line of the first group of lines. Relay 445 restores and causes the release of magnet 300 of the allotter and of all operated relays in relay group Figure 4 except relays 400 and 410 which are locked to the transfer reset key. The restoration of magnet 300 causes the allotter to step wipers 305 and 306 off of the occupied finder in the first group. The calling line in the first group of lines which cause the timed transfer is now cared for by the second group of finders.

Under the conditions outlined in the preceding paragraph, relay 410 will remain operated until all of the finders in the second group become busy or the attendant restores the transfer reset key, and relay 400 will remain operated until the attendant restores the transfer reset key. When relay 410 restores, relay 440 will reoperate and transfer conductor 480 from start relay 445' to start relay 445.

Should all of the finders in the second group be in use at the time relay 410 operates, then relay 410 cannot be locked in the operated position because there would be no ground on conductor 493'. Relay 410, therefore, remains operated for the duration of the ground pulse on conductor 419 which, however, is sufficiently long to cause the stepping of allotter wipers 305 and 306 to another finder of the first group. When relay 410 restores at the termination of the ground pulse on conductor 419, relay 440 will re-operate and transfer conductor 480 from start relay 445' to start relay 445.

*Calls from main office stations to main office P. B. X lines*

The lines (Figure 1–B) of each P. B. X subscriber are so grouped together as to have succeeding numbers on the same level of the connector banks related to the P. B. X group, and the connector switches associated with these banks are arranged as shown in Figure 8 instead of as in Figure 7. All of the EC bank contacts of such a P. B. X group, except the one corresponding to the last number in the group, are connected to the corresponding EC conductors from the lines of the group. The purpose of the EC connector bank contacts and the related EC conductors from the P. B. X lines is to provide means for automatically selecting an idle one of the lines in the group in the following described manner.

On a local call for connection to a P. B. X line, the origination of the call, the operation of the finder, group relays, allotter, first selector and second selector are the same as described in the section titled "Calls from main office stations to main office individual lines" and, therefore, it is deemed unnecessary to repeat those parts of the description in this section.

Assuming now that the P. B. X connector shown in Figure 8 is idle and is to be used for completing the connection to the P. B. X lines (Figure 1–B), then combined switching and holding relay 630 of the second selector is caused to operate from ground, armature 613 and working contact, lower winding of relay 630, wiper 618, C bank contact connected to wiper 618, conductor 643 (Figure 6), conductor 827 (Figure 8), armature spring 867, lower winding of relay 810 to battery. Relay 810 also operates over the circuit just traced. At armature 636 and working contact, relay 630 connects direct ground to wiper 618 as a busy guard and also to retain hold relay 810 of the connector in the operated position. At armature 812, relay 810 completes a locking circuit for itself from ground on conductor 827, armature 812 and working contact, upper and lower windings of relay 810 to battery: at armature 813, completes a circuit to relay 820 from ground, armature 813, armature spring 872, armature spring 869 and resting contact, lower winding of relay 820 to battery, causing relay 820 to operate; and, at armature 815, connects ground potential to traffic register conductor 809 (traffic register not shown).

Responsive to the dialing of the third digit by the calling person, the circuit to line relay 500 of the first selector is now interrupted a number of times equal to the number of pulses in the third digit. Relay 500 restores momentarily for each pulse and at armature 502, opens the circuit to relay 510 but relay 510 does not restore during the pulsing period. At armature 502, relay 500 transmits a pulse to relay 540, causing relay 540 to operate and open the transmission circuit at armature 541. Relay 540 does not restore during the pulsing period. At armature 501, relay 500 transmits a pulse to line relay 800 (Figure 8) of the connector from ground, armature 501, armature 511 and working contact, armature 552, wiper 527, bank contact connected to wiper 527, conductor 535, armature 631, wiper 616, bank contact connected to wiper 616, conductor 641 (Figure 6), conductor 825 (Figure 8), upper winding of line relay 800 of the connector, armature 845 and resting contact, resistor 817 to battery. Relay 800, therefore, operates and restores for each deenergization and reoperation of line relay 500 of the first selector. At armature 801, relay 800 transmits a pulse to vertical magnet 870 and to the upper winding of relay 820 for each deenergization of line relay 500 of the first selector. This multiple circuit may be traced from ground, armature 801, armature 847 and resting contact, armature 893 and resting contact, armature spring 873, winding of magnet 870 to battery, and also through armature 801, armature 847 and resting contact, armature 822, upper winding of relay 820 to battery. Since relay 820 was previously energized through its lower winding, and is of the slow-to-release type, it does not restore during the pulsing period. Magnet 870 operates and restores for each energization and deenergization of relay 800, raising the shaft and wipers of the connector a corresponding number of vertical steps. The V. O. N. spring set 866 operates with the first vertical step, opening the circuit to the lower winding of relay 820 at armature spring 869, but relay 820 remains locked through its upper winding.

Shortly after the last pulse of the third digit has been received, relay 540 of the first selector restores and closes the transmission circuit from station A to the connector at armature 541. Relay 820 of the connector also restores at this time because its holding circuit through its upper winding is now open at armature 801, causing relay 890 to operate from ground, armature 813, armature spring 872, armature spring 869 and working contact, armature 824 and resting contact, lower winding of relay 890 to battery. At armature 894, relay 890 completes a circuit to relay 820 from ground, armature 813, armature spring 872, armature 894, lower winding of relay 820 to battery: at armature 895, completes the circuit to relay 860 from ground, armature 813, armature 895 and working contact, winding of relay 860 to battery, causing relay 860 to operate: at armature 893, transfers the pulsing circuit from vertical magnet 870 to rotary magnet 875; and, at armature 891, connects battery to wiper 889 through its upper winding. The re-operation of relay 820 completes a holding circuit to relay 890 independent of R. O. N. spring set 871 from ground, armature 813, armature 895 and working contact, armature 824 and working contact, lower winding of relay 890 to battery.

Responsive to the dialing of the fourth digit by the calling person, the circuit to line relay 500 of the first selector is now interrupted a number of times equal to the number of pulses in the fourth digit. Relay 500 restores momentarily for each pulse and, at armature 502, opens the circuit to relay 510 but relay 510 does not restore during the pulsing period. At armature 502, relay 500 transmits a pulse to relay 540, causing relay 540 to operate and open the transmission circuit at armature 541. Relay 540 does not restore during the pulsing period. At armature 501, relay 500 transmits a pulse to line relay 800 of the connector over the circuit traced in a previous paragraph for the transmitting of the third digit. Line relay 800, therefore, operates and restores for each de-energization and reoperation of line relay 500 of the first selector. At armature 801, relay 800 transmits a pulse to rotary magnet 875 and to the upper winding of relay 820 for each de-energization of line relay 500 of the first selector. This multiple circuit may be traced from ground, armature 801, armature 847 and resting contact, armature 893 and working contact, winding of magnet 875 to battery, and also armature 847 and resting contact, armature 822, upper winding of relay 820 to battery. Relay 820 does not restore during this pulsing period. Magnet 875 operates and restores for each energization and de-energization of relay 800, rotating the shaft and wipers of the connector a corresponding number of rotary steps. The wipers 886, 887, 888 and 889 are now resting on the connector bank multiple contacts of the first line circuit of the dialed P. B. X group. The R. O. N. spring set 871 operates with the first rotary step, opening the circuit to the lower winding of relay 820, but relay 820 is maintained through its upper winding.

Shortly after the last pulse of the fourth digit has been received, relay 540 of the first selector restores and closes the transmission circuit from station A to the connector at armature 541. Relay 820 of the connector also restores at this time because its holding circuit through its upper winding is now open at armature 801, opening the locking circuit to the lower winding of relay 890 at armature 824. Relay 890 is of the slow-to-release type and, therefore, remains operated for a short interval during which the first line of the P. B. X is tested.

Should the first line of the P. B. X be in prior use, then wiper 888 will encounter ground potential on the C connector bank multiple contact of the first line. Switching relay 830, therefore, cannot operate at this time. Wiper 889 will also encounter ground potential on the EC connector bank multiple contact of the first line, this ground potential being supplied from either armature 114 of line relay 110' (Figure 1–B) of the first line or armature 122' and working contact of cut-off relay 120'. The ground potential over EC wiper 889 energizes the upper winding of relay 890 before relay 890 can restore, thereby maintaining relay 890 in the operated position. Relay 800 is also operated from ground over EC wiper 889, armatures 891, 823, interrupter armature 859 of magnet 875, armature 819, armature 844 and resting contact, lower winding of relay 800, armature 854 and resting contact, resistor 817 to battery. At armature 801, relay 800 completes the circuit to rotary magnet 875 from ground, armature 801, armature 847 and resting contact, armature 893 and working contact, winding of magnet 875 to battery, causing magnet 875 to operate and rotate the shaft and wipers of the connector another rotary step to the bank contacts of the second line of the P. B. X group. At interrupter armature 859, magnet 875 opens the circuit to relay 800, causing relay 800 to restore and open the circuit to magnet 875 at armature 801. Magnet 875 restores in turn and again completes the circuit to relay 800. Assuming now that this P. B. X group consists of three line circuits, the operation of the connector at this moment is dependent upon whether the second line of the group is in prior use or is idle.

Should the second line be in prior use, then wiper 888 will encounter ground potential on the C connector bank multiple contact of the second line. Relay 830, therefore, cannot operate at this time. Wiper 889 will also encounter ground potential on the EC connector bank multiple contact of the second line, and the upper winding of relay 890 is energized by means of this latter ground potential before relay 890 restores. Relay 890 is, therefore, maintained in the operated position, and relay 800 is caused to re-operate and again complete the circuit to magnet 875. Magnet 875 re-operates, advances the shaft and wipers of the connector to the third, or last, line of the group, and again opens the circuit to relay 800. Relay 800 restores and again opens the circuit to magnet 875. Should the third line be in prior use, then wiper 888 will encounter ground potential on the C connector bank multiple contact of the third line, but wiper 889 will not encounter ground potential on the corresponding EC connector bank multiple contact because the third line is the last line in the group. Under these conditions, relay 830 cannot operate, relay 890 restores, and relay 800 cannot step magnet 875 to advance the shaft wipers from the bank contacts of the third line. Busy tone is supplied to the calling station through armature spring 874, armatures 861, 831, 851 and resting contact, condenser 898, and armature 821 to the negative side of the transmission circuit.

Assuming now that one of the three lines was idle when tested by the connector, then wiper 888 encounters battery from the cut-off relay of the free line on the C connector bank multiple contact of the free line, and wiper 889 does not encounter ground potential on the EC connector bank multiple contact of the free line. A circuit is then completed through relay 830 from ground, armature 813, armature 895 and resting contact (relay 890 having restored in the meantime), armature 863, upper winding of relay 830, armature 848 and resting contact, lower winding of relay 830, wiper 888, C contact connected to wiper 888, connector bank multiple, winding of the cut-off relay of the free line to battery, causing relay 830 to operate and lock to ground, armatures 813, 835, lower winding of relay 830, wiper 888, C bank contact connected to wiper 888, connector bank multiple, winding of the cut-off relay of the selected line to battery. The cut-off relay of the selected line also operates over the circuits just traced, clearing the line of attachments.

The description of the completion of the ringing circuit, the signalling of the selected line of the P. B. X group, and the answering of the call at the selected line is the same as that detailed for the individual-line connector in the section titled "Calls from main office stations to main office individual station lines" with the minor exception that the first digit in each reference number is "8" instead of "7." It is, therefore, believed unnecessary to repeat these details.

The registration of the call, the release of the first selector and the release of the second selector are the same as for the connection described in the section titled "Calls from main office stations to main office individual station lines." The release of the P. B. X line connector is the same as for the individual-line connector in the section titled "Calls from main office stations to main office individual station lines" with the minor exception that the first digit in each reference number is "8" instead of "7." These details will, therefore, not be repeated in this section.

*Local calls in branch office*

In order to describe a branch office local call in detail, it is assumed that station C (Figure 11) originates a call for another station in the same branch office. It is also assumed that wipers 1124, 1125 and 1126 of finder 1108 have found and connected with line circuit 1107 of station C in a manner similar to that described in the section titled "Calls from main office stations to main office individual station lines." It is further assumed that wipers 1237, 1238 and 1239 of the out trunk finder (Figure 12) are standing on a trunk to an idle out trunk circuit such as shown in Figure 13. Under these conditions, line relay 1100 of the switching selector is held operated over the calling loop of station C. At armature 1102, relay 1100 completes an obvious circuit to hold relay 1110, causing relay 1110 to operate. At armature 1113, relay 1110 connects ground potential to conductor 1129 by way of conductor 1190, armatures 1215, 1255, conductor 1189, rectifier 1137 and busy key 1109 to hold finder 1108 and the cut-off relay of line circuit 1107 operated. Relay 1110 also completes a circuit to relay 1230 from ground, armature 1115, conductor 1200, armature 1257 and resting contact, armature spring 1247 and resting contact, lower winding of relay 1230 to battery, causing relay 1230 to operate. At armature 1235, relay 1230 completes a circuit to relay 1210 from ground, armature 1135 and resting contact, conductor 1205, armature 1235, upper winding of relay 1210, wiper 1239, bank contact connected to wiper 1239, to battery supplied over the C conductor of the out trunk circuit related to the mentioned bank contact, causing relay 1210 to operate and lock to ground by way of armature 1115, resting contact of armature 1172, armatures 1156, 1167, conductor 1206, armature 1218 and working contact, and lower winding of relay 1210. The application of ground through the upper winding of relay 1210 to wiper 1239 causes the idle out trunk circuit connected to wipers 1237, 1238 and 1239 to be seized in the manner described in the section titled "Calls from branch office to main office." At armature 1219, relay 1210 connects direct ground to wiper 1239 as a busy guard and also to retain the seized out trunk circuit. At armature 1216, relay 1210 completes a circuit to relay 1130 from ground, armature 1113 and working contact, conductor 1190, armature 1216, conductor 1191, upper winding of relay 1130 to battery, causing relay 1130 to operate and lock to ground by way of armature 1113 and working contact, and armature 1132. At armatures 1212 and 1213, relay 1210 extends the transmission circuit from calling station C to the seized out trunk circuit by way of wipers 1237 and 1238. At armature 1131, relay 1130 returns dial tone to the calling person through armature 1131 and working contact, resting contact of armature 1141, conductor 1185, armature 1232 and working contact, conductor 1184, lower winding of relay 1100, conductor 1128, wiper 1125, conductor 1118, line circuit 1107 to the listening circuit of station C. Upon hearing the well-known dial tone, the calling person dials the number of the desired local station.

Assuming now that the number of the desired local station is 50,1599 and that the discrimination in the switching selector between a local number and a main office number occurs after the second digit, then the right normal post spring set 1147 is adjusted to make contact when the switch shaft reaches the fifth level (the first digit of the local number being 5), and the left normal post spring set 1148 is adjusted to make contact when the switch shaft reaches the tenth level (the second digit of the local number being 0). Responsive to the dialing of the first digit (5), the circuit to relay 1100 of the switching selector is interrupted five times. Relay 1100 restores momentarily for each pulse and, at armature 1102, opens the circuit to hold relay 1110. Relay 1110, however is of the slow-to-release type and, therefore, does not restore during the pulsing period. Consequently, the circuits controlled by relay 1110 are not disturbed. At armature 1102 and resting contact, relay 1100 transmits a pulse to vertical magnet 1260, relay 1240 and the upper winding of relay 1230 for each de-energization. This multiple circuit may be traced from ground, armature 1102 and resting contact, armature 1114, conductor 1180, armature 1231, winding of magnet 1260 to battery: from ground, armature 1102 and resting contact, armature 1114, conductor 1180, winding of relay 1240 to battery; and from ground, armature 1102 and resting contact, armature 1114, conductor 1180, armature 1231, upper winding of relay 1230 to battery. Relay 1240 operates and, since it is of the slow-to-release type, it does not restore during the pulsing period. At armature 1244, relay 1240 connects a multiple ground to the upper winding of relay 1130. Relay 1230 is also of the slow-to-release type and, therefore, does not restore during pulsing after the circuit to its lower winding is opened by armature spring 1247 of V. O. N. spring set 1245. Magnet 1260 operates and restores for each de-energization and re-operation of relay 1100, raising the shaft and wipers of the switching selector a corresponding number of vertical steps (in this instance the shaft and wipers are raised to the fifth level). The V. O. N. spring set 1245 operates with the first vertical step, opening the circuit to the lower winding of relay 1230 at armature spring 1247, but relay 1230 is held through its upper winding and slow release action during the pulsing.

Shortly after the last pulse of the first digit has been received, relays 1240 and 1230 restore. At the resting contact of armature 1232, relay 1230 replaces dial tone with direct ground. At armature 1234, relay 1230 completes a circuit to release magnet 1275 from ground, armature 1234, conductor 1194, armature 1142 and resting contact, right normal post spring set 1147 (now operated because the switch shaft has been raised to the fifth level), armature 1133, conductor 1196, winding of magnet 1275 to battery. The operation of magnet 1275 causes the shaft of the switching selector to drop by gravity to the normal position, and the circuit of magnet 1275 is opened at right normal post spring set 1147. The V. O. N. spring set 1245 is returned to normal position as the switch shaft reaches its normal position. The operation of magnet 1275 also completes a circuit to relay 1140 from ground, armature 1115, conductor 1200, armature 1277 and working contact, conductor 1198, armature 1144 and resting contact, upper winding of relay 1140 to battery; and a second circuit to relay 1140 from ground, armature 1115, conductor 1200, armature 1277 and working contact, conductor 1198, armature 1144 and resting contact, lower winding of relay 1140, armature 1145 and resting contact, armature 1154 and resting contact, armature 1164, resistor 1168 to battery. Relay 1140, however, cannot operate over the two circuits just traced because its two windings are energized in opposite directions. The opening of the two circuits to the windings of relay 1140 at armature 1277 by the restoration of magnet 1275 causes a momentary magnetic unbalance between the two windings of relay 1140 and, consequently, relay 1140 operates and locks over the circuit from ground, armatures 1115, 1146, lower and upper windings of relay 1140 in series to battery. The restoration of V. O. N. spring set 1245 completes a circuit to relay 1230 from ground, armature 1115, conductor 1200, armature 1257 and resting contact, armature spring 1247 and resting contact, lower winding of relay 1230 to battery, causing relay 1230 to re-operate and maintain direct ground on the lower winding of relay 1100 by way of armature 1141 and working contact, conductor 1185, armature 1232 and working contact, and conductor 1184.

Responsive to the dialing of the second digit (0), the circuit to relay 1100 is interrupted ten times, and pulses are correspondingly transmitted to vertical magnet 1260, relay 1240 and the upper winding of relay 1230 from ground and the resting contact of armature 1102. Relays 1240 and 1230 do not restore during the pulsing. Magnet 1260 operates and restores for each pulse, raising the shaft and wipers of the switching selector to the tenth level of the banks.

Shortly after the last pulse of the second digit has been received, relay 1230 and 1240 restore. At the resting contact of armature 1232, relay 1230 maintains direct ground on the lower winding of relay 1100; and, at armature 1234, completes a circuit to release magnet 1275 from ground, armature 1234, conductor 1194, armature 1142 and working contact, left normal post spring set 1148 (now operated because the switch shaft has been raised to the tenth level), armature 1151 and resting contact, armature 1133, conductor 1196, winding of magnet 1275 to battery. The operation of magnet 1275 causes the shaft of the switching selector to drop by gravity to the normal position, and the circuit of magnet 1275 is opened at left normal post spring set 1148. The V. O. N. spring set 1245 is returned to normal position as the switch shaft reaches its normal position. The operation of magnet 1275 also completes a circuit to relay 1150 from ground, armature 1115, conductor 1200, armature 1277 and working contact, conductor 1198, armature 1144 and working contact, armature 1153 and resting contact, upper winding of relay 1150 to battery; and a second circuit to relay 1150 from ground, armature 1115, conductor 1200, armature 1277 and working contact, conductor 1198, armature 1144 and working contact, armature 1153 and resting contact, lower winding of relay 1150, armature 1145 and working contact, armature 1154 and resting contact, armature 1164, resistor 1168 to battery. Relay 1150, however, does not operate because its two windings are energized in opposite directions. The opening of the two circuits to relay 1150 at armature 1277 by the restoration of magnet 1275 causes a momentary magnetic unbalance between the two windings of relay 1150, and, consequently, relay 1150 operates and locks over the circuit from ground, armature 1115, armature 1155, lower and upper windings of relay 1150 in series to battery. At armature 1156, relay 1150 opens the locking circuit to the lower winding of relay 1210, causing relay 1210 to restore The restoration of relay 1210 disconnects the transmission circuit from the outgoing trunk at armatures 1212 and 1213; and, at armature 1219, removes ground from wiper 1239 to free the seized out trunk circuit. The restoration of V. O. N. spring set 1245 completes a circuit to relay 1230 from ground, armature 1115, conductor 1200, armature 1257 and resting contact, armature spring 1247 and resting contact, lower winding of relay 1230 to battery, causing relay 1230 to re-operate and maintain direct ground on the lower winding of relay 1100 by way of armature 1141 and working contact, conductor 1185, armature 1232 and working contact, and conductor 1184.

Responsive to the dialing of the third digit (1), the circuit to relay 1100 is interrupted once. Relay 1100 restores momentarily once and, at armature 1102, opens the circuit to relay 1110 but relay 1110 does not restore. At armature 1102 and resting contact, relay 1100 transmits a pulse to vertical magnet 1260, relay 1240 and the upper winding of relay 1230 over the multiple circuit described in a previous paragraph relating to the pulsing of the first digit. Neither relay 1240 nor relay 1230 restore as a result of this pulse. Magnet 1260 operates and restores, raising the shaft and wipers of the switching selector one vertical step.

Shortly after the pulse of the third digit has been received, relays 1240 and 1230 restore. At the resting contact of armature 1232, relay 1230 maintains direct ground on the lower winding of relay 1100. At armature 1234, relay 1230 completes a circuit to relay 1160 from ground, armature 1234, conductor 1194, armature 1162 and resting contact, wiper 1139 of vertical bank 1138, contact #1 of vertical bank 1138, armature 1152, conductor 1197, armature 1276, conductor 1202, lower and upper windings of relay 1160 in series to battery, causing relay 1160 to operate and lock to the circuit from ground, armatures 1115, 1165, lower and upper windings of relay 1160 in series and battery. At armature 1231, relay 1230 opens the circuit to its upper winding and also to vertical magnet 1260. At armature 1166, relay 1160 completes the circuit to relay 1220 from ground, armature 1115, conductor 1200, armature 1257 and resting contact, armature spring 1247 and working contact, conductor 1201, armature 1166, conductor 1204, interrupter armature 1266, winding of relay 1220 to battery, causing relay 1220 to operate. The switching selector is now ready to rotate its wipers to select an idle local second selector.

The operation of relay 1220 completes the circuit to rotary magnet 1265 from ground, armature 1234, conductor 1194, armature 1162 and working contact, conductor 1195, armature 1221, winding of magnet 1265 to battery. Magnet 1265 operates and rotates the shaft and wipers of the switching selector one step in the first bank level (level one selected by the pulsing of the third digit). The operation of magnet 1265 also opens the circuit to relay 1220 at interrupter armature 1266, causing relay 1220 to restore and open the circuit to magnet 1265 at armature 1221. Magnet 1265 restores in turn and again completes the circuit to relay 1220. The operation of the switching selector at this moment is dependent upon whether the second selector connected to the first bank contact set of the first level is in prior use or is idle.

Should the second selector be idle, then wiper 1229 of the switching selector encounters battery supplied from the second selector on the C contact of the first bank contact set, and a circuit for relay 1250 is completed from ground, armature 1115, conductor 1200, armature 1277 and resting contact, upper winding of relay 1250, wiper 1229, C bank contact connected to wiper 1229 to battery supplied from the second selector to the mentioned bank contact, causing relay 1250 to operate and prevent further rotary pulsing of the switching selector by opening the circuit to relay 1220 at armature 1257. Should the second selector be in prior use, then wiper 1229 of the switching selector encounters ground potential on the C contact of the first bank contact set and, consequently, relay 1250 of the switching selector cannot operate at this time. The circuit to relay 1220 is, therefore, maintained at armature 1257 and resting contact, causing relay 1220 to re-operate and again complete the circuit to magnet 1265. Magnet 1265 re-operates, advances the switch shaft and wipers a second rotary step, and again opens the circuit to relay 1220. This interaction between magnet 1265 and relay 1220 continues until wiper 1229 encounters battery potential on the C contact of a bank contact set connected to an idle second selector or until wipers 1227, 1228 and 1229 are advanced to the eleventh position of the banks. In the latter event, cam spring set 1225 is operated, and busy tone is returned to the calling person at station C by way of armature spring 1223 and condenser 1105 to the "+" side of the transmission circuit. The operation of cam spring set 1225 also completes a circuit to relay 1250 from ground, armature 1115, conductor 1200, armature 1277 and resting contact, upper winding of relay 1250, armature 1258 and resting contact, armature spring 1224, resistor 1226 to battery, causing relay 1250 to operate and lock over the circuit from ground, armature 1115, conductor 1200, armature 1257 and working contact, lower winding of relay 1250, winding of rotary magnet 1265 to battery. The high resistance value of the lower winding of relay 1250 prevents magnet 1265 from operating over the circuit through the lower winding of relay 1250. At armature 1257, relay 1250 opens the circuit to relay 1220 and, therefore, the operating circuit to rotary magnet 1265 remains open at armature 1221 thereby preventing further rotation of the shaft and wipers of the switching selector.

Assuming now that the second selector shown in Figure 6 is located in the branch office, is idle and has been selected by the switching selector of Figures 11 and 12, then relay 1250 of the switching selector is caused to operate through its upper winding in the manner described in the fore part of the preceding paragraph. At armature 1257, relay 1250 completes a locking circuit to its lower winding from ground, armature 1115, multiple ground, armature 1135, conductor 1200, armature 1257 and working contact, lower winding of relay 1250, winding of magnet 1265 to battery, the high resistance value of the lower winding of relay 1250 preventing magnet 1265 from operating: at armature 1257, opens the circuit to relay 1220: at armature 1258 and working contact, short-circuits its upper winding thereby connecting direct ground through armature 1277 and resting contact to wiper 1229 as a busy guard and also to complete the circuit of the upper winding of relay 620 of the second selector: at armature 1254, connects a multiple ground to conductor 1129 of line finder 1108; and, at armature 1252 and 1253, extends the transmission circuit from station C to the selected second selector.

Responsive to the dialing of the fourth digit (5), the circuit to relay 1100 is interrupted five times, and pulses are correspondingly transmitted to relay 1240 from ground and the resting contact of armature 1102. Relay 1240 operates with the first pulse and opens the transmission circuit to the second selector at armature 1241. At armature 1101, relay 1100 transmits a pulse to line relay 600 (Figure 6) of the second selector for each de-energization from ground, armature 1101, armature 1111 and working contact, conductor 1181, armature 1252, wiper 1227, bank contact connected to wiper 1227, conductor 1285, conductor 535, lower winding of relay 600 of the second selector, armature 621 and working contact, upper winding of relay 600 to battery. Line relay 600 of the second selector, therefore, operates and restores for each de-energization and re-operation of line relay 1100 of the switching selector. From this point on, the description of the operation of the second selector is the same as that included in the section titled "Calls from main office stations to main office individual station lines" and, therefore, it is unnecessary to repeat these details in this section.

Assuming now that the connector shown in Figure 7 is the succeeding switch in the main office train to the second selector shown in Figure 6, and that this connector is idle, then relay 630 of the second selector is caused to operate from ground, armature 613 and working contact, lower winding of relay 630, wiper 618, C bank contact connected to wiper 618, conductor 643, conductor 727 (Figure 7), armature spring 767, lower winding of relay 710 to battery. Relay 710 also operates over the circuit just traced. At armature 633, relay 630 completes a locking circuit to its upper winding from ground on conductor 537, armature 633 and working contact, upper winding of relay 630, winding of magnet 650 to battery, the high resistance value of the upper winding of relay 630 preventing magnet 650 from operating: at armature 634, opens the circuit to the upper winding of relay 600: at armature 633, opens the circuit to relay 610, causing relay 610 to restore: at armature 636 and working contact, connects direct ground to wiper 618 as a busy guard and also to retain relay 710 of the connector in the operated position: at armature 637, connects a multiple ground to traffic register conductor 603; and, at armature 631 and 632, extends the transmission circuit from station C to the selected connector switch.

Hold relay 710 of the connector operates as recited in the preceding paragraph. At armature 712, relay 710 completes a locking circuit for itself from ground on conductor 727, armature 712 and working contact, upper and lower windings of relay 710 in series to battery: at armature 713, completes a circuit to relay 720 from ground, armature 713, armature spring 772, armature spring 769 and resting contact, upper winding of relay 720 to battery, causing relay 720 to operate; and, at armature 715, connects ground potential to traffic register conductor 709 (traffic register not shown).

Responsive to the dialing of the fifth digit (9), the circuit to relay 1100 of the switching selector is interrupted nine times, and pulses are correspondingly transmitted to relay 1240 from ground and the resting contact of armature 1102. Relay 1240 operates with the first pulse and opens the transmission circuit at armature 1241. At armature 1101, relay 1100 transmits a pulse to line relay 700 of the connector for each de-energization from ground, armature 1101, armature 1111 and working contact, conductor 1181, armature 1252, wiper 1227, bank contact connected to wiper 1227, conductor 1285, conductor 535, armature 631, wiper 616, bank contact connected to wiper 616, conductor 641, conductor 725, upper winding of relay 700 of the connector, armature 745 and resting contact, resistor 717 to battery. Line relay 700 of the connector, therefore, operates and restores for each de-energization and re-operation of line relay 1100 of the switching selector. At armature 701, relay 700 transmits a pulse to vertical magnet 770 and to the lower winding of relay 720 for each de-energization of line relay 1100 of the switching selector. This multiple circuit may be traced from ground, armature 701, armature 747 and resting contact, armature 722, armature 763 and resting contact, armature spring 773, winding of magnet 770 to battery, and also through armature 722, lower winding of relay 720 to battery. Since relay 720 was previously energized through its upper winding, and is of the slow-to-release type, it does not restore during the pulsing period. Magnet 770 operates and restores for each energization and de-energization of relay 700, raising the shaft and wipers of the connector to the ninth level. The V. O. N. spring set 766 operates with the first vertical step, opening the circuit to the upper winding of relay 720 at armature spring 769, but relay 720 remains locked through its lower winding.

Shortly after the last pulse of the fifth digit has been received, relay 1240 of the switching selector restores and closes the transmission circuit from station C to the connector at armature 1241. Relay 720 of the connector also restores at this time because its holding circuit through its lower winding is now open at armature 701, causing relay 760 to operate from ground, armature 713, armature spring 772, armature spring 769 and working contact, armature 724 and resting contact, upper winding of relay 760 to battery; and, at armature 722, opens the circuit to vertical magnet 770. At armature 765, relay 760 completes a circuit to relay 720 from ground, armature 713, armature spring 772, armature 765, upper winding of relay 720 to battery; and, at armature 763, transfers the pulsing circuit from vertical magnet 770 to rotary magnet 775. The re-operation of relay 720 completes a holding circuit to relay 760 independent of R. O. N. spring set 771 from ground, armatures 713, 764, armature 724 and working contact, upper winding of relay 760 to battery.

Responsive to the dialing of the sixth digit (9), the circuit to relay 1100 of the switching selector is interrupted nine times. From this point on, the operation of the connector on this last digit 9 is similar to the description of the fourth digit (last digit) in the section titled "Calls from main office stations to main office individual station lines" and, therefore, it is unnecessary to repeat these details in this section. When the dialed station (501599) answers the call, transmission current is supplied to calling station C through the windings of line relay 1100 of the switching selector, and to the dialed station through the upper and center windings of relay 750 of the connector.

Assuming further that the conversation has been terminated and both persons have returned their handsets to the respective cradles, registration of the call takes place (before the switches are released) in the following manner:

The loop to line relay 1100 of the switching selector is opened when the calling person disconnects, and relay 1100 restores. At armature 1102, relay 1100 opens the circuit to relay 1110 but before relay 1110 restores, a circuit is completed to relay 1240 through armature 1114 and working contact. Relay 1240, therefore, operates and, being slow to release, remains operated for a short period. As soon as relay 1110 restores, a circuit to relay 1120 is completed from ground, winding of relay 1120, armature 1112 and resting contact, conductor 1188, armature 1253, wiper 1228, "+" bank contact connected to wiper 1228, conductor 1286, conductor 536, armature 632, wiper 617, "+" bank contact connected to wiper 617, conductor 642, conductor 726, armature 735, armature 744, lower winding of relay 700, armature 754 and resting contact, resistor 717 to battery, causing relay 1120 to operate. At armature 1121, relay 1120 extends booster battery through resistor 1123 and busy key 1109 to conductor 1129 leading to wiper 1126 of finder 1108, and from wiper 1126 over conductor 1119 to line circuit 1107 for operating the station register of station C in a manner similar to that explained for registering the call of station A in the section titled "Calls from main office stations to main office individual station lines." Rectifier 1137 prevents the flow of current from the booster battery towards ground at armatures 1254 and 1113. The restoration of relay 1110 also removes ground from conductor 1129 of finder 1108 at armature 1113, ground from the upper winding of relay 1130 at armature 1113, and ground from the lower winding of relay 1250 at armature 1115, but ground is retained on conductor 1129 at armature 1254, on the upper winding of relay 1130 at armature 1244, and on the lower winding of relay 1250 at armature 1135 and working contact. The restoration of relay 1240 opens the circuit to the upper winding of relay 1130 at armature 1244, and relay 1130 restores after a short period. At armature 1135, relay 1130 opens the circuit to the lower winding of relay 1250, causing relay 1250 to restore after a short period. At armature 1253, relay 1250 opens the circuit to relay 1120, causing relay 1120 to restore after a short period. At armature 1121, relay 1120 removes booster battery from the previously traced circuit of the station C register, permitting the register to restore. Relays 1240, 1130, 1250 and 1120 are sufficiently slow in restoring to provide adequate time to accomplish the registration of the call.

Should the called person at the dialed station fail to disconnect at the time the calling person at station C disconnects, then the registration of the call is delayed until the called person disconnects. The failure of the called person to disconnect prevents battery through resistor 717 being connected to the lower winding of relay 700 because armature 754 is connected to its working contact and, consequently, the ground through relay 1120 over the "+" conductor to the connector meets ground through armatures 711, 755, armatures 745, 754 and associated working contacts. Under this condition, relay 1120 cannot operate, and registration does not take place. Relay 1240, however, is held operated from ground, armatures 711, 755, armature 745 and working contact, upper winding of relay 700, conductor 725, conductor 641, "—" bank contact connected to wiper 616, wiper 616, armature 631, conductor 535, conductor 1285, "—" bank contact connected to wiper 1227, wiper 1227, armature 1252, conductor 1181, armature 1111 and resting contact, armature 1122, conductor 1180, winding of relay 1240 to battery. At armature 1242, relay 1240 retains the release circuit of the switching selector open; and at armature 1244, retains the locking circuit to relay 1130. Relay 1130, therefore, remains operated, and ground through armature 1135 and working contact retains relay 1250 in the locked position. At armature 1258 and working contact, relay 1250 retains ground from armature 1135 and working contact on wiper 1229 to hold the second selector in the operated position. Responsive to the called person at the dialed station disconnecting, relay 750 in the connector restores, and battery is connected to the lower winding of relay 700 through resistor 717 and armature 754 and associated resting contact. Relay 1120, therefore operates, and the registration is effected in the manner described in the preceding paragraph.

After the call has been registered, the switches are restored to normal in the following manner:

The loop circuit to line relay 1100 of the switching selector is opened when the calling person at station C disconnects, and relay 1100 restores. At armature 1102, relay 1100 opens the circuit to relay 1110 but before relay 1100 restores, a momentary circuit is completed to relay 1240 through armature 1114, causing relay 1240 to operate. After a short interval, relay 1110 restores and then relay 1240. At armature 1113, relay 1110 removes ground from conductor 1129 to effect the release of finder 1108 and the cut-off relay of calling station C in a similar manner to that explained in the section titled "Calls from main office stations to main office individual station lines." At the time relay 1130 was released in connection with the registering of the call, relay 1130 removed one ground from the locking circuit of relay 1250, and when relay 1110 restored, the remaining ground was removed from the locking circuit of relay 1250, causing relay 1250 to restore. The restoration of relay 1130 also removed ground from wiper 1229 to effect the release of the second selector. The circuit to release magnet 1275 of the switching selector is now complete from ground, armatures 1242, 1259, 1217, conductor 1203, armature 1134 and resting contact, conductor 1199, armature spring 1246, winding of magnet 1275 to battery. The operation of magnet 1275 causes the restoration of the switching selector in the well-known Strowger manner, and armature 1277 of magnet 1275 maintains the circuit to wiper 1229 open during the release of the switching selector. The circuit of magnet 1275 is opened by armature spring 1246 of V. O. N. spring set 1245 as the switch shaft reaches its normal position. The release of the second selector (Figure 6) and the connector (Figure 7) is accomplished in the general manner described in the section titled "Calls from main office stations to main office individual station lines" for the instance where the calling person at station A abandoned the call. It is, therefore, unnecessary to repeat these details in this section.

It should be understood that while the connection described in this section utilizes the connector shown in Figure 7, the P. B. X connector shown in Figure 8 and described in the section titled "Calls from main office stations to main office P. B. X lines" may be equally as well substituted for the connector of Figure 7 in this section.

*Calls from branch office to main office*

In order to describe a call from a local station in a branch office to a station in the main office, it is assumed that station C (Figure 11) originates a call for a station in the main office. It is also assumed that wipers 1124, 1125 and 1126 of finder 1108 have found and connected with line circuit 1107 of station C in a manner similar to that described in the section titled "Calls from main office stations to main office individual station lines." It is further assumed that wipers 1237, 1238 and 1239 of the out trunk finder (Figure 12) are standing on a trunk leading to an idle out trunk circuit such as is shown in Figure 13, and that the out trunk circuit of Figure 13 is directly connected to an incoming first selector in the main office such as is shown in Figure 14.

Under the conditions outlined in the preceding paragraph, line relay 1100 of the switching selector is held operated over the calling loop of station C, and relay 1330 of the out trunk circuit is held operated over the loop from ground, armature 1422 and resting contact, armature 1412 and resting contact, armature 1435, armature spring 1427 and resting contact, conductor 1303, armature 1311 and resting contact, resistor 1315, armature 1342, resting contact of armature 1321, resting contact of armature 1343, upper winding of relay 1330, resting contact of armature 1341, conductor 1300, upper winding of relay 1400, armature spring 1426 and resting contact, lower winding of relay 1400 to battery. The high resistance value of the upper winding of relay 1330 prevents the operation of relay 1400 over the circuit just traced. Registor 1315 is provided in the "+" side of the trunk circuit in order that the resistance of the trunk circuit may be adjusted to a required value. At armature 1102, relay 1100 completes an obvious circuit to relay 1110, causing relay 1110 to operate. At armature 1113, relay 1110 connects ground potential to conductor 1129 by way of conductor 1190, armatures 1215, 1255, conductor 1189, rectifier 1137 and busy key 1109 to retain finder 1108 and the cut-off relay of line circuit 1107 operated. Relay 1110 also completes a circuit to relay 1230 from ground, armature 1115, conductor 1200, armature 1257 and resting contact, armature spring 1247 and resting contact, lower winding of relay 1230 to battery, causing relay 1230 to operate. At armature 1235, relay 1230 completes a circuit to relay 1210 from ground, armature 1135 and resting contact, conductor 1205, armature 1235, upper winding of relay 1210, wiper 1239, bank contact connected to wiper 1239, conductor 1302, armature 1345 and resting contact, upper winding of relay 1310, armature 1321 and resting contact, lower winding of relay 1330 to battery. The circuit through the upper winding of relay 1310 and the lower winding of relay 1330 to battery is multipled to battery through resistor 1329 and armature 1322 in order that a proper value may be provided on wiper 1239 for battery searching selection. Relays 1210 and 1310 both operate over the circuit just traced, relay 1330 having been previously operated over the circuit traced in the fore part of this paragraph. The operation of relay 1310 in the out trunk circuit causes the out trunk circuit to be seized by the switching selector in the manner described in the following paragraph.

At armature 1311, relay 1310 opens the circuit through the upper winding of relay 1330, but relay 1330 holds over the circuit through its lower winding: at armature 1311 and working contact, extends conductor 1301 to conductor 1303 of the incoming first selector: at armature 1312, completes an obvious circuit to supervisory lamp 1306: at armature 1313, removes one ground from the common all-trunks-busy conductor 1304; and, at armature 1313, connects ground to the traffic register lead 1305 (traffic register not shown) from ground, armature 1313 and working contact, armature 1327 and resting contact, armature 1314 to conductor 1305.

At armature 1218, relay 1210 completes a locking circuit to its lower winding from ground, armature 1115, resting contact of armature 1172, armatures 1156, 1167, conductor 1206, armature 1218 and working contact, lower winding of relay 1210 to battery. At armature 1219, relay 1210 connects direct ground to wiper 1239 as a busy guard and also to retain the seized out trunk circuit. At armature 1216, relay 1210 completes a circuit to relay 1130 from ground, armature 1113 and working contact, conductor 1190, armature 1216, conductor 1191, upper winding of relay 1130 to battery, causing relay 1130 to operate and lock to ground by way of armature 1113 and working contact, and armature 1132. At armatures 1212 and 1213, relay 1210 extends the transmission circuit from calling station C to the seized out trunk circuit by way of wipers 1237 and 1238. At armature 1131, relay 1130 returns dial tone to the calling person through armature 1131 and working contact, resting contact of armature 1141, conductor 1185, armature 1232 and working contact, conductor 1184, lower winding of relay 1100, conductor 1120, wiper 1125, conductor 1118, line circuit 1107 to the listening circuit of station C.

Digressing for the moment from the description of the call from station C, an explanation will now be given of the method whereby the out trunk finder (Figure 12) hunts for a trunk leading to an idle out trunk circuit such as, for example, Figure 13. If the wipers 1237, 1238 and 1239 of the out trunk finder are not standing on a trunk leading to an idle out trunk circuit, relay 1210 cannot operate when relay 1230 operates because ground potential will be connected to wiper 1239 over conductor 1302 of the busy out trunk circuit. Instead, relay 1230 completes a circuit to magnet 1270 of the out trunk finder from ground, armature 1115, resting contact of armature 1172, armatures 1156, 1167, conductor 1206, armature 1218 and resting contact, armature 1222, conductor 1208, armature 1136 and resting contact, conductor 1207, armature 1236, winding of magnet 1270 to battery. Magnet 1270 operates positions its pawl preparatory to advancing wipers 1237, 1238 and 1239 one step, and completes a circuit to relay 120 from ground, armature 1135 and resting contact, conductor 1205, armature 1235, interrupter armatures 1271, 1266, winding of relay 1220 to battery, causing relay 1220 to operate. At armature 1222, relay 1220 opens the circuit to magnet 1270, causing magnet 1270 to restore and thereby advance wipers 1237, 1238 and 1239 one step to the bank contacts of the next trunk. At interrupter armature 1271, magnet 1270 opens the circuit to relay 1220, causing relay 1220 to restore. If the out trunk circuit connected to these bank contacts is idle, battery potential over conductor 1302 of the idle out trunk circuit is connected to the upper winding of relay 1210 by way of wiper 1239, causing relay 1210 to operate and lock in the manner previously described in this section. The circuit to magnet 1270 is now open at armature 1136, and no further rotation of wipers 1237, 1238 and 1239 can take place.

Should the out trunk circuit connected to the bank contacts to which wipers 1237, 1238 and 1239 were rotated in the preceding paragraph be in prior use, then relay 1210 cannot operate and relay 1130 would remain in the normal position. The circuit to magnet 1270 would, therefore, be completed at armature 1222 when relay 1220 restored after the first operation of magnet 1270, and magnet 1270 would again operate, position its pawl preparatory to advancing wipers 1237, 1238 and 1239 another step, and complete the circuit to relay 1220 at interrupter armature 1271. Relay 1220 would re-operate and open the circuit to magnet 1270 at armature 1222, causing magnet 1270 to restore and thereby advance wipers 1237, 1238 and 1239 another step. This interaction between magnet 1270 and relay 1220 would continue until wiper 1239 encounters battery potential returned over conductor 1302 of a selected idle out trunk circuit. When all of the out trunk circuits connected to the banks of the out trunk finder are in use, the common all-trunks-busy relay 1280 restores because there will be no ground potential on the common conductor 1304. At armature 1281, relay 1280 connects ground interrupted at approximately 60 pulses per minute to the lower winding of relay 1130 through armature 1233, causing relay 1130 to operate and lock through its upper winding within one second after the seizure of the switching selector. At armature 1136, relay 1130 opens the circuit to magnet 1270, causing magnet 1270 to restore and thereby advance wipers 1237, 1238 and 1239 another step. However, the operating circuit to relay 1210 cannot be completed since all of the out trunk circuits are in prior use and, therefore, the switching selector transmission circuit is not extended through at armatures 1212 and 1213. Dial tone is then connected to the calling station and the calling person may proceed to dial. If the call is for a station in the same (local) office, the connection is established in the manner described in the section titled "Local calls in branch office." If the call is for a station in the main (distant) office, busy tone will be returned to the calling station after the call is identified as not being a local call. In this latter event, the busy tone circuit may be traced from busy tone at armature 1161, conductor 1186, armature 1211, armature spring 1248 and condenser 1105 to the "+" side of the transmission circuit.

Returning now to the description of the call from station C for a station in the main office, it will be assumed that the number of the desired main office station is 53999, and that the discrimination in the switching selector between a local number and a main office number occurs after the second digit, then the right normal post spring set 1147 is adjusted to make contact when the switch shaft reaches the fifth level (the first digit of the main office number being 5). The left normal post spring set 1148 is adjusted to make contact when the switch shaft reaches the tenth level as explained in the section titled "Local calls in branch office."

Upon hearing the well-known dial tone, the calling person at station C dials number 53999. Responsive to the dialing of the first digit (5), the shaft of the switching selector is raised to the fifth level and then automatically restored to the normal position in the manner described in the section titled "Local calls in branch office" for the dialing of the first digit (5) of a local number in the branch office. During the pulsing of the first digit, relay 1100 of the switching selector also transmits corresponding pulses to relay 1400 of the incoming first selector over the circuit from ground, armature 1161, armature 1111 and working contact, conductor 1181, armature 1212, wiper 1237 and conductor 1300. Relay 1400 of the incoming first selector, therefore, operates and restores five times. The circuit for the first pulse is completed through the upper winding of relay 1400, armature spring 1426 and resting contact, lower winding of relay 1400 to battery, and for the remaining four pulses through the upper winding of relay 1400, armature 1421 (relay 1420 operating with the first pulse), lower winding of relay 1400 to battery. At armature 1401, relay 1400 transmits a pulse to vertical magnet 1440 and relay 1420 in multiple for each de-energization of line relay 1100 of the switching selector. The multiple circuit to magnet 1440 and relay 1420 for the first pulse may be traced from ground, armature 1401, resting contact of armature 1423, armature 1414 and resting contact, winding of magnet 1440 to battery, and also from ground, armature 1401, resting contact of armature 1423, armature 1414 and resting contact, winding of relay 1420 to battery. The multiple circuit to magnet 1440 and relay 1420 for the remaining four pulses is completed from ground, armature 1401, armature 1423 and working contact, winding of magnet 1440 to battery, and also from ground, armature 1401, armature 1423 and working contact, winding of relay 1420 to battery, relay 1420 having operated on the first pulse and remaining operated for the duration of the succeeding pulses. At armature 1421, relay 1420 directly connects the upper and lower windings of relay 1400 in series to provide a circuit for relay 1400 after V. O. N. spring set 1425 has been operated by the raising of the switch shaft. Magnet 1440 operates and restores for each energization and de-energization of relay 1400 thereby raising the shaft and wipers to the fifth level and operating V. O. N. spring set 1425 on the first vertical step.

The operation of relay 1420 also completed a circuit from ground, armature 1422 and working contact, lower winding of relay 1460, lower winding of relay 1410 to battery, causing both relays 1460 and 1410 to operate. At armature 1462, relay 1460 completes a holding circuit for relay 1410 and itself independent of relay 1420 from ground, armature 1462, upper winding of relay 1410, lower winding of relay 1460, lower winding of relay 1410 to battery. At armatures 1412 and 1414, relay 1410 prepares a circuit to the lower winding of relay 1400 and a circuit to rotary magnet 1450.

Upon the cessation of pulses from line relay 1100 of the switching selector, relay 1400 of the incoming first selector restores and opens the locking circuit to relay 1420 at armature 1401, causing relay 1420 to restore after a short interval. At armature 1423, relay 1420 opens the circuit to vertical magnet 1440: at armature 1421, disconnects the lower winding of relay 1400 from the upper winding of relay 1400; and, at armature 1422, completes a circuit to the lower winding of relay 1400 from ground, armature 1422 and resting contact, armature 1412 and working contact, armature 1434 and resting contact, armatures 1451, 1463, armature spring 1426 and working contact, lower winding of relay 1400 to battery, causing relay 1400 to operate. At armature 1401, relay 1400 completes the circuit to rotary magnet 1450 from ground, armature 1401, resting contact of armature 1423, armature 1414 and working contact, winding of magnet 1450 to battery. Magnet 1450 operates and rotates the shaft and wipers of the incoming first selector one step in the bank level selected by the vertical pulsing (5th level). The R. O. N. spring set 1405 operates with the first rotary step of the switch shaft, connecting battery potential through resistor 1406 to interrupter contact 1451 of magnet 1450 in multiple with the lower winding of relay 1400 for the purpose of reducing sparking at interrupter contact 1451 during rotation. The operation of magnet 1450 also opens the circuit to relay 1400 at interrupter armature 1451, causing relay 1400 to restore and open the circuit to magnet 1450 at armature 1401. Magnet 1450 restores in turn and again completes the circuit to relay 1400. The operation of the incoming first selector at this moment is dependent upon whether the second selector connected to the first bank contact set of the 5th level is in prior use or is idle.

Should the second selector be idle, then wiper 1418 of the incoming first selector encounters battery supplied from the second selector on the C contact of the first bank contact set, and a circuit for relay 1430 of the incoming first selector is completed from ground, armature 1413, lower winding of relay 1430, wiper 1418, C bank contact connected to wiper 1418, conductor 1443 to battery supplied from the second selector to the mentioned bank contact, causing relay 1430 to operate and prevent further rotary pulsing of the incoming first selector by opening the circuit to relay 1400 at armature 1434. Should the second selector be in prior use, then wiper 1418 of the incoming first selector encounters ground potential on the C contact of the first bank contact set and, consequently, relay 1430 of the incoming first selector cannot operate. The circuit to relay 1400 is, therefore, maintained at armature 1434 and resting contact, causing relay 1400 to re-operate and again complete the circuit to magnet 1450. Magnet 1450 re-operates, advances the switch shaft and wipers a second rotary step, and again opens the circuit to relay 1400. This interaction between magnet 1450 and relay 1400 continues until wiper 1418 encounters battery potential on the C contact of a bank contact set connected to an idle second selector or until wipers 1416, 1417 and 1418 are advanced to the eleventh position of the banks. In the latter event, cam spring set 1445 is operated, and busy tone is returned to the calling person at station C by way of armature spring 1447 to the "+" side of the transmission circuit. The operation of cam spring set 1445 also completes a circuit to relay 1430 from ground, armature 1413, lower winding of relay 1430, armature 1436 and resting contact, armature spring 1446, resistor 1448 to battery, causing relay 1430 to operate and lock over the circuit from ground, armature 1422 and resting contact, armature 1412 and working contact, armature 1434 and working contact, upper winding of relay 1430, winding of rotary magnet 1450 to battery. The high resistance value of the upper winding of relay 1430 prevents magnet 1450 from operating over the circuit through the upper winding of relay 1430. At armature 1434, relay 1430 opens the circuit to the lower winding of relay 1400 and, therefore, the operating circuit to rotary magnet 1450 remains open at armature 1401 thereby preventing further rotation of the incoming first selector shaft and wipers.

Assuming now that the second selector shown in Figure 6 is located in the main office, is idle and has been selected by the incoming first selector of Figure 14, then relay 1430 of the incoming first selector is caused to operate through its lower winding in the manner described in the fore part of the preceding paragraph. At armature 1434, relay 1430 completes a locking circuit to its upper winding from ground, armature 1422 and resting contact, armature 1412 and working contact, armature 1434 and working contact, upper winding of relay 1430, winding of magnet 1450 to battery, the high resistance value of the upper winding of relay 1430 preventing magnet 1450 from operating: at armature 1436 and working contact, connects direct ground to wiper 1418 as a busy guard and also to complete the circuit of the upper winding of relay 620 of the second selector: at armature 1437, connects ground to traffic register conductor 1403 (traffic register not shown); and, at armatures 1431 and 1432, extends the transmission circuit from station C to the selected second selector.

Responsive to the dialing of the second digit (3), the circuit to relay 1100 is interrupted three times, and pulses are correspondingly transmitted to magnet 1260, relay 1240 and the upper winding of relay 1230 from ground and the resting contact of armature 1102. Relays 1240 and 1230 do not restore during the pulsing. Magnet 1260 operates and restores for each pulse, raising the shaft and wipers of the switching selector to the third level of the banks in the manner described in the section titled "Local calls in branch office" for the dialing of the third digit (1) of a local number in the branch office.

Shortly after the last pulse of the second digit (3) has been received, relays 1240 and 1230 restore. At armature 1231, relay 1230 opens the circuit to its upper winding and also to vertical magnet 1260. At the resting contact of armature 1232, relay 1230 maintains direct ground on the lower winding of relay 1100. The restoration of relay 1230 in this instance, however, can not cause the operation of relay 1160 because the circuit to the windings of relay 1160 is open at armature 1152. Relay 1220, therefore, cannot operate at this time because its circuit is open at contact 1163 and, consequently, the circuit to rotary magnet 1265 is open at both armatures 1221 and 1162. The wipers of the switching selector are thus retained at the height of the third level of the switching selector banks and cannot be rotated into the third level of the banks because the circuit to rotary magnet 1265 cannot be closed.

During the pulsing of the second digit (3), relay 1100 of the switching selector also transmits corresponding pulses to relay 600 of the second selector over the circuit from ground, armature 1101, armature 1111 and working contact, conductor 1181, armature 1212, wiper 1237, conductor 1300 through Figure 13 to Figure 14, armature 1431, wiper 1416, bank contact connected to wiper 1416, conductor 1441 connected to the mentioned bank contact, conductor 535 (Figure 6), lower winding of relay 600, armature 621 and working contact, upper winding of relay 600 to battery. Line relay 600 of the second selector therefore, operates and restores for each de-energization and re-operation of line relay 1100 of the switching selector. From this point on, the description of the operation of the second selector is the same as that included in the section titled "Calls from main office stations to main office individual station lines" and, therefore, it is unnecessary to repeat these details in this section.

Assuming now that the third selector identified by the reference number 780 in Figure 7 is of the same detail circuit design as the second selector shown in Figure 6, is located in the Main office, is idle and has been selected by the second selector of Figure 6, then relay 630 of the second selector is caused to operate from ground, armature 613 and working contact, lower winding of relay 630, wiper 618, C bank contact connected to wiper 618, conductor 643 to battery supplied from third selector 780 over conductor 643. An armature 633, relay 630 completes a locking circuit to its upper winding from ground, armature 1436, wiper 1418, C bank contact connected to wiper 1418, conductor 1443, conductor 537 (Figure 6), armature 633 and working contact, upper winding of relay 630, winding of rotary magnet 650 to battery, the high resistance value of the upper winding of relay 630 preventing magnet 650 from operating: at armature 634, opens the circuit to the upper winding of relay 600, thereby preventing relay 600 from operating: at armature 633, opens the circuit to relay 610, thereby causing relay 610 to restore: at armature 636 and working contact, connects direct ground to wiper 618 as a busy guard and also to hold the seized third selector 780: at armature 637, connects a multiple ground to traffic register conductor 603; and, at armatures 631 and 632, extends the transmission circuit from station C to third selector 780. Responsive to the dialing of the third digit (9), the circuit to relay 1100 of the switching selector is interrupted nine times, and pulses are correspondingly transmitted to relay 1240 from ground and the resting contact of armature 1102. Relay 1240 operates with the first pulse and, at armature 1241, opens the transmission circuit to the second and third selectors. At armature 1101, relay 1100 transmits a pulse to the line relay of the third selector 780 (the line relay of third selector 780 being similar to line relay 600 of Figure 6) for each de-energization from ground, armature 1101, armature 1111 and working contact, conductor 1181, armature 1212, wiper 1237, conductor 1300 through Figure 13 to Figure 14, armature 1431, wiper 1416, bank contact connected to wiper 1416, conductor 1441 connected to the mentioned bank contact, conductor 535 (Figure 6) of the second selector, armature 631, wiper 616, bank contact connected to wiper 616, conductor 641 to third selector 780, windings of the line relay of third selector 780 to battery (line relay of third selector not shown but is similar to line relay 690 of the second selector Figure 6). The line relay of third selector 780, therefore, operates and restores for each de-energization and re-operation of line relay 1100 of the switching selector. From this point on, the description of the operation of third selector 780 would be the same as that included in the section titled "Calls from main office stations to main office individual station lines" for the second selector with the general difference that third selector 780 is pulsed to the ninth level of its banks by the dialing of the third digit (9).

Assuming that the connector shown in Figure 7 is located in the main office, is idle and has been selected by third selector 780, then the operation of this connector for the dialing of the fourth digit (9) and the fifth digit (9) is similar to the description of the third and fourth digits in the section titled "Calls from main office stations to main office individual station lines" and, therefore, it is unnecessary to repeat these details in this section. When the dialed station (53999) answers the call, transmission current is supplied to calling station C through the windings of line relay 1100 of the switching selector, and to the dialed station through the upper and center windings of relay 750 of the connector.

Assuming further that the conversation has been terminated, both persons have returned their handsets to the respective cradles, the registration of the call has taken place in a manner similar to that explained in the section titled "Local calls in branch office," then the switches are restored to normal in the following manner:

The loop circuit to line relay 1100 of the switching selector is opened when the calling person at station C disconnects, and relay 1100 restores, opening the circuit to relay 1110 at armature 1102. After a short interval, relay 1110 restores and, at armature 1113, removes ground from conductor 1129 to effect the release of finder 1108 and the cut-off relay of calling station C in a similar manner to that explained in the section titled "Calls from main office stations to main office individual station lines." At the time relay 1130 was released in connection with the registering of the call, relay 1130 removed one ground from the locking circuit of relay 1250, and when relay 1110 restored, the remaining ground was removed from the locking circuit of relay 1250, causing relay 1250 to restore. The restoration of relays 1130 and 1110 removed multiple grounds from the locking circuit of relay 1210, causing relay 1210 to restore and remove ground from wiper 1239 to free the seized out trunk circuit of Figure 13. The circuit to release magnet 1275 of the switching selector is now complete from ground, armatures 1242, 1259, 1217, conductor 1203, armature 1134 and resting contact, conductor 1199, armature spring 1246 and working contact, winding of magnet 1275 to battery. The operation of magnet 1275 causes the shaft and wipers of the switching selector to drop to their normal positions, and the circuit of magnet 1275 is opened by armature spring 1246 of V. O. N. spring set 1245 as the switch shaft reaches its normal position.

The removal of ground potential from wiper 1239 as described in the preceding paragraph opens the circuit to the upper winding of relay 1310 and the lower winding of relay 1330 of the out trunk circuit of Figure 13. Relay 1330 restores at once, completing a circuit to the upper winding of relay 1320 from ground, armature 1331, lower winding of relay 1310, upper winding of relay 1320 to battery. Relay 1320 operates and completes a locking circuit for its upper winding from ground through armatures 1331 and 1323. At armature 1323, relay 1320 short-circuits the lower winding of relay 1310, and relay 1310 restores after a short interval. Before relay 1310 restores, however, relay 1320 has completed a circuit to the primary winding of transformer 1335 from ground, armature 1313 and working contact, armature 1327 and working contact, resistor 1332, primary winding of transformer 1335 to battery. A high voltage potential is, consequently, induced into the secondary winding of transformer 1335, and this high voltage potential is transmitted over the "+" side of the transmission circuit through armature 1325, armature 1311 and working contact to conductor 1303 of the incoming first selector (Figure 14) for the purpose of restoring the incoming first selector to normal position in the manner to be described in a later paragraph of this section. At armature 1327, relay 1320 also removes ground potential from traffic register conductor 1305. The restoration of relay 1310 opens the circuit to the primary winding of transformer 1335 at armature 1313, thereby causing the removal of the high voltage potential from the "+" side of the transmission circuit. At armature 1312, relay 1310 removes direct ground from supervisory lamp 1306: at armature 1313, connects ground to supervisory lamp 1306 by way of armature 1313 and resting contact, armature 1326 and working contact, and resistor 1316, thereby causing supervisory lamp 1306 to glow dimly (instead of brightly) as an indication that the preceding switch (switching selector) has disconnected: at armature 1311, disconnects conductor 1301 from conductor 1303 of the incoming first selector; and, at armature 1311 and resting contact, re-connects the upper winding of relay 1330 in series with resistor 1315 across conductors 1300 and 1303 of the incoming first selector.

The momentary high voltage potential received over conductor 1303 of the incoming first selector (before relay 1310 restores and opens the working contact of armature 1311) is conducted through armature 1411 and resistor 1465 (bridged by condenser 1466) to the gas filled tube 1464, the other terminal of tube 1464 being connected to ground. The high voltage potential immediately "breaks down" the high resistance of the gas within tube 1464 in a manner well-known in the electronic art, thereby causing a momentary direct-current flow from battery by way of the secondary winding of transformer 1335, armature 1325, armature 1311 and working contact, conductor 1303, armature 1461, upper winding of relay 1460 to ground through the lowered resistance of tube 1464 before the high voltage potential has been dissipated and the internal resistance of tube 1464 returned to its normal high value. The upper and lower windings of relay 1460 are wound in opposite directions and, therefore, the momentary direct-current flow through the upper winding neutralizes the continuous current flow through the lower winding, and relay 1460 restores to normal. At armature 1462, relay 1460 interrupts the current flow through its lower winding and the windings of relay 1410, thereby retaining itself in the normal position and causing the restoration of relay 1410 after a short interval. At armature 1412, relay 1410 opens the locking circuit to the upper winding of relay 1430, causing relay 1430 to restore. At armature 1436, relay 1430 removes ground from wiper 1418 to effect the release of the second selector: at armatures 1431 and 1432, opens the transmission circuit to the second selector; and, at armature 1435, completes the circuit to release magnet 1405 from ground, armature 1422 and resting contact, armature 1412 and resting contact, armature 1435, armature spring 1427 and working contact, winding of magnet 1405 to battery. The operation of magnet 1405 causes the restoration of the incoming first selector in the well-known Strowger manner, and the circuit to magnet 1405 is opened by armature spring 1427 as the switch shaft reaches its normal position. The restoration of relays 1410 and 1460 disconnects tube 1464 from the "+" side of the transmission circuit at armatures 1411 and 1461.

Should the momentary high voltage potential transmitted over the "+" side of the transmission circuit to the incoming first selector, in the manner described in the preceding paragraph, fail to release the incoming first selector, then an additional momentary high voltage potential is transmitted over the "+" side of the transmission circuit in the manner to be described in this paragraph. At the time relay 1320 operated and locked, it completed the starting circuit to a timer 1350 at armature 1328. Timer 1350 connects a ground pulse over conductor PU to the lower winding of relay 1320, armature 1324, resting contact of armature 1346, winding of relay 1340 and battery, causing relay 1340 to operate and lock to ground over conductor Hold from the timer and the working contact of armature 1345. At armature 1344, relay 1340 connects ground to conductor 1302 to mark the out trunk circuit busy to other calls: and, at armature 1347, connects a multiple ground to conductor Start of the timer. A subsequent ground pulse over conductor Pulse 1 from the timer completes a circuit to the upper winding of relay 1330 by way of armature 1343 and working contact, upper winding of relay 1330, armature 1341 and working contact, resistor 1348 to battery, causing relay 1330 to operate and open the locking circuit to relay 1320 at armature 1331. Relay 1320 restores. A ground pulse over conductor Pulse 2 from the timer completes a circuit to the upper winding of relay 1310 by way of armature 1345 and working contact, upper winding of relay 1310, resting contact of armature 1321, lower winding of relay 1330 to battery, causing relay 1310 to operate. Relay 1330 operated previously over the circuit through its upper winding and the ground pulse from conductor Pulse 1. At the end of the first cycle of timer 1350, ground is removed from the conductors PU, Hold, Pulse 1 and Pulse 2, and the related circuits of relays 1320, 1340, 1330 and 1310 are opened. Relays 1330, 1320 and 1340 restore immediately but relay 1310 remains operated for a short interval due to its slow-to-release action. The restoration of relay 1330 completes a circuit to the upper winding of relay 1320 through the lower winding of relay 1310, causing relay 1320 to re-operate and lock through its armature 1323 before relay 1310 restores. A second momentary high voltage potential is, therefore, connected to the "+" side of the transmission circuit in the manner described in a previous paragraph for the first momentary high voltage potential. Should the incoming first selector fail to release as a result of the second momentary high voltage potential over the "+" side of the transmission circuit, then timer 1350 is cycled an additional time, or times, until the incoming first selector releases. Timer 1350 is common to a number of out trunk circuits, and starts whenever the "Start" conductor is grounded.

The restoration of the incoming first selector (Figure 14) completes a circuit to the upper winding of relay 1330 of the out trunk circuit from ground, armature 1422 and resting contact, armature 1412 and resting contact, armature 1435, armature spring 1427 and resting contact, conductor 1303, armature 1311 and resting contact, resistor 1315, armature 1342, resting contact of armature 1321, resting contact of armature 1343, upper winding of relay 1330, resting contact of armature 1341, conductor 1300, upper winding of relay 1400, armature spring 1426 and resting contact, lower winding of relay 1400 to battery, the high resistance value of the upper winding of relay 1330 preventing the operation of relay 1400. At armature 1331, relay 1330 opens the locking circuit to the upper winding of relay 1320, causing relay 1320 to restore. The circuits to supervisory lamp 1306 are open at armatures 1312 and 1326, and the non-glowing of supervisory lamp 1306 indicates that both the out trunk circuit (Figure 13) and the associated incoming first selector (Figure 14) are in their normal positions.

The restoration of the second selector (Figure 6), third selector 780 and the connector (Figure 7) is accomplished in a manner similar to that described in the section titled "Calls from main office stations to main office individual station lines" for the restoration of the second selector (Figure 6) and the connector (Figure 7) on a local main office call.

It should be understood that while the connection described in this section utilizes the connector shown in Figure 7, the P. B. X connector shown in Figure 8 and described in the section titled "Calls from main office stations to main office P. B. X lines" may be equally as well substituted for the connector of Figure 7 in this section.

*Calls from main office to branch office*

In order to describe a call from a local station in the main office to a station in a branch office, it is assumed that station A (Figure 1–A) originates a call for a station in the branch office. It is also assumed that wipers 261, 263 and 265 of Figure 2 finder have found and connected with the line circuit 100 of station A in the manner described in the section titled "Calls from main office stations to main office individual station lines." It is further assumed that a bank contact set in the fifth level of Figure 5 local first selector in the main office is connected to conductors 535, 536 and 537 of Figure 6 local second selector in the main office: that a bank contact set in the tenth level of Figure 6 local second selector in the main office is connected to conductors 1300, 1301 and 1302 of Figure 13 out trunk circuit in the main office: that conductors 1300 and 1303 of Figure 13 out trunk circuit in the main office are directly connected to Figure 14 incoming third selector in the branch office: that a bank contact set in the first level of Figure 14 incoming third selector in the branch office is connected to conductors 641, 642 and 643 of local fourth selector 780 (Figure 7) in the branch office; and that a bank contact set in the fifth level (not shown) of local fourth selector 780 in the branch office is connected to conductors 725, 726 and 727 of Figure 7 connector in the branch office.

Under the conditions outlined in the preceding paragraph, line relay 500 of Figure 5 local first selector is held operated over the calling loop of station A, and dial tone is returned to the calling person through the resting contact of armature spring 517 of V. O. N. spring set 524, conductor 534, lower winding of relay 500, conductor 271, armature 222, wiper 263, and through "+" bank contact associated with calling station A to the listening circuit of station A. Upon hearing the well-known dial tone, the calling person dials the number of the desired station in the branch office which in this instance will be assumed to be 501599. Responsive to the dialing of the first digit (5), the shaft and wipers of Figure 5 local first selector are raised to the fifth level and caused to select the bank contact set connected to conductors 535, 536 and 537 of Figure 6 local second selector in the manner described in detail in the section titled "Calls from main office stations to main office individual station lines."

Responsive to the dialing of the second digit (0), the shaft and wipers of Figure 6 local second selector are raised to the tenth level and caused to select the bank contact set connected to conductors 1300, 1301 and 1302 of Figure 13 out trunk circuit in the manner described in the section titled "Calls from main office stations to main office individual station lines" for the operation of the second selector. Ground potential by way of armature 613 and working contact, lower winding of relay 630, wiper 618, conductor 1302 of Figure 13 out trunk circuit, armature 1345 and resting contact, upper winding of relay 1310, armature 1321 and resting contact, lower winding of relay 1330 and battery causes relay 1310 to operate, relay 1330 being normally operated. The operation of relay 1310 causes the out trunk circuit to be seized by the local second selector in a manner similar to that described in the third paragraph of the section titled "Calls from branch office to main office."

Responsive to the dialing of the third digit (1) the shaft and wipers of Figure 14 incoming third selector are raised to the first level and caused to select the bank contact set connected to conductors 641, 642 and 643 of local fourth selector 780 (Figure 7) in a manner similar to that described in the section titled "Calls from branch office to main office" for the operation of the incoming first selector.

Responsive to the dialing of the fourth digit (5) the shaft and wipers (not shown) of local fourth selector 780 are raised to the fifth level (not shown) and caused to select the bank contact set connected to conductors 725, 726 and 727 of Figure 7 connector in a manner similar to that described in the section titled "Calls from main office stations to main office individual station lines" for the operation of the local second selector.

Responsive to the dialing of the fifth and sixth digits (9 and 9), Figure 7 connector is caused to select the station line circuit in the branch office corresponding to number 501599 in a manner similar to the description of the third and fourth digits in the section titled "Calls from main office stations to main office individual station lines." When the dialed station answers the call, transmission current is supplied to the calling station A in the main office through the windings of line relay 500 of the local first selector, and to the dialed station in the branch office through the upper and center windings of relay 750 of the connector.

Assuming now that the conversation has been terminated, the calling person at station A in the main office and the called person at the dialed station in the branch office have both returned their handsets to the respective cradles, the registration of the call has taken place as explained in the section titled "Calls from main office stations to main office individual station lines," then the switches are restored to normal in the following manner: The local first selector, the associated finder, the line circuit 100 of calling station A and the local second selector in the main office are restored to normal in the manner described in the section titled "Calls from main office stations to main office individual station lines." The out trunk circuit (Figure 13) in the main office and the incoming third selector (Figure 14) in the branch office are restored to normal in the manner described in the section titled "Calls from branch office to main office." The local fourth selector, the connector and the line circuit of the dialed station in the branch office are restored to normal in the manner described in the section titled "Calls from main office stations to main office individual station lines" for equivalent switches.

Considering now the case where the outgoing traffic from the main office to the branch office is of sufficient volume to require a considerable number of trunk paths between the two offices if the out trunk circuits (Figure 13) are connected directly to the banks of local second selectors as indicated in the foregoing explanation of a call from the main office to a station in the branch office, then the number of trunk paths between the two offices can be materially reduced by the employment of out trunk circuit allotters interposed between the banks of the local second selectors in the main office and the out trunk circuits, as the use of out trunk circuit allotters effects an economy in the number of out trunk circuits required. When out trunk circuit allotters are used, conductors 1035, 1036 and 1037 of Figure 10 are connected to a bank contact set in the tenth level of Figure 6 local second selectors in the main office, and conductors 1000, 1001 and 1002 of Figure 10 are connected to conductors 1300, 1301 and 1302 of Figure 13 out trunk circuit, the corresponding conductors of other out trunk circuit allotters being similarly connected to other bank contact sets of Figure 6 local second selectors and Figure 13 out trunk circuits. The other switches in the train for completing outgoing calls from the main office to stations located in the branch office are arranged and connected as detailed in the first paragraph of this section.

Figure 10 out trunk circuit allotter preselects a free Figure 13 out trunk circuit. Should the out trunk circuit on which wipers 1027, 1028 and 1029 are standing be seized by another switch also having access to the mentioned out trunk circuit, then ground potential on conductor 1002 is extended through wiper 1029, armatures 1041, 1071, interrupter armature 1031, winding of relay 1050 to battery, causing relay 1050 to operate. At armature 1051, relay 1050 completes the circuit to magnet 1030, causing magnet 1030 to operate and position its pawl preparatory to advancing wipers 1027, 1028 and 1029 one step. At interrupter armature 1031, magnet 1030 opens the circuit to relay 1050, causing relay 1050 to restore and open the circuit to magnet 1030 at armature 1051. Magnet 1030 accordingly restores and thereby advances wipers 1027, 1028 and 1029 one step. Should the next out trunk circuit be in prior use, wiper 1029 will find ground potential on conductor 1002 of the last mentioned out trunk circuit, and this ground connection will cause relay 1050 to again operate and again complete the circuit to magnet 1030. Magnet 1030 again operates and positions its pawl preparatory to advancing wipers 1027, 1028 and 1029 another step, and also opens the circuit to relay 1050. Stepping and testing continues until wiper 1029 connects with a bank contact of a free out trunk circuit. As the last free out trunk circuit is preselected, common all-trunks-busy relay 1060 is restored because the last ground connection to common conductor 1059 is removed at armature 1313 of the last free out trunk circuit, and, at armature 1061, relay 1060 completes the circuit to common relay 1070. The operation of common relay 1070 opens the circuit to relay 1050 at armature 1071 and, therefore, there can be no further stepping of magnet 1030. When an out trunk circuit again becomes available, all-trunks-busy relay 1060 is operated to cause the release of common relay 1070 and thereby again prepares the circuit to relay 1050 at armature 1071.

Assuming now that out trunk circuit allotters are used as outlined in a previous paragraph of this section, then ground potential by way of armature 613 and working contact, lower winding of relay 630, wiper 618, conductor 1037 of Figure 10 allotter, winding of relay 1040, armatures 1041, 1071, interrupter armature 1031, winding of relay 1050 and battery causes the operation of relay 1040 (relay 1050 does not operate at this time); and ground potential by way of armature 613 and working contact, lower winding of relay 630, wiper 618, conductor 1037 of Figure 10 allotter, resistor 1045 in multiple with the winding of relay 1040, wiper 1029, conductor 1002, conductor 1302, upper winding of relay 1310, lower winding of relay 1330 and battery causes the operation of relay 1310 (relay 1330 being normally operated).

The operation of relay 1040 opens the circuit to relay 1050 at armature 1041, and connects ground potential to register conductor 1043 (register not shown) at armature 1042. The operation of relay 1310 causes the out trunk circuit to be seized in a manner similar to that described in the third paragraph of the section titled "Calls from branch office to main office." From this point on, the description of the progress of a call through Figure 14 incoming third selector in the branch office, the local fourth selector 780 in the branch office, and Figure 7 connector in the branch office is the same as that included in the fore part of this section for the case where conductors 1300, 1301 and 1302 of the out trunk circuit are connected directly to a bank contact set in the tenth level of Figure 6 local second selector.

*Annoyance holding of local connections*

Should the called station on a local connection desire to learn the identity of the calling station when the call may be classified as an annoyance call, the called station does not disconnect but remains on the connection after the calling station has disconnected. Assuming now that the selectors shown in Figures 5 and 6 and the connector shown in Figure 7 have been used to connect the calling station with the called station, and that the calling station disconnected without revealing his identity, then the called station remains on the connection to prevent the release of the switch train and to signal an attendant in the calling office for the purpose of having the call traced. Under these conditions, relay 750 of the connector remains operated and, therefore, ground is supplied to relay 540 in the first selector via armatures 711, 755, armature 745 and working contact, upper winding of relay 700, conductor 725, conductor 641 (Figure 6), "—" bank contact connected to wiper 616, wiper 616, armature 631, conductor 535, "—" bank contact connected to wiper 527, wiper 527, armature 552, and armatures 511, 522 and associated resting contacts, thereby retaining relay 540 in the operated position. The circuit of release magnet 525 of the first selector is, therefore, open at armature 542, and ground is connected to wiper 529 by way of armature 543 and working contact to hold the second selector in the operated position. Consequently, the switch train does not release at this time.

Relays 500 and 510 were restored to normal as a result of the disconnection of the calling station, and a circuit is thereby completed to supervisory alarm lamp 533 from ground, armatures 502, 514 and associated resting contacts, armature 542 and working contact, lamp 533 to battery. The switchroom attendant is thus informed that the connection through the local first selector Figure 5 is being held up, and that his attention is demanded. The attendant then plugs into the test jack (not shown) of Figure 5 selector, thereby opening the circuit of lamp 533 at armature 502, and converses with the called local station. The attendant then proceeds along one of the two following courses.

First, the attendant instructs the called station to remain on the connection, and then traces the connection back to the calling station. Having determined the identity of the calling station, the attendant next passes the information to the waiting called station, instructs the called station to disconnect, and then withdraws from the test jack of Figure 5 selector. Responsive to the disconnection of the called station, relay 750 restores and removes ground from the "—" side of the connection at armature 755, thereby permitting relay 540 in the first selector to restore after a short interval. At armature 542, relay 540 completes the circuit to release magnet 525 from ground, armatures 502, 514, 542 and associated resting contacts, armature 556, armature spring 516, winding of magnet 525 to battery; and, at armature 543, removes ground from wiper 529. From this point on, the release of the switch train is effected in the manner described in the section titled "Calls from main office stations to main office individual station lines."

Second, the attendant operates busy key 519 of Figure 5 selector, instructs the called station to disconnect, and then withdraws from the test jack of Figure 5 selector. The operation of busy key 519 places a holding ground on conductor 272 to retain the circuit to the cut-off relay of the calling station, and the disconnection of the called station restores relays 750 and 540. The circuit to release magnet 525 of Figure 5 selector is now complete at armatures 502, 514, 542 and associated resting contacts, and the first selector (Figure 5) and the succeeding switches are restored to normal position in the manner described in the section titled "Calls from main office stations to main office individual station lines." The attendant then traces the connection back to the calling station and, after determining the identity of the calling station, restores busy key 519 to effect the release of Figure 2 finder and the cut-off relay of the calling station.

Should the switching selector shown in Figures 11 and 12 be involved in the local connection instead of Figure 5 local first selector, then relay 1240, release magnet 1275 and busy key 1109 would function in a similar manner to that just described for relay 540, release magnet 525 and busy key 519.

*Timing out trunks from branch office to main office*

Should a calling station in a branch office equipped with switching selectors per Figures 11 and 12 fail to dial within a predetermined time interval after initiating a call, timing equipment will prevent the calling station from occupying the seized out trunk circuit (Figure 13) after the predetermined interval has lapsed. Under such conditions, however, the occupied switching selector is not disconnected from the calling station and, therefore, the calling station can complete a local call in the branch office after having been "timed out" with respect to the out trunk circuit which was seized when the call was initiated. The purpose of freeing the seized out trunk circuit in the instance where the calling station fails to dial within the predetermined time interval is to prevent undue occupation of the seized out trunk circuit. In some cases of delayed dialing, the calling station intends to dial a local number in the branch exchange and, therefore, would be unnecessarily occupying the seized out trunk circuit, and in the cases where the calling station intends to dial a main office number, the calling station is not entitled to delay the dialing beyond the predetermined interval.

Assuming now that a calling station in the branch office has initiated a call but has not started dialing, then the switching selector (Figures 11 and 12) has seized an out trunk circuit (Figure 13) in the manner described in the section titled "Local calls in branch office." A timer 1175 periodically connects a ground pulse over conductor 1173 to the winding of relay 1170 of the switching selector through the resting contact of armature 1171. This ground pulse is effective to cause the operation of relay 1170 only when armatures 1136 and 1236 have both connected with their respective working contacts. Relays 1130 and 1230 are in the operated position after the initiation of the call and before the calling party commences dialing, and continue to remain in the operated position until the first dialing period has been concluded, whereupon relay 1230 is caused to restore. Consequently, the completion of the circuit through the winding of relay 1170 is possible only when armatures 1136 and 1236 and respective working contacts are closed during a period when a ground pulse is received over conductor 1173. If the calling station, therefore, fails to start dialing before the ground pulse is connected to conductor 1173, the ground pulse is extended through the winding of relay 1170, armature 1136 and working contact, conductor 1207, armature 1236 and working contact, winding of magnet 1270 to battery. Relay 1170 operates over the circuit just traced but the high resistance value of the winding of relay 1170 prevents magnet 1270 from operating.

The operation of relay 1170 completes a locking circuit for itself to ground supplied through armature 1115 and armature 1171 and working contact, independent of the ground pulse supplied over conductor 1173. At armature 1172, relay 1170 switches the locking circuit of the lower winding of relay 1210 from armature 1115 and the resting contact of armature 1172 to a timed holding ground over conductor 1174 and, consequently, if relay 1230 has not been restored to normal by the dialing of the first digit and thereby effected the restoration of relay 1170, the expiration of the timed holding period over conductor 1174 will cause the unlocking of relay 1210 and the consequent release of the seized out trunk circuit.

Assuming further that the seizure of the out trunk circuit has been "timed out" and released in the manner recited in the preceding paragraph, and that the calling station now starts the dialing of a local number in the branch office, then such a connection is completed in the manner described in detail in the section titled "Local calls in branch office."

*First digit cut-in of switching selector*

In the section titled "Calls from branch office to main office," the description of the operation of the switching selector (Figures 11 and 12) includes the arrangement whereby the discrimination in the switching selector between a call for a local number in the branch office and a call for a number in the main office occurs after the second digit. The switching selector, however, is also arranged so that a discrimination may be made on the first digit thereby giving the switching selector a first digit "cut-in" instead of a cut-in on the third digit as included in the above mentioned section. The first digit cut-in is used for connecting trunk groups to offices other than the associated main office—such as direct trunks to an adjacent office having a different first digit than the branch office, or for trunks to a toll switchboard and the like.

In order to describe a call from a local station in the branch office for a number having a first digit cut-in, it is assumed that station C (Figure 11) originates a call for connection to a trunk leading to a nearby toll switchboard, and that the first digit of the toll switchboard code number is nine (9). It is also assumed that the ninth level of the banks associated with wipers 1227, 1228 and 1229 of the switching selector are connected to trunks leading to the nearby toll switchboard (not shown), and that wipers 1237, 1238 and 1239 of the out trunk finder (Figure 12) are standing on a trunk leading to an idle out trunk circuit such as shown in Figure 13. It is further assumed that wipers 1124, 1125 and 1126 of finder 1108 have found and connected with line circuit 1107 of station C in a manner similar to that described in the section titled "Calls from main office stations to main office individual station lines." Under these conditions, line relay 1100 of the switching selector is held operated over the calling loop from station C, and relay 1330 of the out trunk circuit is held operated in the manner described in the second paragraph of the section titled "Calls from branch office to main office." Relays 1230 and 1210 of the switching selector are also operated in the manner described in the mentioned second paragraph. At armature 1216, relay 1210 completes a circuit to relay 1130 from ground, armature 1113 and working contact, conductor 1190, armature 1216, conductor 1191, upper winding of relay 1130 to battery, causing relay 1130 to operate and lock to ground by way of armature 1113 and working contact, and armature 1132. At armature 1131, relay 1130 returns dial tone to the calling station, and upon hearing the well-known dial tone, the calling person dials the code number of the toll switchboard, the first digit of which is 9.

Responsive to the dialing of the first digit (9), the circuit to relay 1100 is interrupted nine times. Relay 1100 restores momentarily for each pulse and, at armature 1102, opens the circuit to relay 1110 but relay 1110 does not restore during the pulsing period. At armature 1102 and resting contact, relay 1100 transmits a pulse to vertical magnet 1260, relay 1240 and the upper winding of relay 1230 for each de-energization. Relay 1240 operates and does not restore during the pulsing period. At armature 1244, relay 1240 connects a multiple ground to the upper winding of relay 1130. Relay 1230 is also of the slow-to-release type and does not restore during the pulsing period. Magnet 1260 operates and restores for each de-energization and re-operation of relay 1100, raising the shaft and wipers of the switching selector a corresponding number of vertical steps (in this instance the shaft and wipers are raised to the ninth level).

Shortly after the last pulse of the first digit has been received, relays 1240 and 1230 restore. At the resting contact of armature 1232, relay 1230 maintains direct ground on the lower winding of relay 1100. At armature 1234, relay 1230 completes a circuit to relay 1160 from ground, armature 1234, conductor 1194 to Figure 15, armature 1162 and resting contact, wiper 1139 of vertical bank 1138, contact #9 of vertical bank 1138, armature 1143, conductor 1197 to Figure 12, armature 1276, conductor 1202, lower and upper windings of relay 1160 in series to battery, causing relay 1160 to operate and lock to the circuit from ground, armatures 1115, 1165, lower and upper windings of relay 1160 in series and battery. At armature 1231, relay 1230 opens the circuit to its upper winding and also to vertical magnet 1260. At armature 1166, relay 1160 completes the circuit to relay 1220 from ground, armature 1115, conductor 1200, armature 1257 and resting contact, armature spring 1247 and working contact, conductor 1201, armature 1166, conductor 1204, interrupter armature 1266, winding of relay 1220 to battery, causing relay 1220 to operate; and, at armature 1167, opens the locking circuit of the lower winding of relay 1210. The restoration of relay 1210 disconnects the transmission circuit from the outgoing trunk circuit at armatures 1212 and 1213; and, at armature 1219, removes ground from wiper 1239 to free the seized out trunk circuit. The switching selector is now ready to rotate its wipers into the ninth level of the banks.

The operation of relay 1220 completes the circuit to rotary magnet 1265 from ground, armature 1234, conductor 1194, armature 1162 and working contact, conductor 1195, armature 1221, winding of magnet 1265 to battery. Magnet 1265 operates and rotates the shaft and wipers of the switching selector one step in the ninth level of the banks. Assuming now that the trunk connected to the first bank contact set of the ninth level is idle, then wiper 1229 of the switching selector encounters battery supplied over the trunk to the C contact of the first bank contact set, and a circuit for relay 1250 is completed from ground, armature 1115, conductor 1200, armature 1277 and resting contact, upper winding of relay 1250, wiper 1229 to battery on the C bank contact connected to wiper 1229, causing relay 1250 to operate and prevent further rotary pulsing of the switching selector by opening the circuit to relay 1220 at armature 1257. At armature 1257, relay 1250 also completes a locking circuit to its lower winding: at armature 1258 and working contact, short-circuits its upper winding thereby connecting direct ground through armature 1277 and resting contact to wiper 1229 as a busy guard and to hold the selected trunk; at armature 1254, connects a multiple ground to conductor 1129 of line finder 1108; and, at armatures 1252 and 1253, extends the transmission circuit from station C to the selected trunk. From this point on, the operation of the completion of the connection to the toll switchboard is conventional, and since it is not related to the present invention need not be further explained.

*Fourth digit cut-in of switching selector*

In the section titled "Calls from branch office to main office," the description of the operation of the switching selector (Figures 11 and 12) includes the arrangement whereby the discrimination in the switching selector between a call for a local number in the branch office and a call for a number in the main office occurs after the second digit. The switching selector, however, can be so arranged that the discrimination occurs after the third digit.

In order to describe a local call in the branch office when the switching selector is so arranged that the discrimination between a local call and a call to the main office occurs after the third digit, it is assumed that station C (Figure 11) originates a call for connection to another local station in the branch office, and that all local station numbers start with the code 506 which is followed by three more digits. It is also assumed that the connections to vertical bank 1138 and vertical wiper 1139 are as shown in Figure 15 instead of as shown in Figure 11, the wiring not shown in Figure 15 being the same as that shown in Figure 11. It is further assumed that wipers 1124, 1125 and 1126 of finder 1108 have found and connected with line circuit 1107 of station C in a manner similar to that described in the section titled "Calls from main office stations to main office individual station lines," and that wipers 1237, 1238 and 1239 of the out trunk circuit finder (Figure 12) are standing on a trunk to an idle out trunk circuit such as shown in Figure 13. Under these conditions, line relay 1100 of the switching selector is held operated over the calling loop from station C, and relay 1330 of the out trunk circuit is held operated in the manner described in the second paragraph of the section titled "Calls from branch office to main office." Relays 1230 and 1210 of the switching selector are also operated in the manner described in the mentioned second paragraph. At armature 1216, relay 1210 completes a circuit to relay 1130 from ground, armature 1113 and working contact, conductor 1190, armature 1216, conductor 1191, upper winding of relay 1130 to battery, causing relay 1130 to operate and lock to ground by way of armature 1113 and working contact, and armature 1132. At armature 1131, relay 1130 returns dial tone to the calling station, and upon hearing the well known dial tone, the calling person dials the number of the wanted local station (for example, 506399). It should be remembered that the right normal post spring set 1147 of the switching selector is adjusted to make contact when the switch shaft reaches the fifth level (the first digit of the local number being 5), and the left normal post spring set 1148 is adjusted to make contact when the switch shaft reaches the tenth level (the second digit of the local number being 0).

The operation of the switching selector responsive to the dialing of the first digit (5) and the second digit (0) of the wanted local number is the same as that described in the section titled "Local calls in branch office" for the first digit (5) and the second digit (0), and it is, therefore, unnecessary to repeat these operations here. Shortly after the last pulse of the second digit has been received, relays 1230 and 1240 restore. At the resting contact of armature 1232, relay 1230 maintains direct ground on the lower winding of relay 1100; and, at armature 1234, completes a circuit to release magnet 1275 from ground, armature 1234, conductor 1194, armature 1142 and working contact, left normal post spring set 1148, armature 1151 and resting contact, armature 1133, conductor 1196, winding of magnet 1275 to battery. The operation of magnet 1275 causes the shaft of the switching selector to drop by gravity to the normal position, and the circuit of magnet 1275 is opened at left normal post spring set 1148. The V. O. N. spring set 1245 is returned to normal position as the switch shaft reaches its normal position. The operation of magnet 1275 also completes a circuit to relay 1150 from ground, armature 1115, conductor 1200, armature 1277 and working contact, conductor 1198, armature 1144 and working contact, armature 1153 and resting contact, upper winding of relay 1150 to battery; and a second circuit to relay 1150 from ground, armature 1115, conductor 1200, armature 1277 and working contact, conductor 1198, armature 1144 and working contact, armature 1153 and resting contact, lower winding of relay 1150, armature 1145 and working contact, armature 1154 and resting contact, armature 1164, resistor 1168 to battery. Relay 1150, however, does not operate because its two windings are energized in opposite directions. The opening of the two circuits to relay 1150 at armature 1277 by the restoration of magnet 1275 causes a momentary magnetic unbalance between the two windings of relay 1150 and, consequently, relay 1150 operates and locks over the circuit from ground, armatures 1115, 1155, lower and upper windings of relay 1150 in series to battery. The operation of relay 1150 opens the resting contact of armature 1156 from armature 1156 but the strap 1157 wired across armature 1156 and associated resting contact (as shown in Figure 15) prevents the opening of the locking circuit to the lower winding of relay 1210 and, therefore, relay 1210 does not restore at this time. The restoration of V. O. N. spring set 1245 completes a circuit to relay 1230, causing relay 1230 to re-operate and maintain direct ground on the lower winding of relay 1100 by way of armature 1141 and working contact, conductor 1185, armature 1232 and working contact, and conductor 1184.

Responsive to the dialing of the third digit (6), the circuit to relay 1100 is interrupted six times, and pulses are correspondingly transmitted to vertical magnet 1260, relay 1240 and the upper winding of relay 1230 from ground and the resting contact of armature 1102. Neither relay 1240 nor relay 1230 restore during the pulsing. Magnet 1260 operates and restores for each pulse, raising the shaft and wipers of the switching selector to the sixth level of the banks.

Shortly after the last pulse of the third digit has been received, relays 1230 and 1240 restore. At the resting contact of armature 1232, relay 1230 maintains direct ground on the lower winding of relay 1100; and, at armature 1234, completes a circuit to release magnet 1275 from ground, armature 1234, conductor 1194 to Figure 15, armature 1162 and resting contact, vertical wiper 1139, contact #6 of vertical bank 1138, armature 1151 and working contact, armature 1133, conductor 1196 to Figure 12, winding of magnet 1275 to battery. The operation of magnet 1275 causes the shaft of the switching selector to drop to the normal position, and the circuit to magnet 1275 is opened as the vertical wiper returns to normal position. The V. O. N. spring set 1245 is returned to normal position as the switch shaft reaches its home position. The operation of magnet 1275 also completes a circuit to relay 1160 from ground, armature 1115, conductor 1200, armature 1277 and working contact, conductor 1198, armature 1144 and working contact, armature 1153 and working contact, armature 1163 and resting contact, upper winding of relay 1160 to battery; and a second circuit to relay 1160 from ground, armature 1115, conductor 1200, armature 1277 and working contact, conductor 1198, armatures 1144, 1153 and associated working contacts, armature 1163, lower winding of relay 1160, armature 1154 and working contact, armature 1164, resistor 1168 to battery. Relay 1160, however, does not operate because its two windings are energized in opposite directions. The opening of the two circuits to relay 1160 at armature 1277 by the restoration of magnet 1275 causes a momentary magnetic unbalance between the two windings and, consequently, relay 1160 operates and locks over the circuit from ground, armature 1115, armature 1165, lower and upper windings of relay 1160 to battery. At armature 1167, relay 1160 opens the locking circuit to the lower winding of relay 1210, causing relay 1210 to restore. The restoration of relay 1210 disconnects the transmission circuit from the outgoing trunk circuit at armatures 1212 and 1213; and, at armature 1219, removes ground from wiper 1239 to free the seized out trunk circuit. The restoration of V. O. N. spring set 1245 completes a circuit to relay 1230, causing relay 1230 to re-operate and maintain direct ground on the lower winding of relay 1100 by way of armature 1141 and working contact, conductor 1185, armature 1232 and working contact, and conductor 1184.

Responsive to the dialing of the fourth digit (3), the circuit to relay 1100 is interrupted three times, and pulses are correspondingly transmitted to vertical magnet 1260, relay 1240 and the upper winding of relay 1230 from ground and the resting contact of armature 1102. Neither relay 1240 nor relay 1230 restore during the pulsing. Magnet 1260 operates and restores for each pulse, raising the shaft and wipers of the switching selector to the third level of the banks. The V. O. N. spring set 1245 operates with the first vertical step of the shaft, completing the circuit to relay 1220 from ground, armature 1115, conductor 1200, armature 1257 and resting contact, armature spring 1247 and working contact, conductor 1201, armature 1166, conductor 1204, interrupter spring 1266, winding of relay 1220, to battery, causing relay 1220 to operate. Shortly after the last pulse of the fourth digit has been received, relays 1240 and 1230 restore. At the resting contact of armature 1232, relay 1230 maintains direct ground on the lower winding of relay 1100; and, at armature 1231, opens the circuit to its upper winding and also to vertical magnet 1260. The operation of relay 1220 completes the circuit to rotary magnet 1265 from ground, armature 1234, conductor 1194, armature 1162 and working contact, conductor 1195, armature 1221, winding of magnet 1265 to battery.

Magnet 1265 operates and rotates the shaft and wipers of the switching selector one step in the third level (level #3 selected by the pulsing of the fourth digit). The operation of magnet 1265 also opens the circuit to relay 1220 at interrupter armature 1266, causing relay 1220 to restore and open the circuit to magnet 1265 at armature 1221. Magnet 1265 restores in turn and again completes the circuit to relay 1220. This interaction between magnet 1265 and relay 1220 continues until wiper 1229 encounters battery potential on the C contact of a bank contact set connected to an idle succeeding switch. Assuming now that the succeeding switch is the connector shown in Figure 7, then the completion of the connection to the wanted station (506399) and the ultimate release of the connection is similar to that described in the section tilted "Local calls in branch office" for equivalent stages, and it is, therefore, considered unnecessary to detail the steps in this section.

It should be understood at this time that the switching selector may be so arranged that in addition to providing "fourth digit cut-in" as described in this section, it may also provide "first digit cut-in" on at least one level. Figure 15 has, therefore, been arranged to show that contact #6 of vertical bank 1138 is connected to provide "fourth digit cut-in," and contact #9 "first digit cut-in." The operation of the "first digit cut-in" is explained in detail in the section titled "First digit cut-in of switching selector" and it is, therefore, unnecessary to repeat such details in this section.

*Toll operator cut-in and breakdown*

In the present invention, calls can be completed from the toll switchboard to automatic local stations and, in addition, the toll operator can "cut-in" on a busy connection and offer a toll call to the wanted local station. The toll operator can, if the conditions so warrant, also release the wanted local station from the busy connection and extend the toll call to the released local station without re-dialing the local number.

In Figure 9 are shown the elements and circuit details of the toll operator equipment which relate directly to the present invention. All other elements and circuit details have been omitted from the diagram as not being pertinent and also to simplify the explanation. It should be understood, however, that the toll operator equipment may include any or all conventional and well-known facilities for providing toll service to and from the stations in a local network of automatic offices.

The toll operator equipment shown in Figure 9 includes the wipers 927, 928 and 929 of a toll first selector, the banks of which are connected to trunks leading to second selectors such as shown in Figure 6. In addition, the toll operator has facilities, indicated by contacts 970 and 971, respectively, for connecting battery potential to the "+" conductor of the transmission circuit for the purpose of cutting in on a busy connection, and for connecting ground potential to the "−" conductor for breaking down the previously established connection to or from the wanted local station.

In order to describe the methods by which the toll operator "cuts in" on a busy connection, "breaks down" the connection to release the wanted local station, and extends the toll call to the released local station, it is assumed that a connection has been completed between two local automatic stations, as illustrated by the simple skeletonized diagram in Figure 16, and that the toll operator desires to complete a toll connection to the called local station of the local connection. In Figure 16, the cut-off relay of the calling station is shown held in the operated position to ground through the upper winding of relay 220 of the line finder, armature 223 and working contact, and armature 513 and working contact of the first selector; and the cut-off relay of the called station is shown held in the operated position to ground through the lower winding of relay 730 of the connector, armatures 736, 737, 757 and associated working contacts. The voice transmission circuit between the calling and called stations is shown completed through armatures 221, 222, 733, 734 and associated working contacts. A detailed description of the connection between the calling and called stations is included in the section titled "Calls from main office stations to main office individual station lines."

Assuming now that the toll operator has operated the first selector by dialing the first digit of the number of the desired local station, thereby causing wipers 927, 928 and 929 to connect with conductors 935, 936 and 937 leading to the second selector of Figure 6; has dialed the second digit to cause the selected second selector to seize an idle connector such as Figure 7; and has dialed the last two digits of the wanted number to cause wipers 786, 787 and 788 to connect with the connector bank multiple contacts of the dialed local station, then the toll operator receives busy tone as an indication that the dialed local station is busy on another connection. The busy tone circuit may be traced from armature spring 774 and working contact, armatures 761, 731, 751, condenser 708 and armature 721 to the "−" side of the transmission circuit leading back to the toll operator equipment. Upon hearing the busy tone, the toll operator decides to "cut-in" on the local connection and, accordingly, connects battery potential to the "+" conductor of the transmission circuit by operating contact 970.

The operation of contact 970 completes a circuit to the lower and center windings of relay 750 of the connector by way of wiper 928, conductor 936 to Figure 6, conductor 535, armature 632, wiper 617, conductor 642 to Figure 7, conductor 726, armature 743; lower and center windings of relay 750 and ground, causing relay 750 to operate. At armature 751, relay 750 opens the busy tone circuit; and, at armatures 751 and 753, extends the transmission circuit from the toll switchboard through wipers 786 and 787 to the connector bank multiple of the dialed local station, thereby enabling the toll operator to converse with both local stations on the local connection. The toll operator then offers the toll connection to the called local station.

Assuming now that the toll operator is to "break down" the local connection and extend the toll call to the called local station, the toll operator then connects ground potential to the "—" conductor of the transmission circuit by operating contact 971. The operation of contact 971 completes a circuit to the upper winding of relay 700 of the conector by way of wiper 927, conductor 935 to Figure 6, conductor 535, armature 631, wiper 616, conductor 641 to Figure 7, conducting 725, upper winding of relay 700, armature 745 and resting contact, resistor 717 and battery, causing relay 700 to operate. At armature 702, relay 700 completes a circuit to relay 760 from ground, armature 757, armature 737 and resting contact, armature 702, lower winding of relay 760 to battery, causing relay 760 to operate; and, at armature 701, connects direct ground to wiper 788 by way of armature 747 and resting contact, and armature 756.

The direct ground on wiper 788 of the connector used by the toll operator is extended via the connector bank multiple to the winding of the cut-off relay of the called station, thereby completing a holding circuit for the cut-off relay independent of the connector (Figure 16) used on the local connection. This same direct ground also shunts the lower winding of relay 730 of Figure 16 connector, causing relay 730 to restore. At armatures 733 and 734, relay 730 disconnects the transmission circuit of the called local station, causing relay 750 to restore. The called local station is now free from Figure 16 connector, and its cut-off relay is held in the operated position by the direct ground from the toll operator's connector. The restoration of relay 750 (Figure 16) connects busy tone to the transmission circuit of the calling local station at armature 751, and when the calling local station disconnects, the switch train used for the local connection is released and restored to normal in the manner explained in the section titled "Calls from main office stations to main office individual station lines."

After the toll operator has operated contact 971 and thereby accomplished the breakdown of the local connection, she restores contacts 970 and 971 to normal, causing relays 750 and 700 in the connector of the toll train to restore. At armature 757, relay 750 removes ground from the lower lower winding of relay 760 but relay 760 being of the slow-to-release type does not restore for a short interval after its circuit is opened. To assist in the slow-to-release action of relay 760 when the circuit through its lower winding is opened at armature 757, a circuit to the upper winding of relay 760 was completed from ground, armatures 713, 764, resistor 718, upper winding of relay 760 to battery at the time the circuit to the lower winding of relay 760 was completed. The resistor 718 is of sufficient resistance value to prevent relay 760 from holding indefinitely on the circuit through its upper winding and resistor 718. At armature 756, relay 750 removes direct ground from wiper 788, thereby causing relay 730 to operate from ground, armatures 713, 764, 723, upper winding of relay 730, armature 748 and resting contact, lower winding of relay 730, wiper 786, C bank contact connected to wiper 788, connector bank multiple, winding of the cut-off relay of the called local station to battery. Relay 730 locks to the circuit from ground, armatures 713, 736, lower winding of relay 730, wiper 788, C bank contact connected to wiper 788, connector bank multiple, winding of the cut-off relay of the called local station to battery. At armatures 733 and 734, relay 730 completes the D. C. loop of the called local station through the upper winding of relay 740, causing relay 740 to operate and lock from ground, armatures 713, 749, lower winding of relay 740 to battery.

At armatures 741 and 742, relay 740 opens the circuit through its upper winding: at armatures 741, 742 and associated working contacts, completes the D. C. loop of the called local station through the upper and center windings of relay 750, causing relay 750 to operate: and, at armatures 741, 742 and associated working contacts, extends the transmission circuit from the toll operator equipment to the called local station. At armature 757, relay 750 connects a multiple ground to wiper 788 through armature 737 and working contact, armature 736 and the lower winding of relay 730, and also connects a multiple ground to the lower winding of relay 740 through armature 737 and working contact, and armature 749. Should the called local station have returned his handset to the cradle before the toll operator completed the breaking down of the local connection, the called local station will be automatically signalled through the upper winding of relay 740 and the resting contacts of armatures 741 and 742 as a result of the closure of armatures 733 and 734 by the operation of relay 730.

Assuming now that the local station dialed by the tool operator is the calling station of the local connection shown in Figure 16, then the operation of contact 971 by the toll operator causes direct ground to be extended through wiper 788 of the connector used by the toll operator, connector bank multiple to the winding of the cut-off relay of the calling station (Figure 16), thereby completing a holding circuit for the cut-off relay independent of the line finder used on the local connection. This same ground also shunts the upper winding of relay 220 of the line finder, causing relay 220 to restore. At armatures 221 and 222, relay 220 disconnects the transmission circuit of the calling local station, causing relay 500 in the first selector to restore, and the switch train used for the local connection is released and restored to normal in the manner described in the section titled "Calls from main office stations to main office individual station lines." The calling local station is now freed from Figure 16 line finder, and its cut-off relay is held in the operated position by the direct ground from the toll operator's connector. From this point on, the operation of the connector used by the toll operator is the same as that described when the local station desired by the toll operator is the called station on the local connection.

In the preceding paragraph it was assumed that the multiple of the calling local station was located in the lower banks of the line finder and, therefore, relay 220 in the finder was the locked up relay in the finder that was shunted down by the direct ground from the connector used by the toll operator. It should be understood, however, that the toll operator could equally as well desire to connect with a calling local station associated with the upper banks of the line finder. In the latter event, relay 230 in the line finder would be the locked up relay shunted down by the direct ground from the connector used by the toll operator.

Having described the invention, what is considered new and is desired to have protected by Letters Patent is pointed out in the following claims:

I claim:

1. In a telephone system, a main office and a branch office, a calling line, a selector, and a local trunk line in said branch office, restoring means for said selector, an outgoing trunk line from said branch office to said main office, means responsive to the initiation of a call over said calling line for causing said selector to seize said outgoing trunk line, thereby to establish a connection to said main office, movement means responsive to a series of impulses over said calling line for causing a primary movement of said selector, a first contact, first contact operating means, said primary movement causing said first contact operating means to operate said first contact, said operation of said first contact causing said restoring means to restore said selector to normal position, said movement means responsive to another series of impulses over said calling line for causing a second primary movement of said selector, a second contact, second contact operating means, said second primary movement causing said second contact operating means to operate said second contact, said operation of said second contact causing said restoring means to again restore said selector, means responsive to said last operation of said restoring means for disabling said connection to said main office, said movement means responsive to a further series of impulses over said calling line for causing a third primary movement of said selector, a wiper in said selector positioned by said third primary movement, and means controlled by said positioning of said wiper for causing a secondary movement of said selector to connect said selector with said local trunk line.

2. In a telephone system, a main office and a branch office, a calling line and a local trunk line in said branch office, a selector in said branch office having vertical and rotary stepping magnets, a wiper, and a release magnet, an outgoing trunk line from said branch office to said main office, means responsive to the initiation of a call over said calling line for causing said selector to seize said outgoing trunk line, thereby to establish a connection to said main office, positioning means controlled by said vertical magnet responsive to a dialed digit from said calling line for positioning said selector, a contact in said selector, contact operating means in said selector, said positioning of said selector causing said contact operating means to operate said contact, said operation of said contact causing the operation of said release magnet thereby to cause the restoration of said selector to the normal position, said positioning means controlled by said vertical magnet responsive to another dialed digit from said calling line for causing a second positioning of said selector, a second contact in said selector, a second contact operating means in said selector, said second positioning of said selector causing said second contact operating means to operate said second contact, said operation of said second contact causing a second operation of said release magnet thereby to cause the restoration of said selector to the normal position, means responsive to said second operation of said release magnet for causing the release of said extended connection to said main office, said positioning means controlled by said vertical magnet responsive to a further dialed digit from said calling line for causing a third positioning of said selector and the positioning of said wiper, and means responsive to said positioning of said wiper for causing the stepping of said rotary magnet to further position said selector thereby to connect said selector with said local trunk line.

3. In an automatic telephone system, a calling station, a selector adapted to be operated by primary and secondary movements and having two contacts, a wiper, and restoring means, a local trunk, an outgoing trunk terminating in a switch, a connection extended from said calling station to said switch over said outgoing trunk in response to the seizure of said selector by said calling station, means for holding said extended connection, said switch terminating said outgoing trunk operative by said calling station when said calling station transmits a series of impulses over said outgoing trunk within a given time interval, time controlled means for causing the disablement of said holding means upon the expiration of said given time interval without said calling station transmitting a series of impulses, thereby to cause the release of said extended connection, means thereafter responsive to a series of impulses over said calling station for causing a primary movement of said selector, one of said contacts controlled by said one primary movement for causing said restoring means to restore said selector, means for causing a second primary movement of said selector, said other contact controlled by said second primary movement for causing said restoring means to again restore said selector, means for causing a third primary movement of said selector to position said wiper, and means responsive to said positioning of said wiper for causing a secondary movement of said selector thereby to connect said selector with said local trunk.

4. In a telephone system, a calling station, a switching selector comprising trunk wipers having access to a plurality of out trunk circuits and normally connected with one of said out trunk circuits, line wipers having access to a plurality of local trunk circuits, three stepping magnets, a relay, means responsive to the seizure of said selector by said calling station for causing said relay to step one of said magnets thereby to cause said trunk wipers to search for and connect with a free out trunk circuit when said trunk wipers are connected with an out trunk circuit which is in the busy condition at the time said seizure of said selector takes place, means for causing said selector to seize the free out trunk circuit to which said trunk wipers are connected, means thereafter controlled by said calling station for causing the release of said seized out trunk circuit, means controlled by said calling station for stepping a second one of said magnets to cause an operation of said line wipers thereby to position said line wipers, and means for causing said relay to step a third one of said magnets thereby to cause said positioned line wipers to search for and connect with a free local trunk circuit.

5. In a telephone system, connectors, a line group comprising a first line and second line each having multiple positions acsessible to said connectors, two test contacts in each of said multiple positions, a conductor connecting said first line to one of said test contacts in each of said first line multiple positions, a second conductor separately connecting said first line to the other of said test contacts in each of said first line multiple positions, a third conductor connecting said second line to one of said test contacts in each of said second line multiple positions, the other of said test contacts in each of said second line multiple positions having no electrical connection with said second line, a potential, relay contacts in said first line for connecting said potential to said first conductor when said first line is in a busy condition thereby to extend said potential to said one test contact in each of said first line multiple positions, means responsive to a calling one of said connectors testing said one test contact in one of said first line multiple positions and encountering said potential thereon for preventing said calling connector from connecting with said first line, other relay contacts in said first line for connecting said potential to said second conductor when said first line is in said busy condition thereby to extend said potential to said other test contact in each of said first line multiple positions, means responsive to said calling connector testing said other test contact in said one first line multiple position and encountering said potential thereon for causing said calling connector to select a multiple position of said second line, relay contacts in said second line for connecting said potential to said third conductor when said second line is in a busy condition thereby to extend said potential to said one test contact in each of said second line multiple positions, means responsive to a calling one of said connectors testing said one test contact in one of said second line multiple positions and encountering said potential thereon for preventing said last calling connector from connecting with said second line, and means for returning busy tone when a calling one of said connectors attempts to connect with said second line when said second line is in a busy condition.

6. In an automatic telephone system, a branch office and a main office, a calling line and a switch train including an out trunk circuit in said branch office, a called line and a switch train including an incoming selector in said main office, conductors connecting said out trunk circuit in said branch office with said incoming selector in said main office, means responsive to said calling line dialing said called line over said switch train in said branch office for operating said switch train in said main office to select said called line, means for establishing a talking connection between said two lines, means controlled only by the disconnection of both said lines from said talking connection for causing said switch train in said branch office to release thereby to free said calling line and said out trunk circuit, means in said freed out trunk circuit for creating a high voltage potential, means in said freed out trunk circuit for momentarily connecting said potential to only one of said conductors thereby to transmit said momentary potential to said incoming selector in said main office, and means in said incoming selector responsive to said momentary application of said potential to only said one conductor for causing the restoration of said incoming selector thereby to cause the release of the balance of said switch train in said main office.

7. The structure claimed in claim 6 with the addition of means in said out trunk circuit for momentarily connecting a second application of said potential to said one conductor to cause the restoration of said incoming selector should said first momentary application of said potential have failed to cause the restoration of said incoming selector.

8. In a telephone system, a switching unit, a second unit, a supervisory signal lamp, a third unit, means for causing said first unit to seize said second unit, means for causing said supervisory lamp to glow at full voltage in response to said seizure of said second unit, means for causing said second unit to seize said third unit thereby to connect first unit with said third unit, means for causing said first unit to operate said third unit, means for causing said supervisory lamp to remain at full glow in response to said seizure and said operation of said third unit, means for causing the restoration of said first unit thereby to free said second unit, means for causing said supervisory lamp to glow at reduced voltage in response to said freeing of said second unit, means responsive to said freeing of said second unit for causing the restoration of said third unit, means for causing said supervisory lamp to become dark in response to said restoration of said third unit thereby to indicate that all said three units are at normal, and means for causing said supervisory lamp to remain at reduced glow should said third unit fail to restore thereby to indicate an incomplete restoration.

9. In a selector switch adapted to be positioned by directive primary movement and an automatic secondary movement, A, B and C relays, a wiper, means for positioning said switch by a directed primary movement, means for restoring said switch to the normal position, said restoring means also operating said A relay thereby to prepare said B relay for operation, said first means positioning said switch by a second directed primary movement, means for again restoring said switch to the normal position, said last restoring means also operating said prepared B relay thereby to prepare said C relay for operation, said first means positioning said switch by a third directed primary movement, said wiper operated by said third directed primary movement for operating said prepared C relay, said operation of said C relay causing said automatic secondary movement to further position said switch.

10. In a telephone system, a calling line, a switch having a wiper, an A relay, and a B relay, a control circuit, means for extending said line to said switch, means for positioning said switch responsive to a dialed digit over said line, means for restoring said positioned switch to the normal position, said restoring means also operating said A relay for preparing said B relay, said second means positioning said switch a second time responsive to another dialed digit over said line, said wiper operated by said second positioning of said switch for operating said prepared B relay, and means responsive to said operation of said B relay for causing a different positioning of said switch thereby to cause said switch to seize said control circuit.

11. In a switching device, an A relay, a B relay, means for positioning said device, means for restoring said device when positioned, a contact controlled by a first positioning of said device for operating said restoring means to cause a restoration of said device, said operation of said restoring means also operating said A relay thereby to prepare said B relay and to prepare a second path for a second operation of said restoring means, a second contact controlled by a second positioning of said device for operating said restoring means over said second path to cause a second restoration of said device, said last operation of said restoring means also operating said prepared B relay thereby to disable said second path and to prepare a third path for a third operation of said restoring means, and a wiper controlled by a third positioning of said device for operating said restoring means over said third path to cause a third restoration of said device.

12. In a selector switch adapted to be positioned by a primary movement and a secondary movement, means for restoring said switch when positioned, means for positioning said switch by a primary movement, a contact controlled by said positioning of said switch for operating said restoring means to cause a restoration of said switch, means responsive to said operation of said restoring means for preparing a second path for a second operation of said restoring means, said second mentioned means positioning said switch by a second primary movement, a contact controlled by said second positioning of said switch for operating said restoring means over said second path to cause a second restoration of said switch, said second mentioned means positioning said switch by a third primary movement, a wiper operated by said third positioning of said switch, and means responsive to said operation of said wiper for causing said secondary movement to further position said switch.

13. In a telephone system, a calling line, a first switch having a brush adapted to be moved in only one direction, a second switch having a brush adapted to be moved in two directions, magnets, a relay, means responsive to the initiation of a call over said calling line for causing said relay to pulse one of said magnets, means responsive to said pulsing of said one magnet for correspondingly moving said brush of said first switch in said one direction, means controlled by said calling line for pulsing another of said magnets, means responsive to said pulsing of said other magnet for correspondingly moving said brush of said second switch in one of said two directions, means responsive to the completion of said moving of said brush of said second switch for causing said relay to pulse a third one of said magnets, and means responsive to said pulsing of said third magnet for correspondingly moving said brush of said second switch in the other of said two directions.

14. In a telephone system, a plurality of subscribers' lines, means controlled by a calling one of said lines for selecting and signalling a called one of said lines, a source of potential, a relay, means responsive to said called line answering said signaling for establishing a talking circuit between said calling and called lines, said talking circuit having at least one conductor, means responsive to said called line answering said signalling for connecting said source of potential to said one conductor of said talking circuit, release means controllable by said calling line for releasing said talking circuit in case said called line abandons said talking circuit, means responsive to said calling line abandoning said talking circuit for connecting said relay to said one conductor, means including said source of potential and responsive to said connection of said relay for operating said relay in case said called line remains connected to said talking circuit, and means responsive to said operation of said relay for disabling said release means to prevent a release of said talking circuit at this time.

15. The telephone system claimed in claim 14 together with a supervisory signal, and means responsive to said operation of said relay for causing the operaion of said supervisory signal.

IMRE MOLNAR.

REFERENCES CITED

The following references are of record in the file of this patent:

UNITED STATES PATENTS

| Number | Name | Date |
|---|---|---|
| 1,309,248 | Goodrum | July 8, 1919 |
| 1,632,025 | Dustin | June 14, 1927 |
| 1,732,185 | Stehlik | Oct. 15, 1929 |
| 1,747,478 | Lomax | Feb. 18, 1930 |
| 1,812,999 | Taylor et al. | July 7, 1931 |
| 1,871,300 | Burgener | Aug. 9, 1932 |
| 1,891,423 | Kahn | Dec. 20, 1932 |
| 1,950,877 | Belas | Mar. 13, 1934 |
| 2,036,055 | Koechling | Mar. 31, 1936 |
| 2,077,537 | Taylor | Apr. 20, 1937 |
| 2,131,568 | Peterson | Sept. 27, 1938 |
| 2,131,572 | Saunders | Sept. 27, 1938 |
| 2,200,820 | Boswau | May 14, 1940 |
| 2,258,651 | Hovland | Oct. 14, 1941 |
| 2,271,878 | Wadsworth | Feb. 3, 1942 |
| 2,332,290 | Baumfalk | Oct. 19, 1943 |
| 2,337,365 | Bakker | Dec. 21, 1943 |
| 2,339,669 | Baumfalk | Jan. 18, 1944 |
| 2,377,314 | Christian et al. | June 5, 1945 |
| 2,377,544 | Durkin | June 5, 1945 |
| 2,383,541 | Gillings et al. | Aug. 28, 1945 |
| 2,409,063 | Ostline | Oct. 8, 1946 |
| 2,424,577 | Mauge | July 29, 1947 |
| 2,479,276 | Taylor | Aug. 16, 1949 |